United States Patent
Wakabayashi et al.

[11] Patent Number: 5,802,411
[45] Date of Patent: Sep. 1, 1998

[54] CAMERA HAVING A LOAD PREVENTION MEMBER CAPABLE OF CONTROLLING FILM CARTRIDGE LOADING BASED ON WHETHER THE FILM IS NEW OR USED

[75] Inventors: Tsutomu Wakabayashi; Noboru Akami, both of Yokohama; Noriyasu Kotani, Okegawa, all of Japan

[73] Assignee: Nikon Corporation, Tokyo, Japan

[21] Appl. No.: 800,031

[22] Filed: Feb. 13, 1997

Related U.S. Application Data

[62] Division of Ser. No. 467,835, Jun. 6, 1995, Pat. No. 5,640,634, which is a division of Ser. No. 221,994, Apr. 1, 1994, abandoned, which is a continuation of Ser. No. 924,626, Aug. 3, 1992, abandoned.

[30] Foreign Application Priority Data

| | | | |
|---|---|---|---|
| Aug. 5, 1991 | [JP] | Japan | 3-219243 |
| Oct. 15, 1991 | [JP] | Japan | 3-296362 |
| Nov. 12, 1991 | [JP] | Japan | 3-295907 |

[51] Int. Cl.$^6$ ............................................. G03B 19/02
[52] U.S. Cl. ............................ 396/389; 396/515; 396/538
[58] Field of Search .................................. 396/207, 387, 396/389, 512, 515, 535, 538

[56] References Cited

U.S. PATENT DOCUMENTS

| | | |
|---|---|---|
| 4,240,734 | 12/1980 | Nomura et al. .................. 396/512 |
| 4,832,275 | 5/1989 | Robertson ..................... 396/512 X |
| 4,888,604 | 12/1989 | Tosaka et al. .................... 396/208 |
| 4,994,833 | 2/1991 | Cocca ............................. 396/515 |
| 5,136,317 | 8/1992 | Goto et al. ....................... 396/210 |
| 5,159,365 | 10/1992 | Takahashi et al. .......... 396/389 X |
| 5,463,435 | 10/1995 | Ezawa ............................. 396/207 |

FOREIGN PATENT DOCUMENTS 4-76526  3/1992  Japan .

Primary Examiner—Safet Metjahic
Assistant Examiner—J. K. Han
Attorney, Agent, or Firm—Oliff & Berridge,PLC

[57] ABSTRACT

This invention is applicable to a camera having a cartridge chamber into which a film cartridge is detachably insertable along its axis direction. The camera is equipped with a cartridge-load detection switch for outputting a load signal when the cartridge is loaded in the cartridge chamber, and outputting a non-load signal when the loaded cartridge is drawn out from the cartridge chamber by at least a predetermined amount. When the photographed cartridge is partially drawn out from the cartridge chamber and then reloaded into the cartridge chamber as it is, the output of the load signal is continued if the draw-out amount is below the predetermined amount, thereby preventing an erroneous judgment that a new cartridge is loaded into the cartridge chamber. Therefore, for example, the double exposure can be prevented.

6 Claims, 42 Drawing Sheets

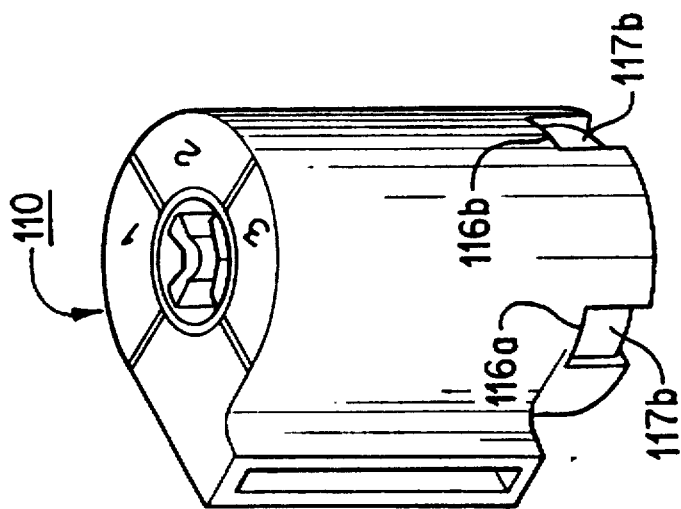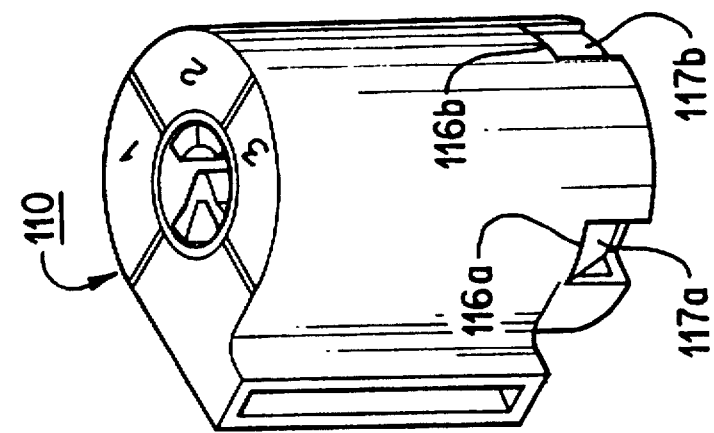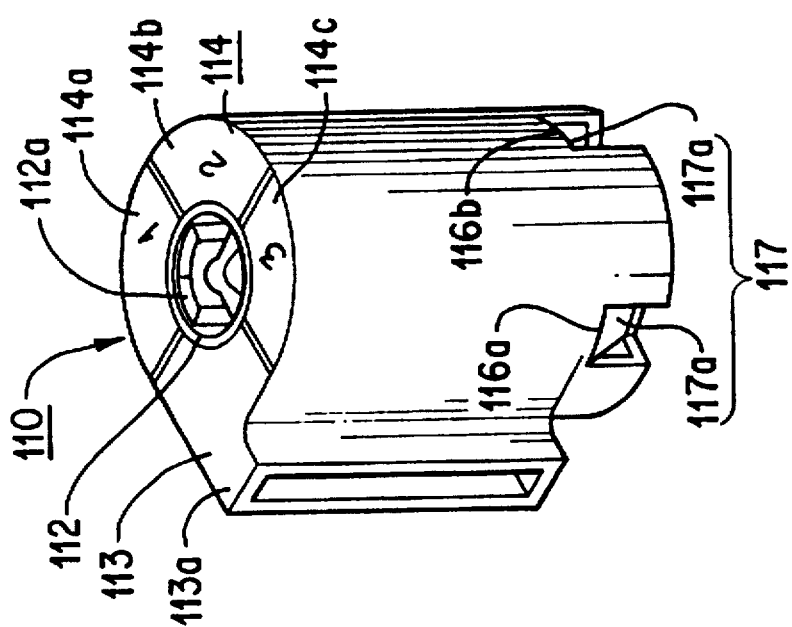

CAMERA HAVING A LOAD PREVENTION MEMBER CAPABLE OF CONTROLLING FILM CARTRIDGE LOADING BASED ON WHETHER THE FILM IS NEW OR USED

This is a Division of application Ser. No. 08/467,835 filed on Jun. 6, 1995 now U.S. Pat. No. 5,640,634 which in turn is a Divisional of application Ser. No. 08/221,994 filed Apr. 1, 1994, now abandoned, which in turn is a Continuation of application Ser. No. 07/924,626 filed Aug. 3, 1992 now abandoned.

BACKGROUND OF THE INVENTION

1. Field of the Invention

This invention relates to a camera having a cartridge chamber into which a film cartridge is detachably insertable along its axial direction.

2. Related Background Art

FIG. 15 is a perspective view of a film cartridge 2 having the same construction as disclosed in U.S. Pat. No. 4,832, 275. The cartridge 2 includes a cylindrical portion 2a in which a spool shaft 2e is rotatably mounted, and a film feed-out portion formed integrally with the cylindrical portion 2a in such a manner as to extend in a tangent direction to the cylindrical portion 2a. A film 1 is stored inside the cylindrical portion 2a as it is wound around the spool shaft 2e. An engaging portion 2c is formed at an upper portion of the spool shaft 2e in such a manner as to be engageable with a driving member (not shown) provided in a camera. The film 1 is fed out from the feed-out portion 2b when the spool shaft 2e is counterclockwise rotated by the driving member in a direction as indicated by an arrow of solid line of FIG. 15, and it is rewound when the spool shaft 2e is clockwise rotated by the driving member.

Since this type of cartridge 2 is so designed that the film 1 is fed out by rotating the spool shaft 2e as described above, when the cartridge 2 is loaded into a camera, it is not necessary to draw out the film from the cartridge 2 and then wind it around a take-up spool which has been required for a conventional 135-type cartridge, for example. Therefore, unlike a conventional camera, a camera usable for this type of the cartridge 2 is not required to be so constructed that the back surface of a camera body is designed to be wholly opened and this opened back surface is closed by a back lid. In this type of camera usable for the cartridge 2, a cartridge loading work is more facilitated if the camera is provided with a cartridge insertion inlet having a slightly larger aperture than the diameter of the cartridge at a bottom portion of the camera body and a cartridge lid movable so as to open and close the cartridge insertion inlet, and the camera is so designed that the cartridge 2 is insertable into a cartridge chamber along its axial direction while the cartridge lid is opened.

In this camera for usable for the cartridge 2, a detection device for detecting whether a cartridge has been loaded into the camera is required to electrically carry out an initial feed-out operation of a film, for example, interlockingly with a closing operation of the cartridge lid after the cartridge is loaded into a cartridge chamber of the camera. If the detection device is constructed by a detection switch whose switch-on operation is actuated by the load of the cartridge, and whose switch-off operation is actuated by the non-load of the cartridge, the film initial feed-out operation may be carried out when the close-state of the cartridge lid is detected after the detection switch is shifted from the switch-off state to the switch-on state.

However, the following problem occurs in such a camera if the camera is so constructed that the detection switch is disposed at an inner side of the cartridge chamber and apart from the film insertion inlet, and the detection switch is switched on when the cartridge is substantially completely loaded into the cartridge chamber while it is switched off when the cartridge is slightly drawn out in the above completely-loaded state.

In a case where a cartridge storing a film whose photographic frames have been wholly photographed (hereinafter referred to as "used film cartridge") is halfway or partially drawn out (unloaded) from the cartridge chamber and then reloaded into the cartridge chamber, the detection switch is once switched off at the time when the cartridge is slightly halfway drawn out from the cartridge chamber, and then switched on at the time when it is reloaded into the cartridge chamber. Therefore, when the cartridge lid is closed after the cartridge is reloaded into the cartridge chamber, there occurs an unfavorable circumstance that the initial feed-out operation of the film from the reloaded cartridge is unfavorably started again. Such a circumstance frequently occurs when a user draws out a used film cartridge halfway or partially from the cartridge chamber, but he re-loads the film cartridge into the cartridge chamber because he thinks that the camera will not be used afterwards and thus it is better to be kept in the camera.

SUMMARY OF THE INVENTION

An object of this invention is to provide a camera in which an initial feed-out operation of a film is prevented when a halfway or partially drawn-out (unloaded) cartridge is reloaded into the camera.

This invention is applicable to a camera having a cartridge chamber into which a film cartridge is detachably insertable along its axial direction. In order to attain the above object, the camera according to this invention is provided with signal output means for outputting a load signal when the cartridge is completely loaded into the cartridge chamber, and outputting a non-load signal when the loaded cartridge is drawn out from the cartridge chamber by at least a predetermined amount.

According to this invention, in a case where a photographed cartridge is drawn out halfway from the cartridge chamber and then the cartridge is reloaded into the cartridge chamber, the load signal is continued to be output insofar as the draw-out amount is below the predetermined amount, so that there is no possibility of an erroneous judgment that a new cartridge is loaded irrespective of the reloading of the used cartridge. Therefore, a double exposure of the film can be prevented.

3

Figure 8:
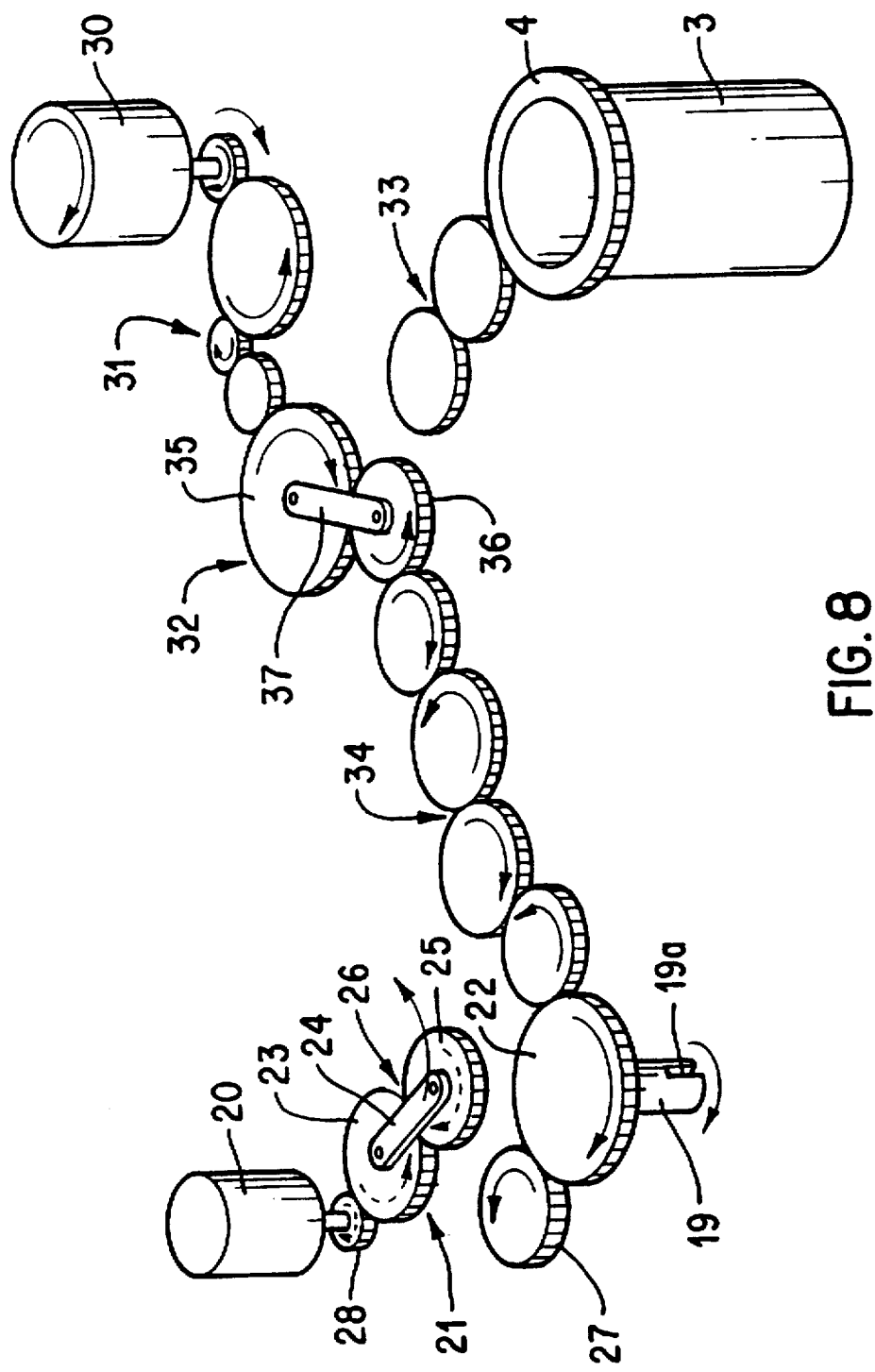
Figure 9:
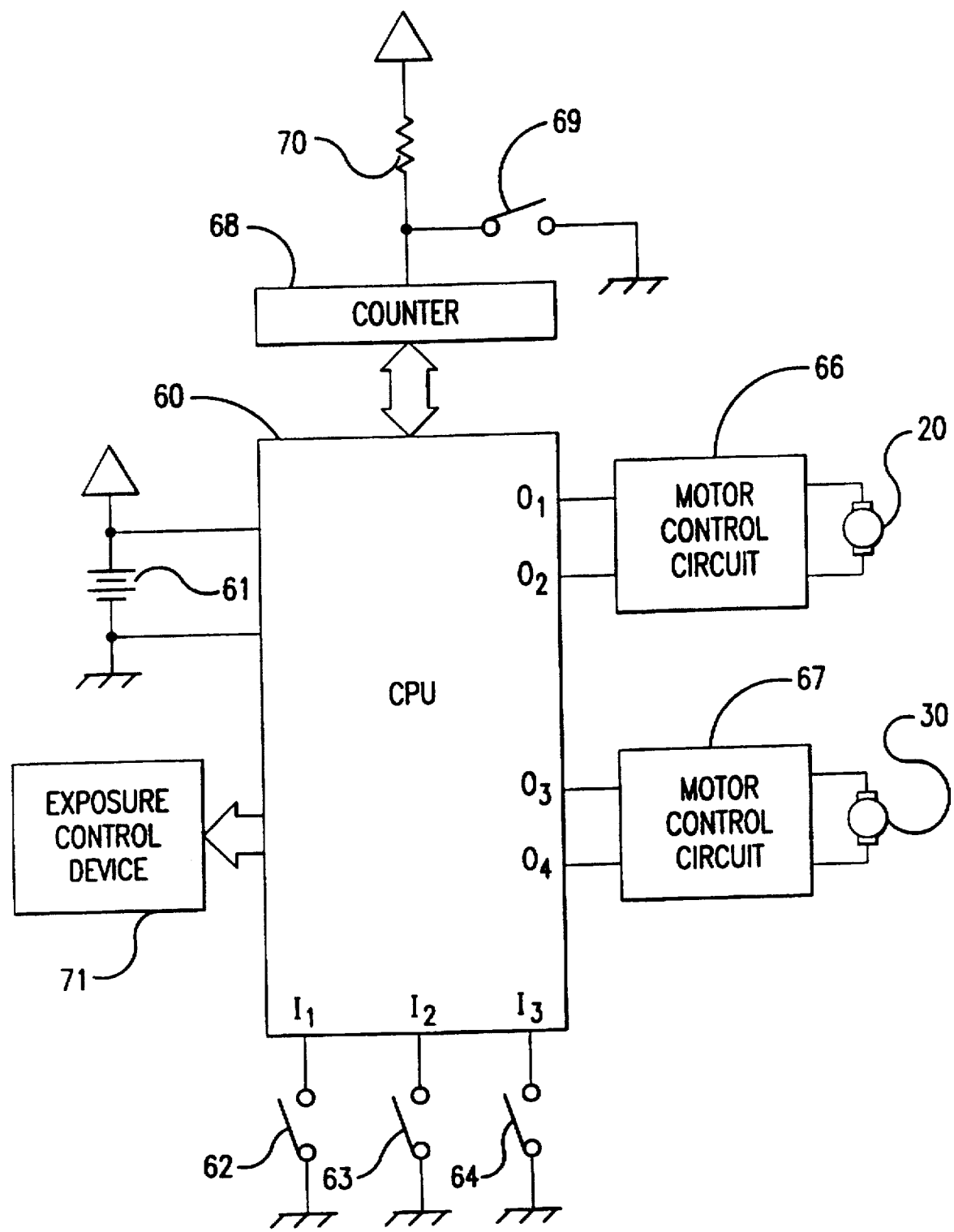
Figure 10:
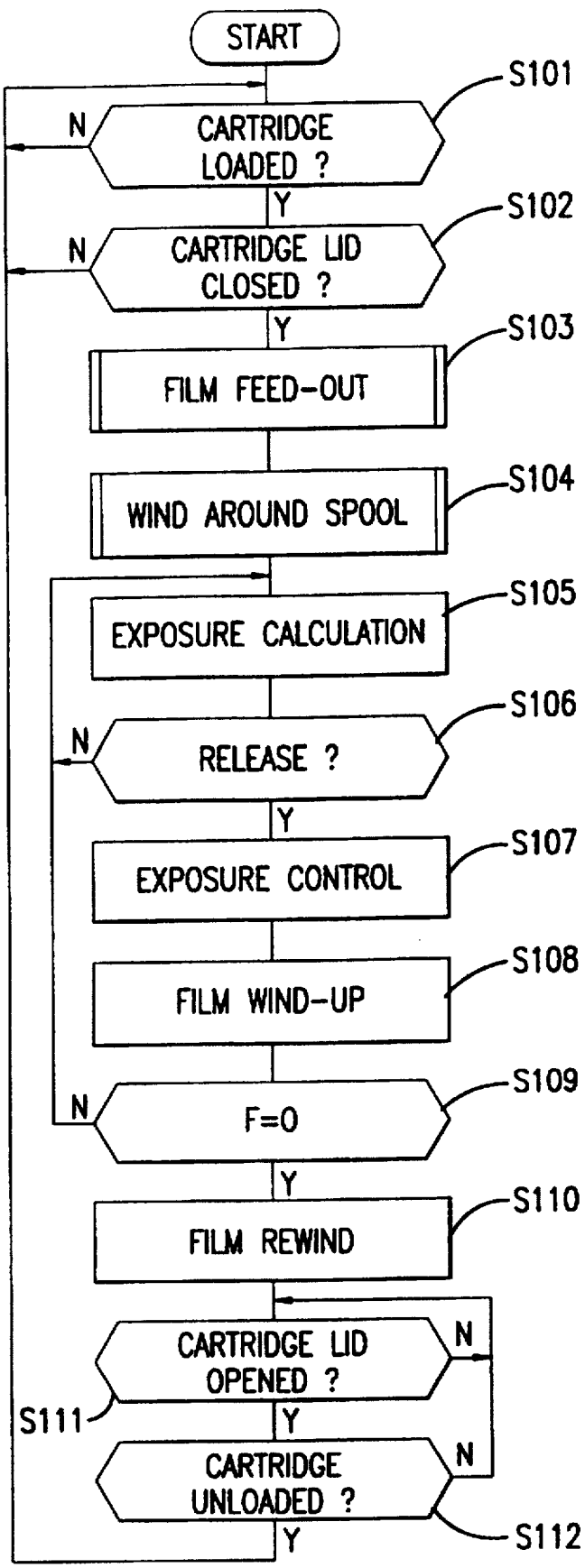
Figure 11:
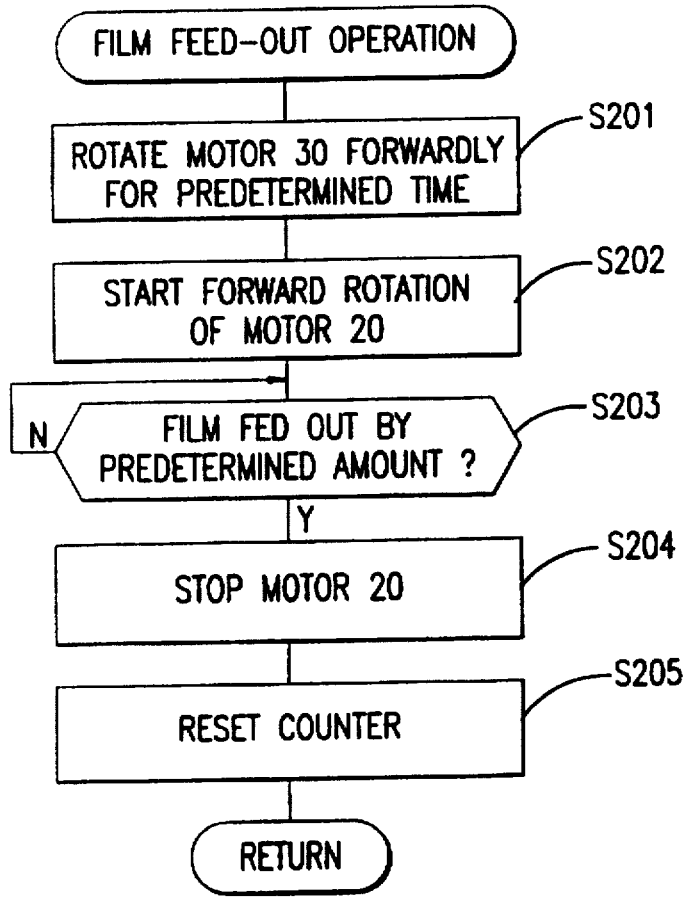
Figure 12:
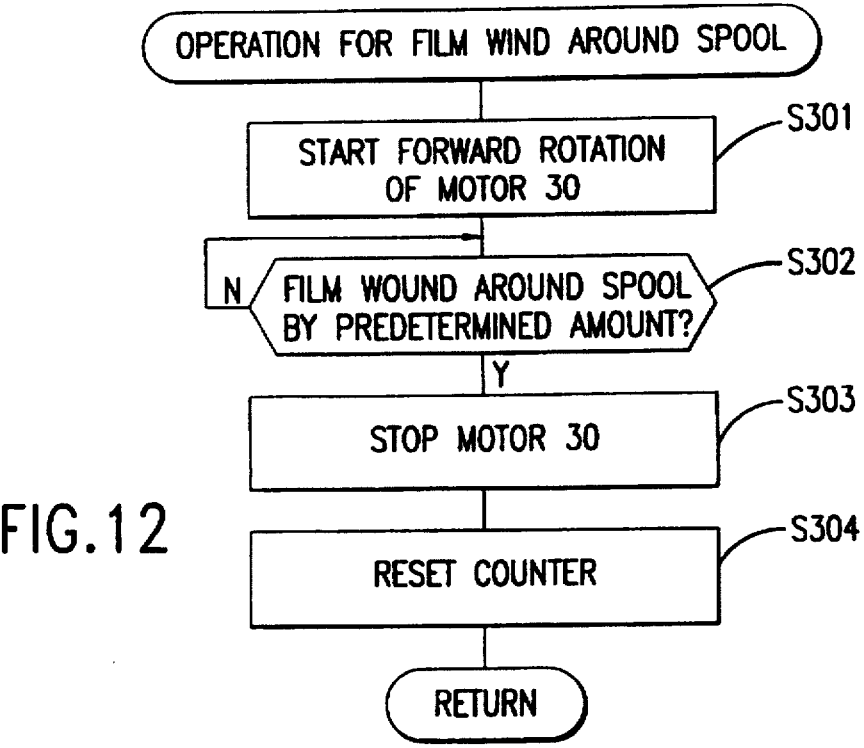
Figure 13:
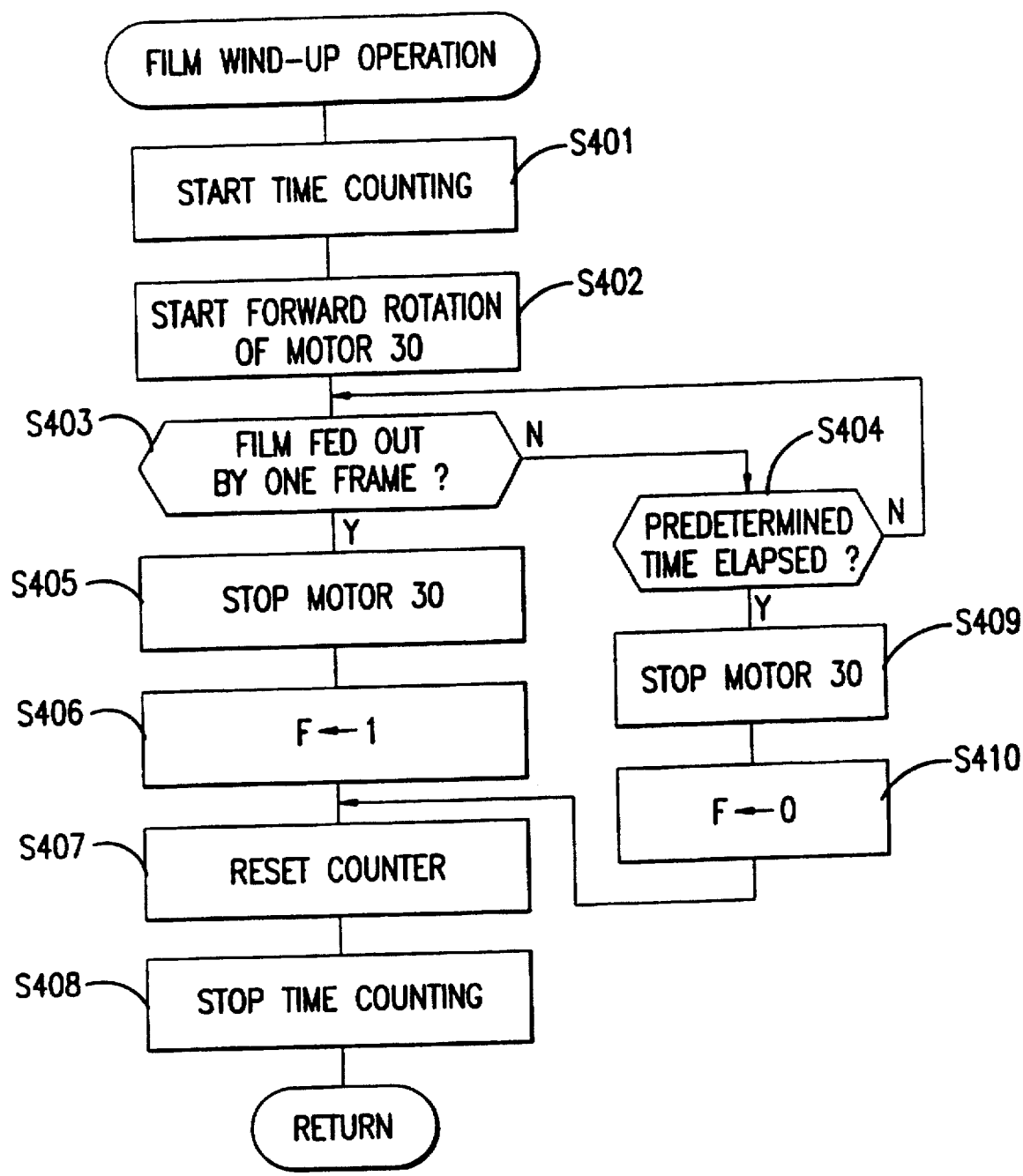
Figure 14:
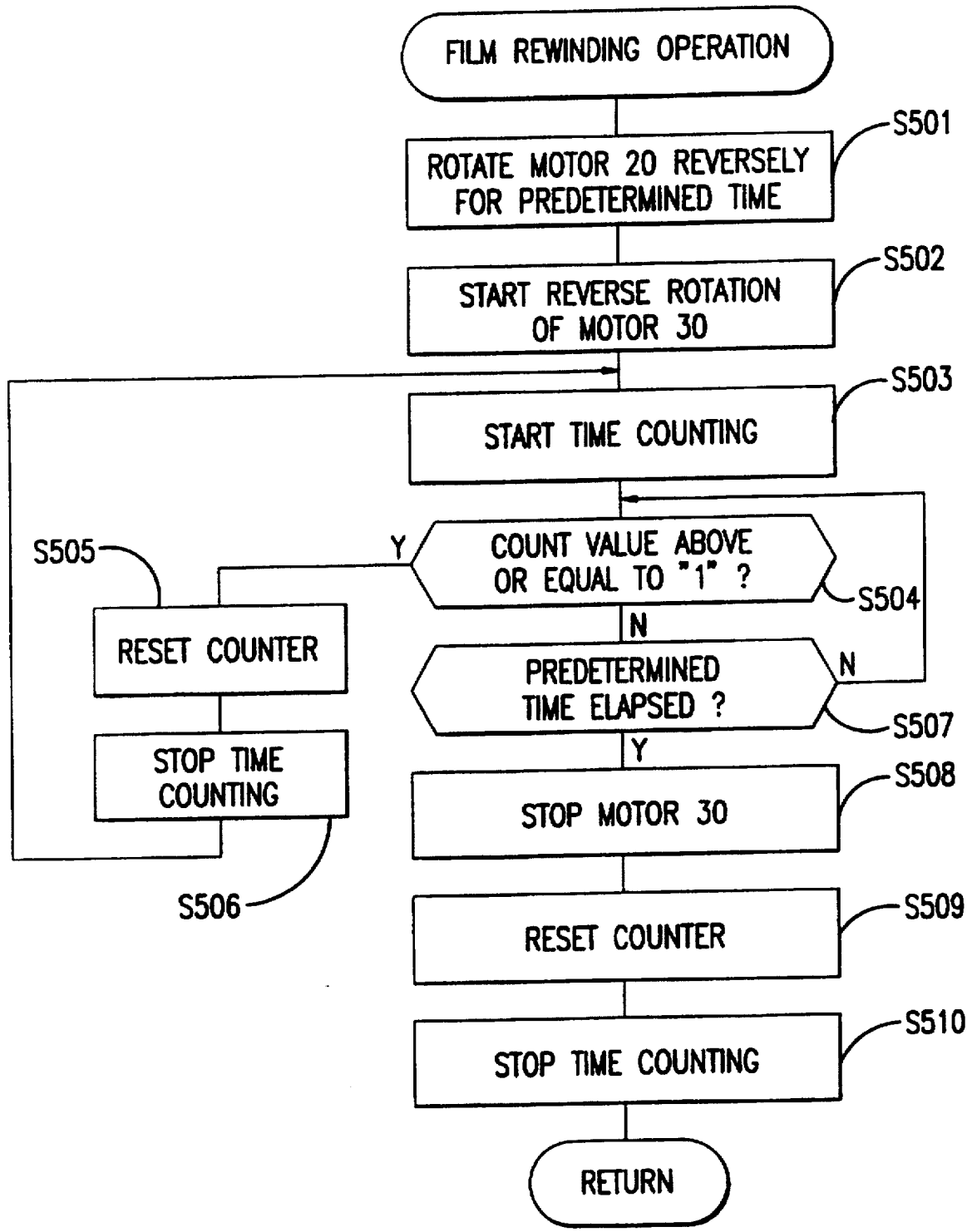
Figure 15:
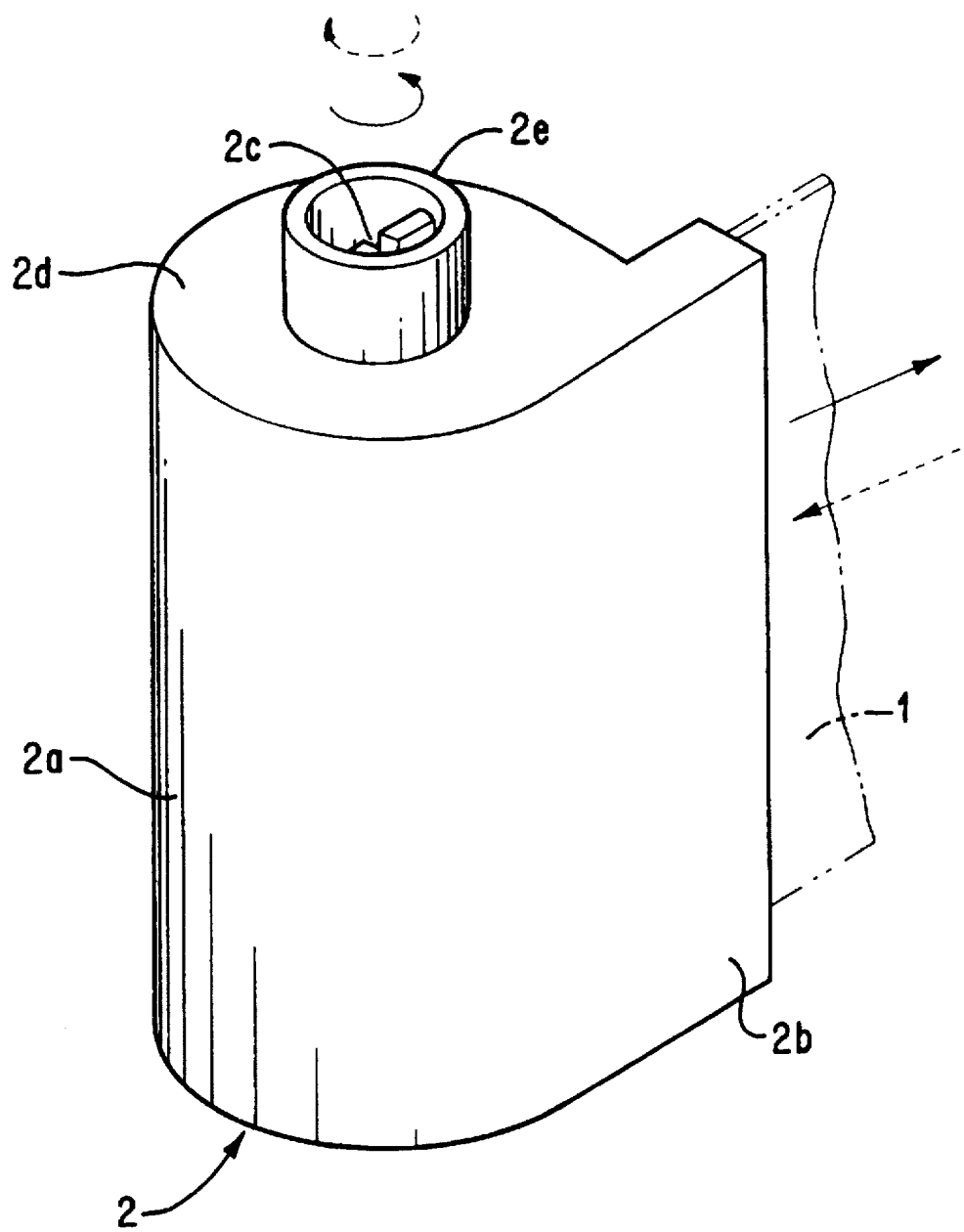
Figure 17:
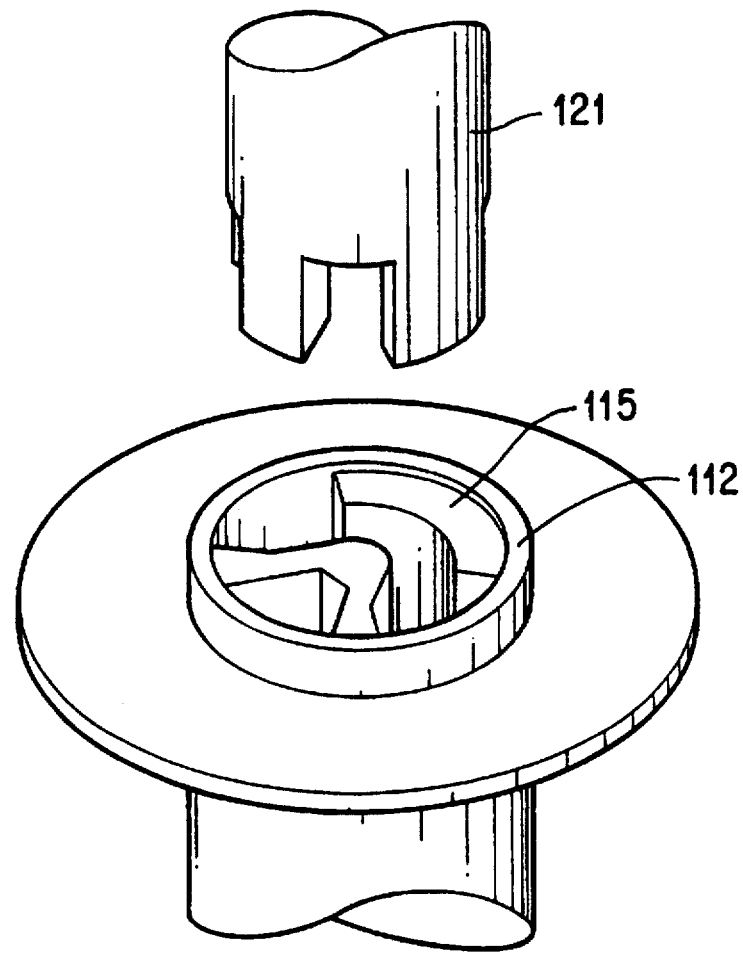
Figures 18A, 18B:
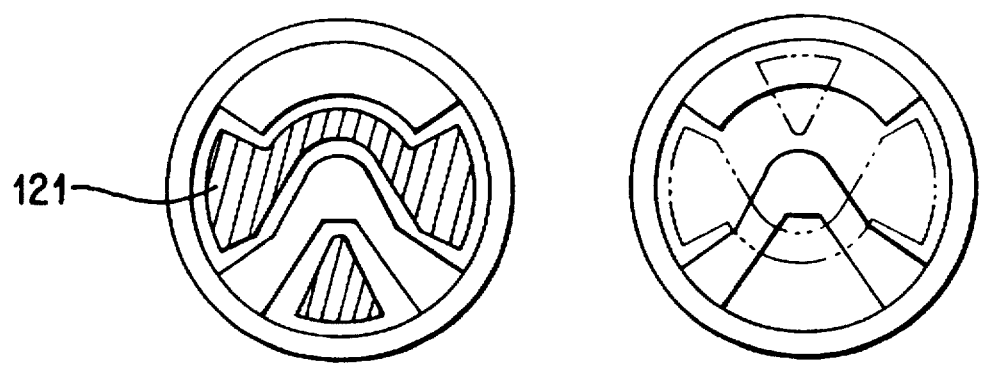
Figure 19:
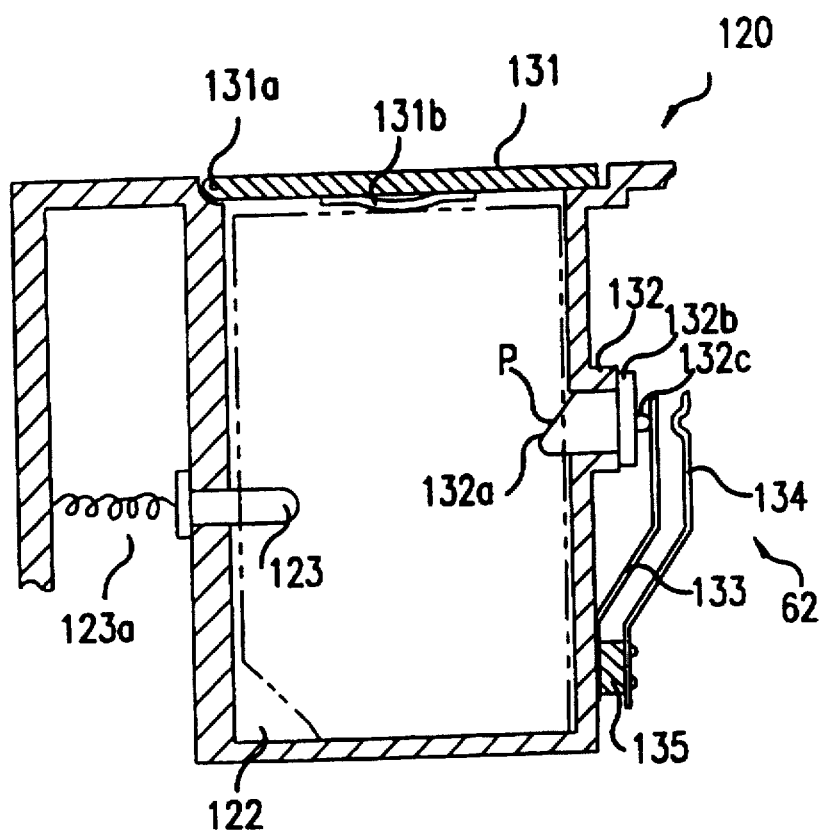
Figure 20:
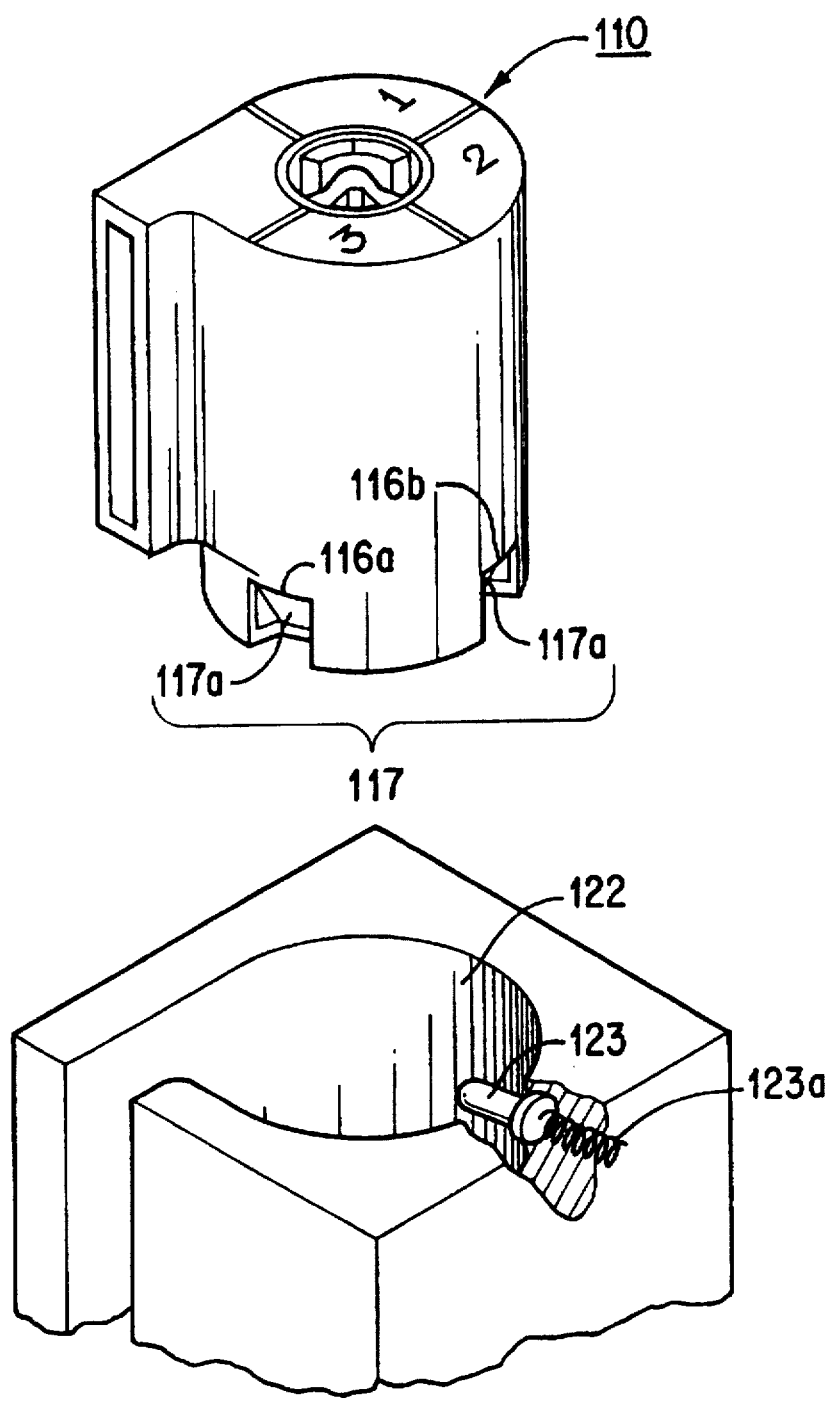
Figure 21A:
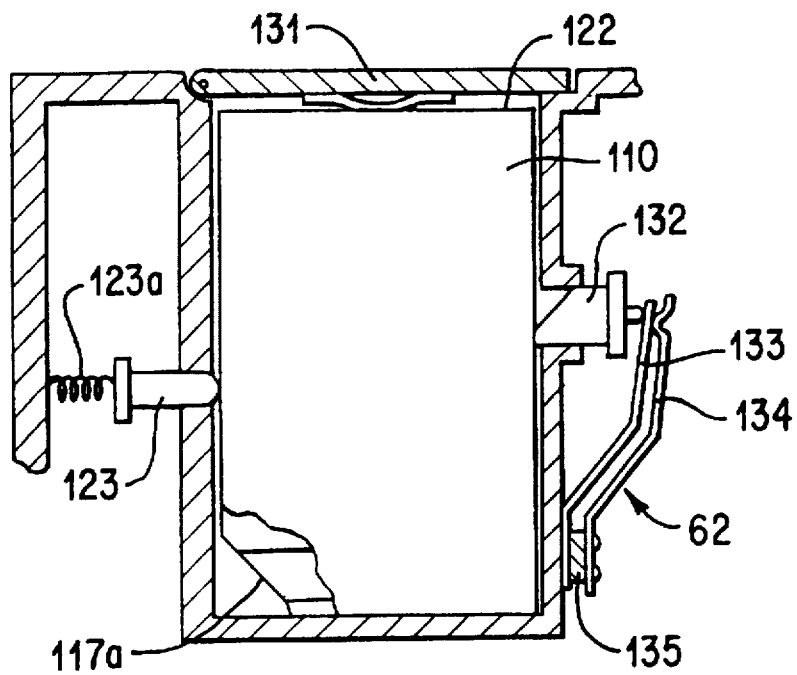
Figure 21B:
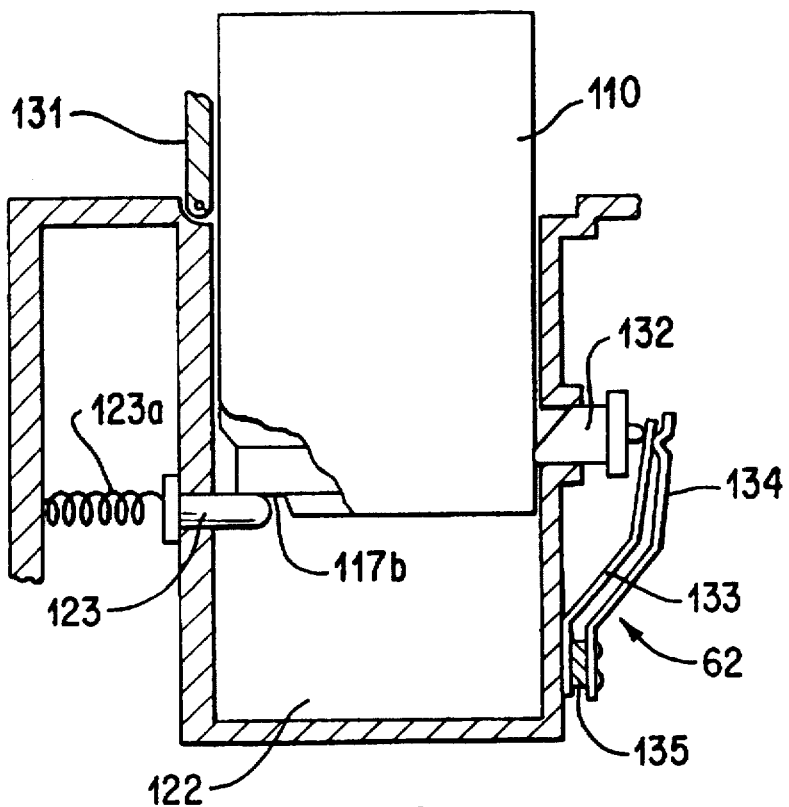
Figure 22:
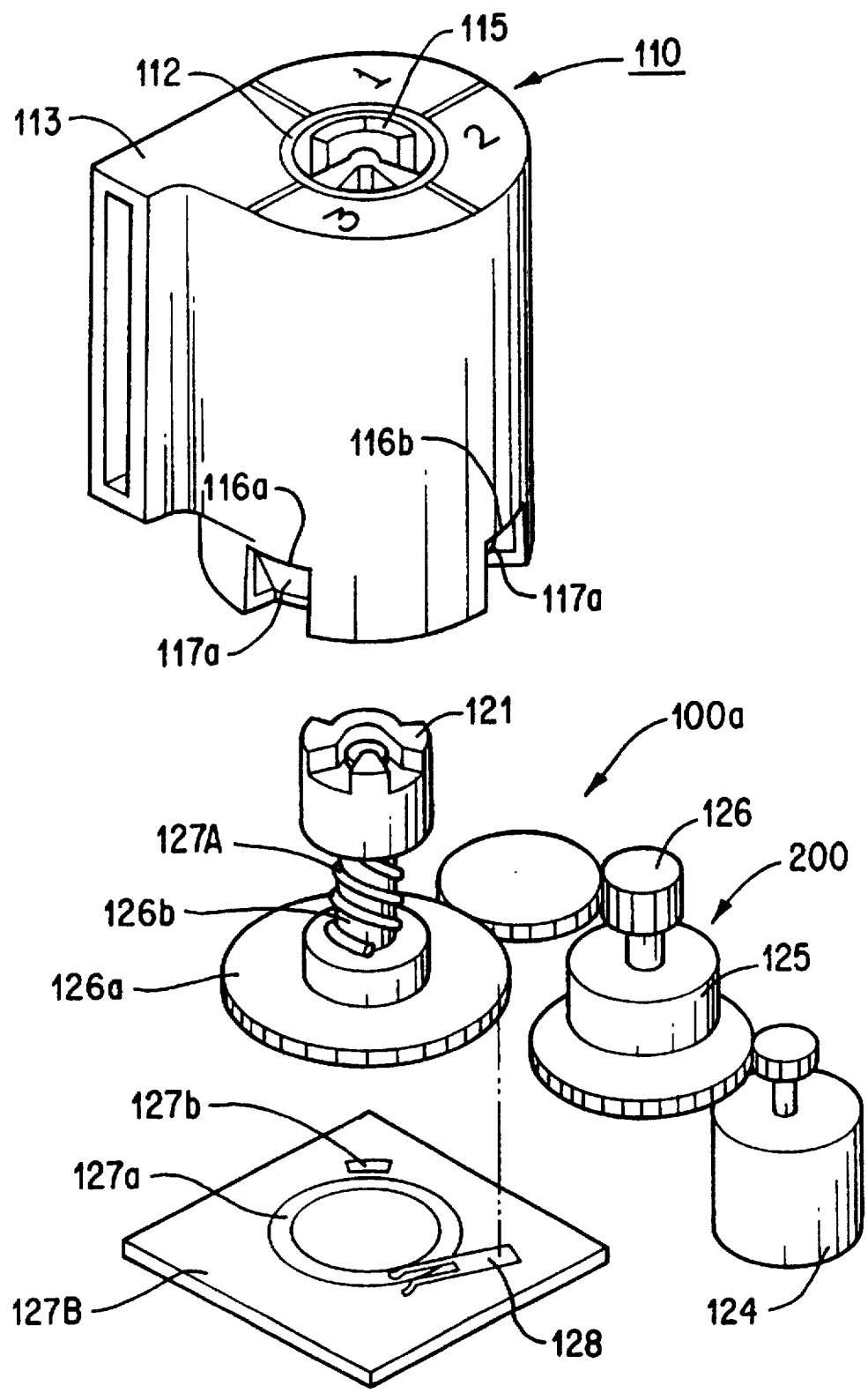
Figure 23:
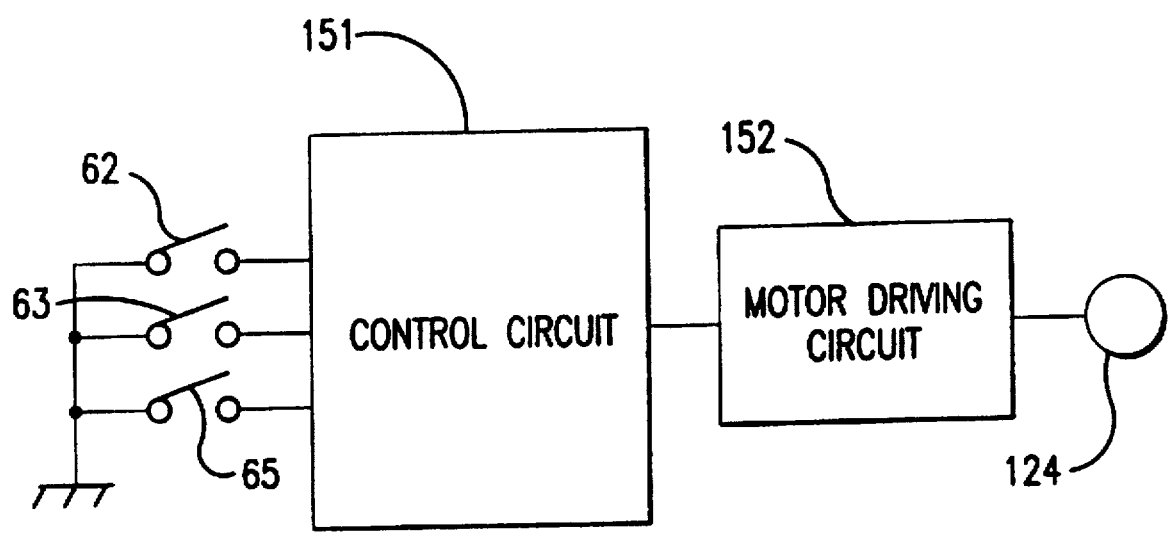
Figure 24:
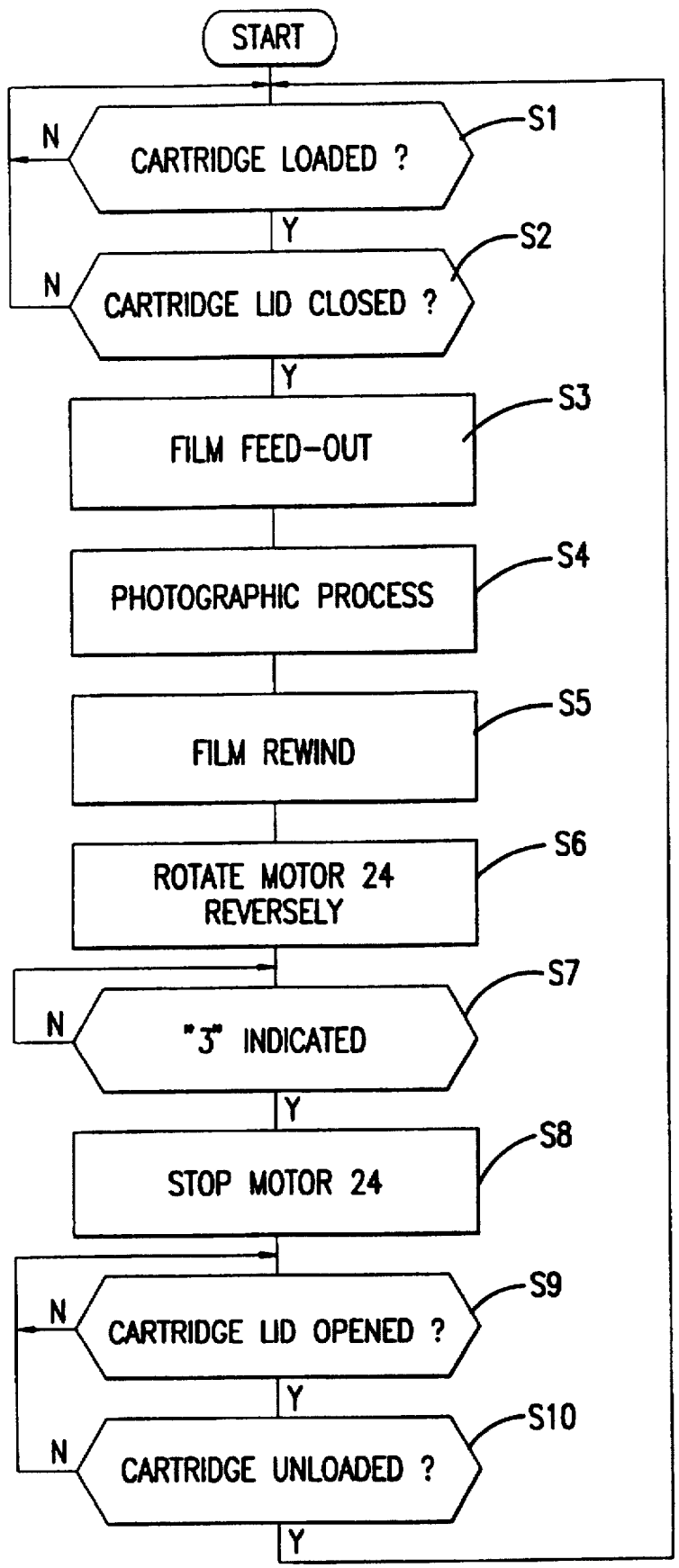
Figure 25:
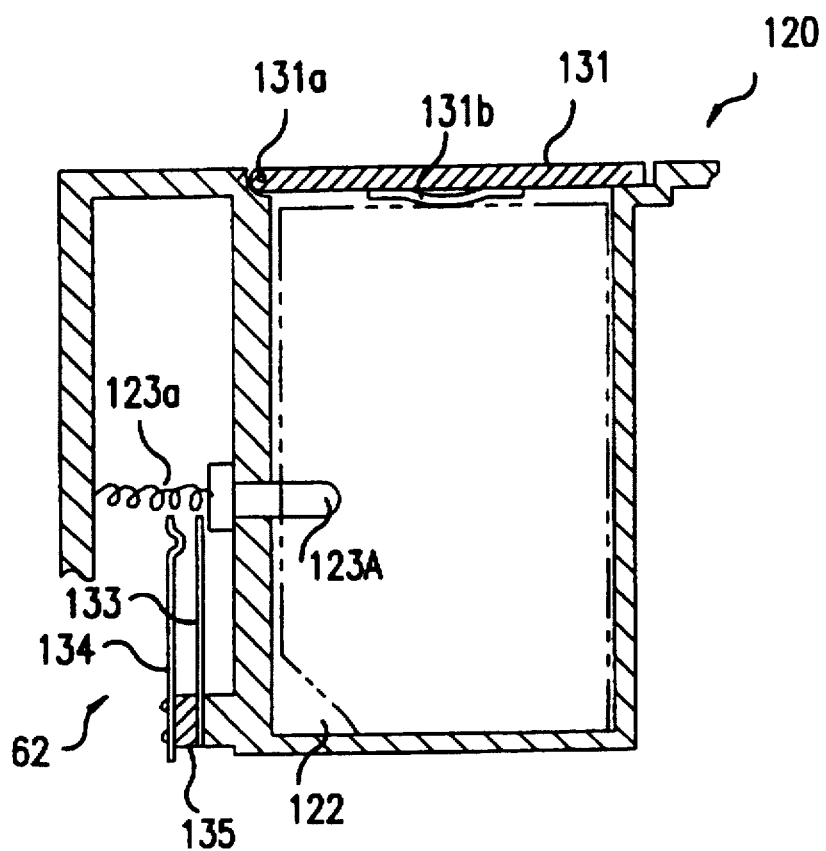
Figure 26A:
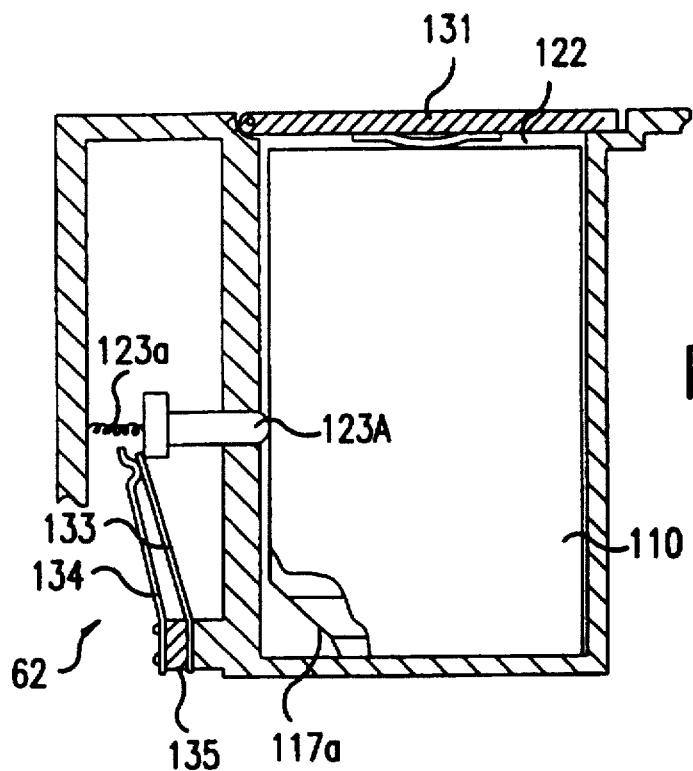
Figure 26B:
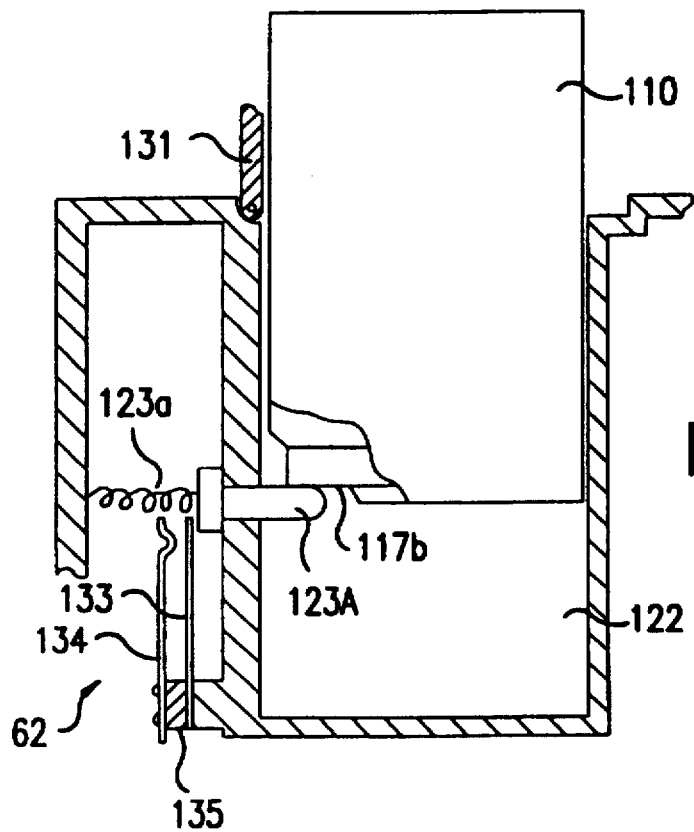
Figure 27:
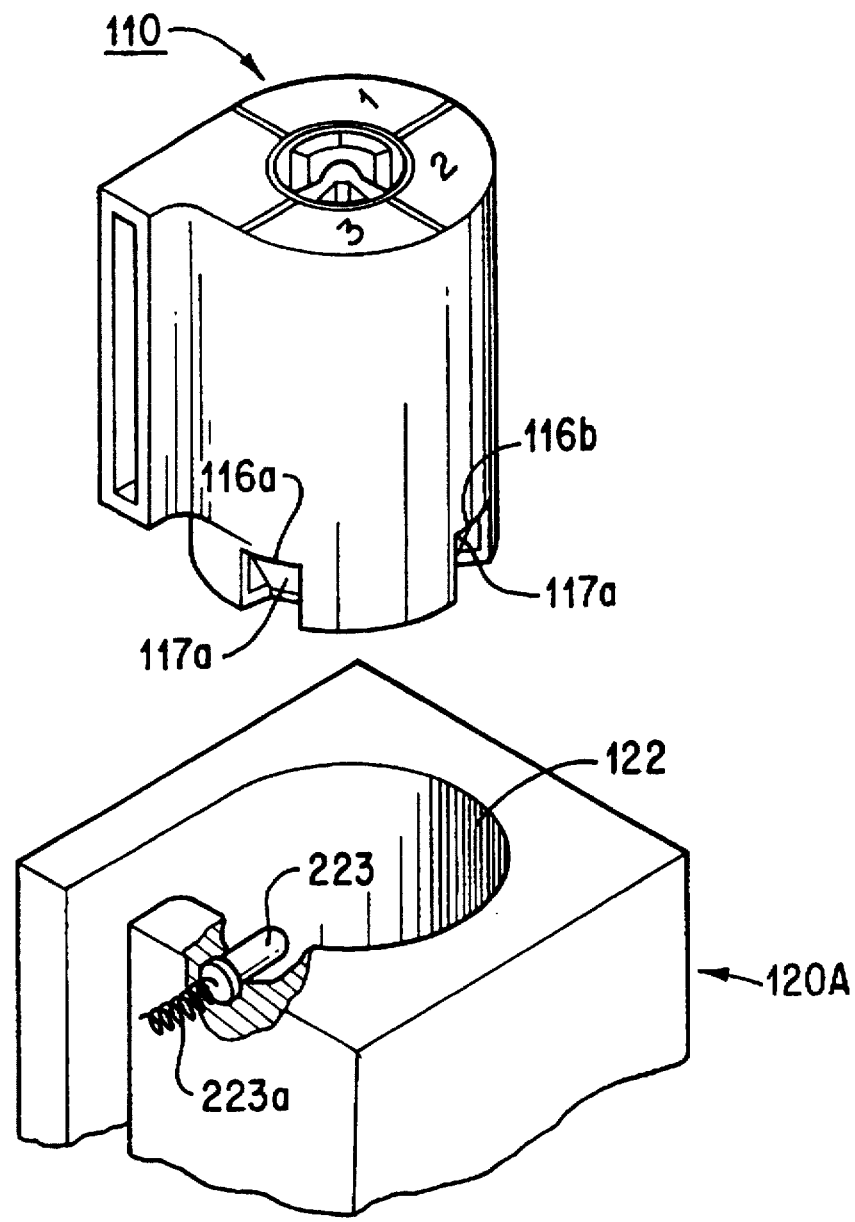
Figure 28:
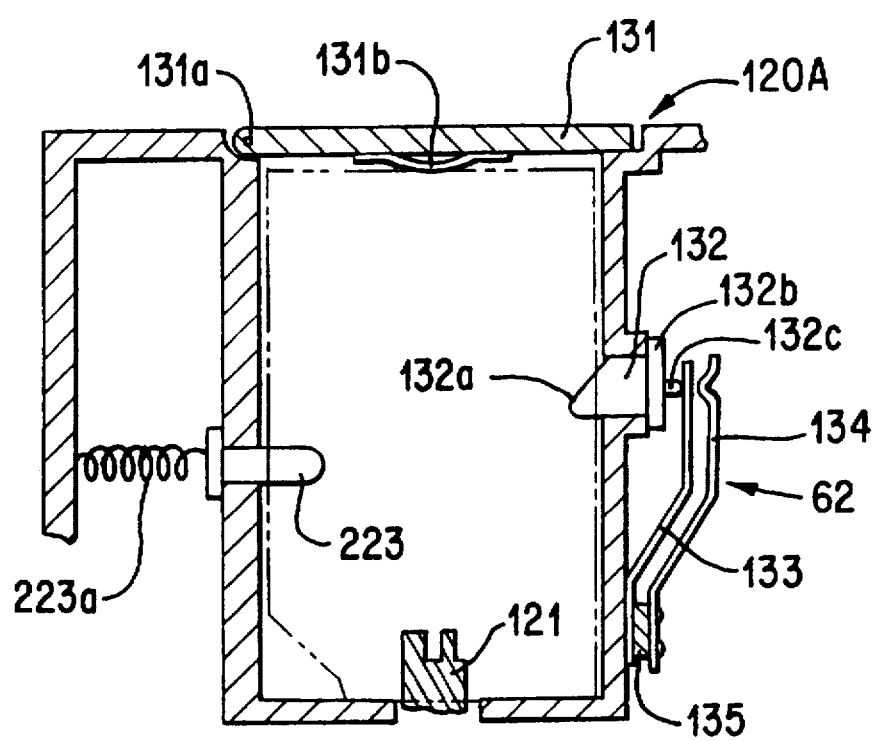
Figure 29A:
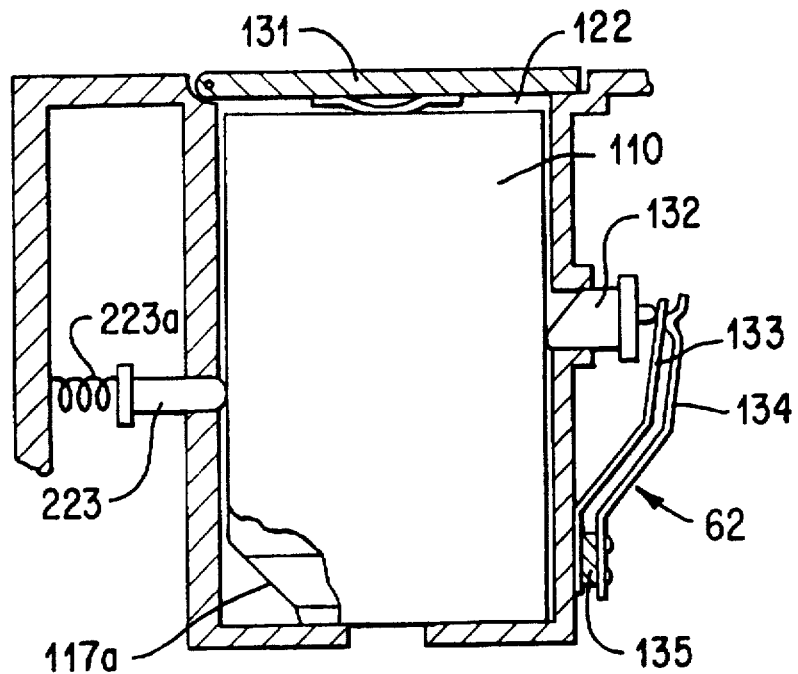
Figure 29B:
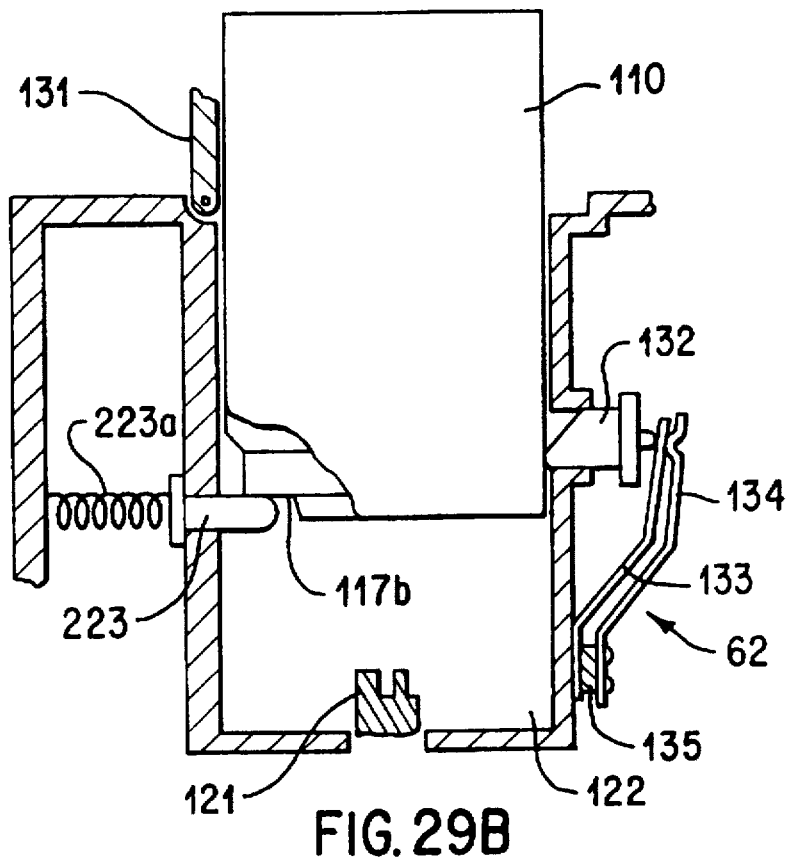
Figure 30:
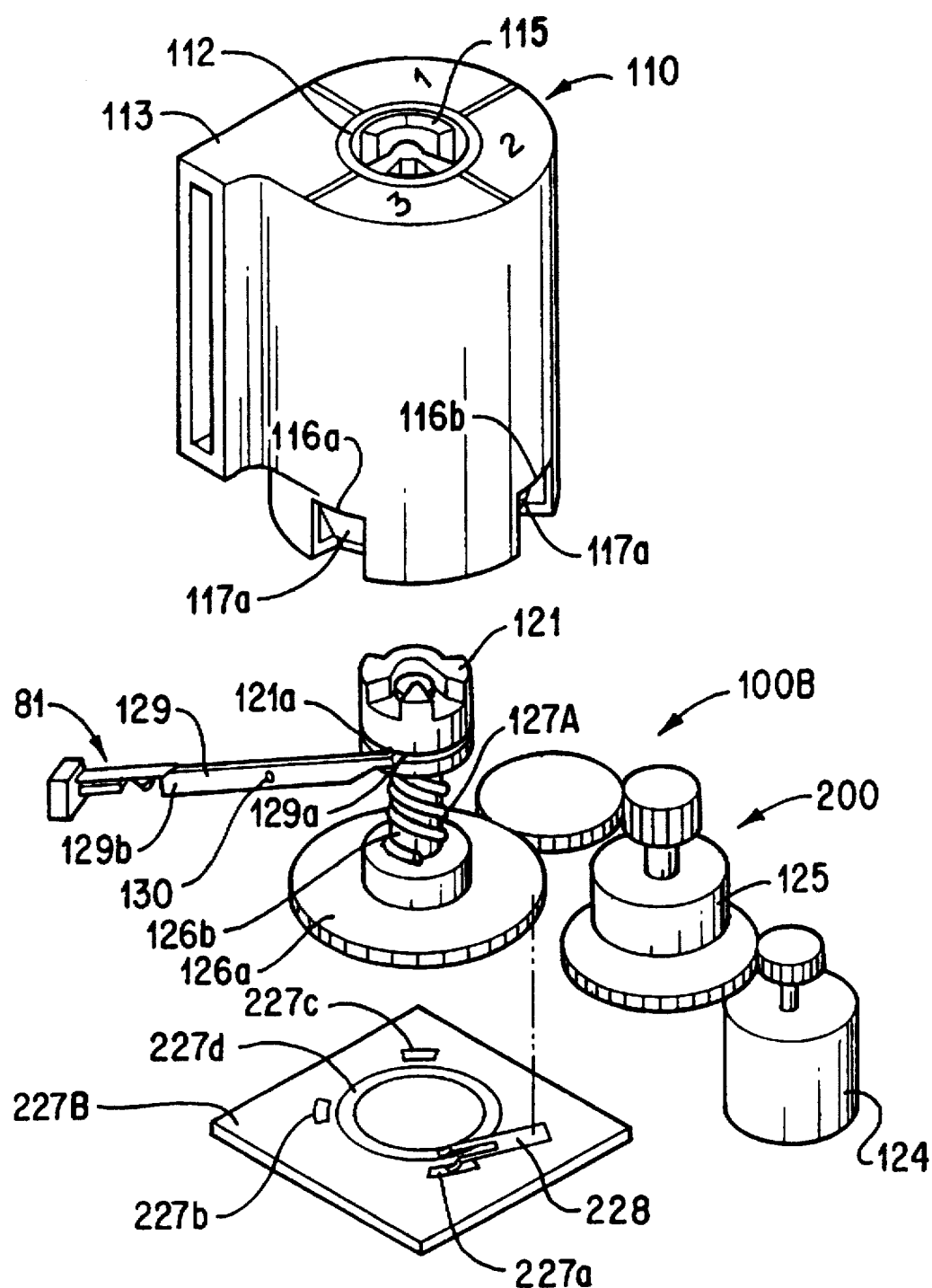
Figure 31:
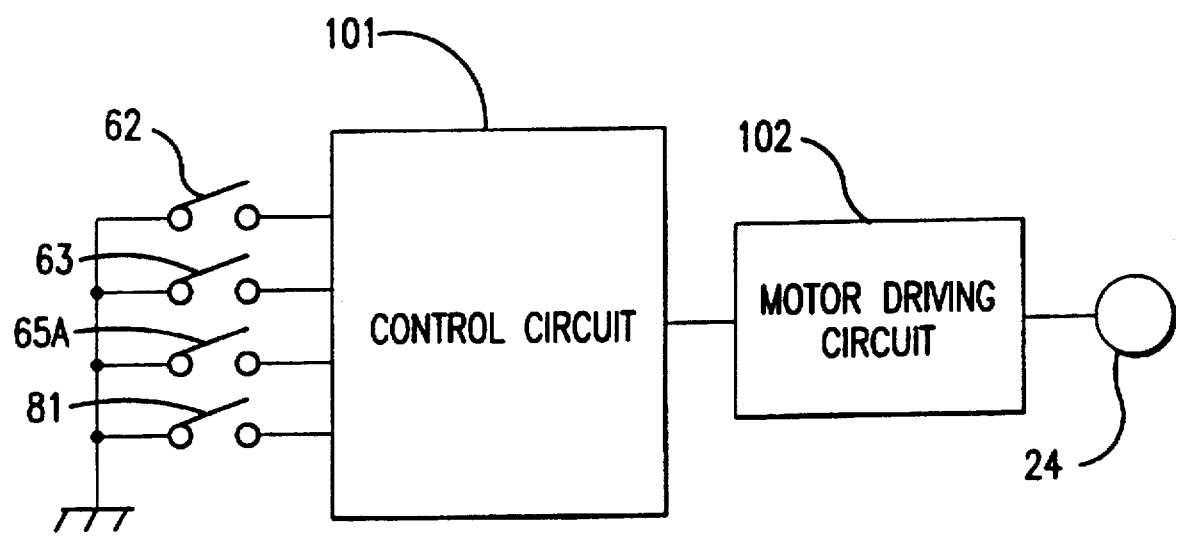
Figure 32:
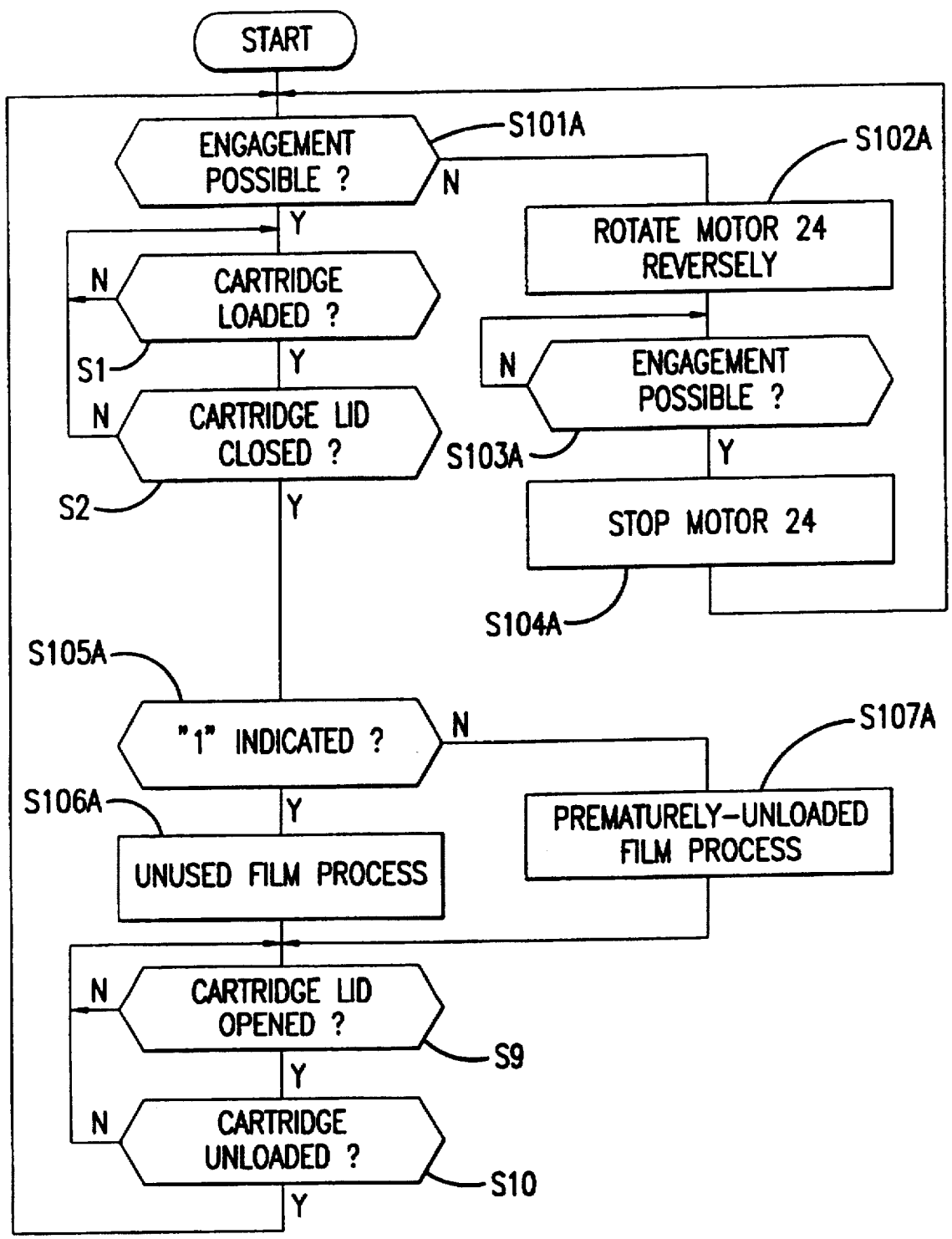
Figure 33:
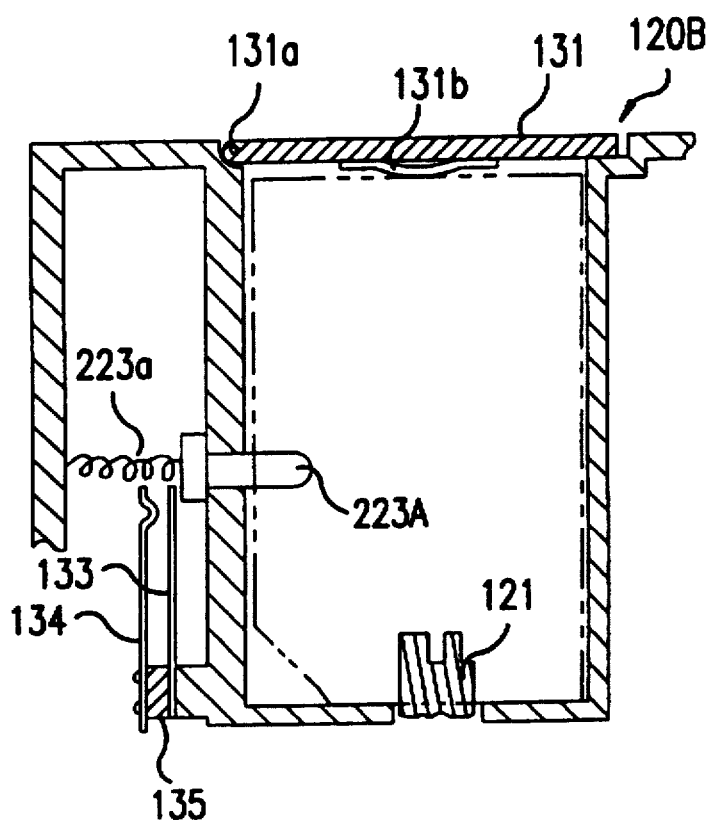
Figure 34A:
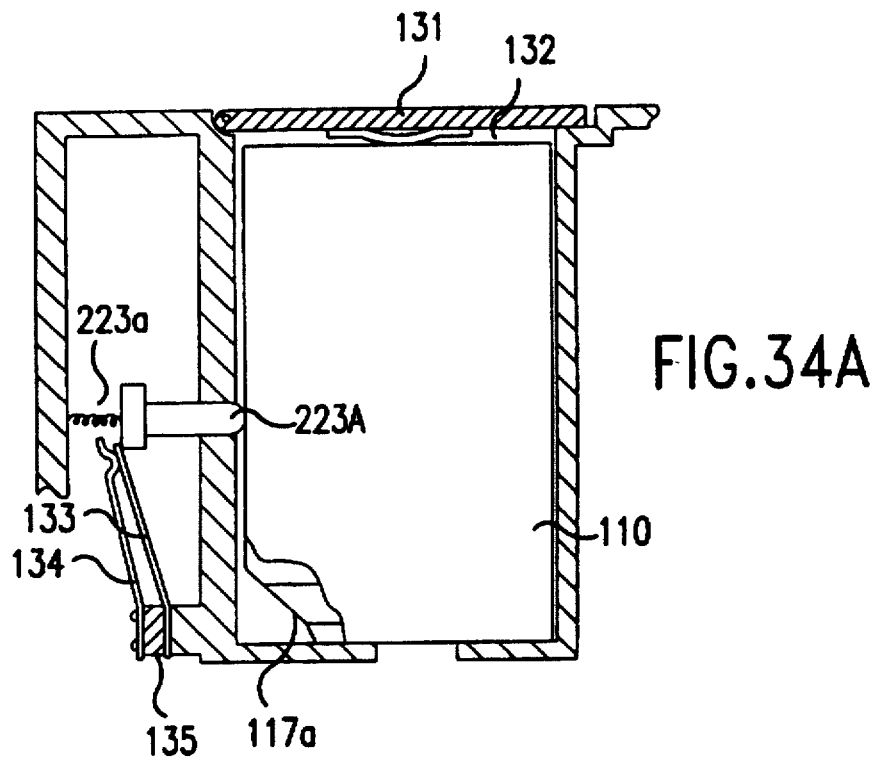
Figure 34B:
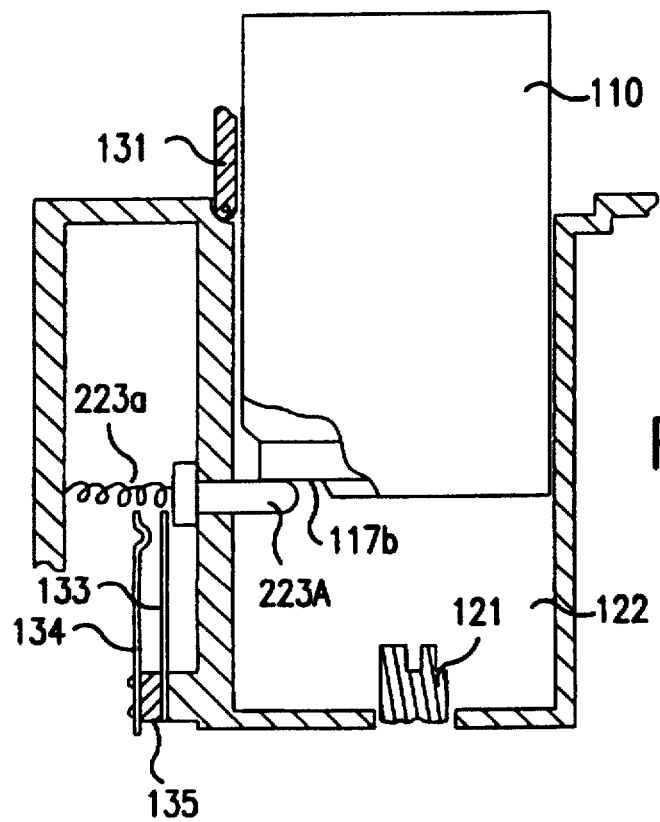
Figure 35:
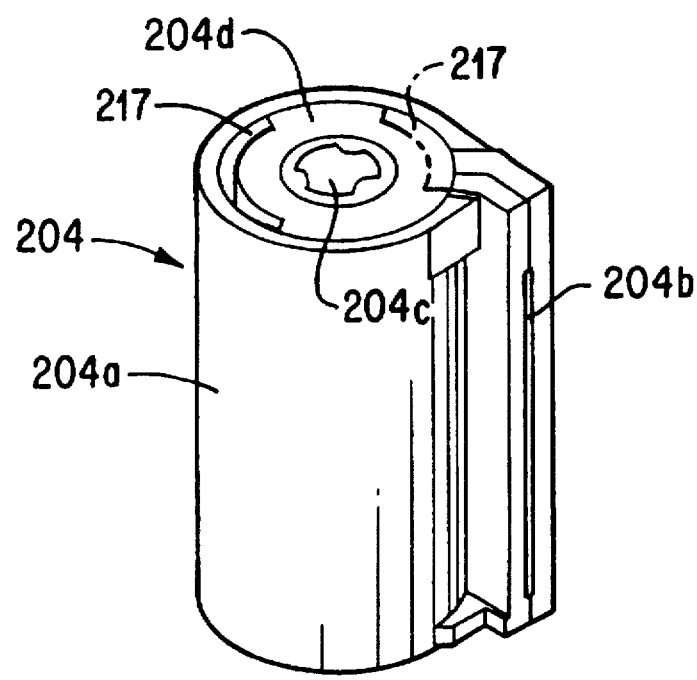
Figure 36:
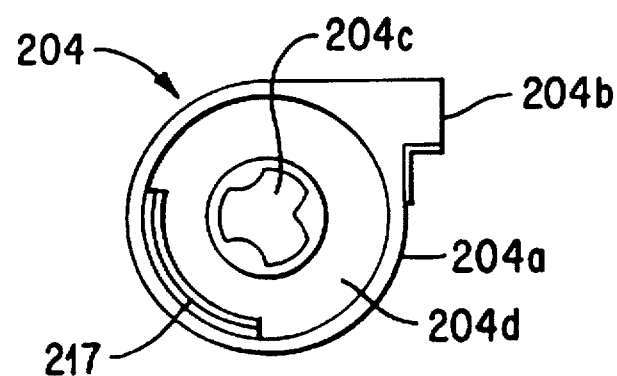
Figure 37:
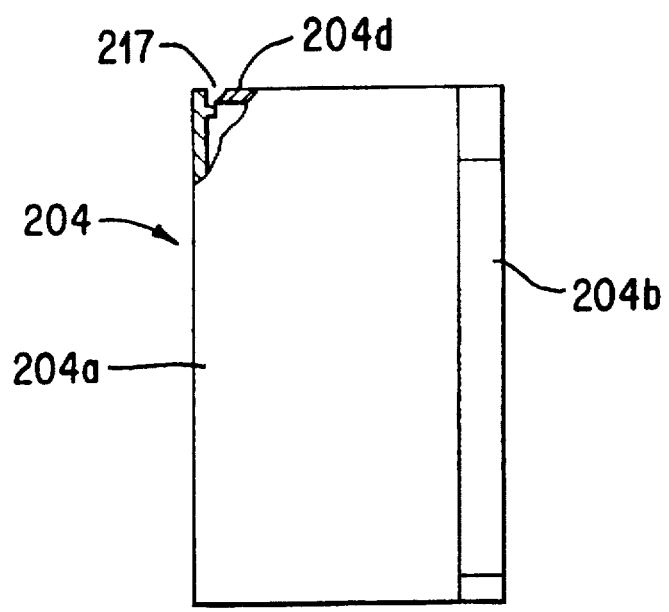

FIG. 8 is a perspective view of the film feeding mechanism at the time when the film is rewound;

FIG. 9 is a block diagram of an embodiment of a control system for the camera according to this invention;

FIG. 10 is a main flowchart for a operation procedure of the camera;

FIG. 11 is a detailed sub-flowchart for a film feed-out process;

FIG. 12 is a detailed sub-flowchart for a spool winding process;

FIG. 13 is a detailed sub-flowchart for a film wind-up process;

FIG. 14 is a detailed sub-flowchart for a film rewinding process;

FIG. 15 is a perspective view of the construction of a film cartridge for a camera of a first embodiment;

FIGS. 16A to 16C are perspective views of a film cartridge for a camera of a second embodiment;

FIG. 17 is a perspective view of a engaging portion of a cartridge spool and a driving member of the camera;

FIGS. 18A and 18B are explanatory diagrams of the engagement between the engaging portion and the driving member as shown in FIG. 17;

FIG. 19 is a cross-sectional view of a cartridge chamber of the camera according to the second embodiment;

FIG. 20 is a perspective view of a loading inhibition pin provided to the cartridge chamber as shown in FIG. 19;

FIGS. 21A and 21B are explanatory diagrams of operations of the loading inhibition pin provided to the cartridge chamber and a loading detection switch;

FIG. 22 is a perspective view of a spool driving mechanism of the camera;

FIG. 23 is a block diagram of a control system for the camera;

FIG. 24 is a flowchart for a control procedure;

FIG. 25 is a cross-sectional view of a cartridge chamber of a camera according to a third embodiment;

FIGS. 26A and 26B are explanatory diagrams of the operations of the loading inhibition pin and the loading detection switch;

FIG. 27 is a perspective view of a cartridge and a cartridge chamber according to a fourth embodiment;

FIG. 28 is a cross-sectional view of a cartridge chamber according to the fourth embodiment;

FIGS. 29A and 29B are explanatory diagrams of the operations of the loading inhibition pin and the loading detection switch;

FIG. 30 is a perspective view of a spool driving mechanism of the camera;

FIG. 31 is a block diagram for a control system;

FIG. 32 is a flowchart for a procedure for a process;

FIG. 33 is a cross-sectional view of a cartridge chamber of a modification of the camera of the fourth embodiment;

FIGS. 34A and 34B are explanatory diagrams for the operations of the loading inhibition pin and the loading detection switch;

FIG. 35 is a perspective view of a film cartridge applicable to a fifth embodiment;

FIG. 36 is a plane view of the film cartridge as shown in FIG. 35;

FIG. 37 is a side view of the partially-notched film cartridge as shown in FIG. 36;

4

Figure 38:
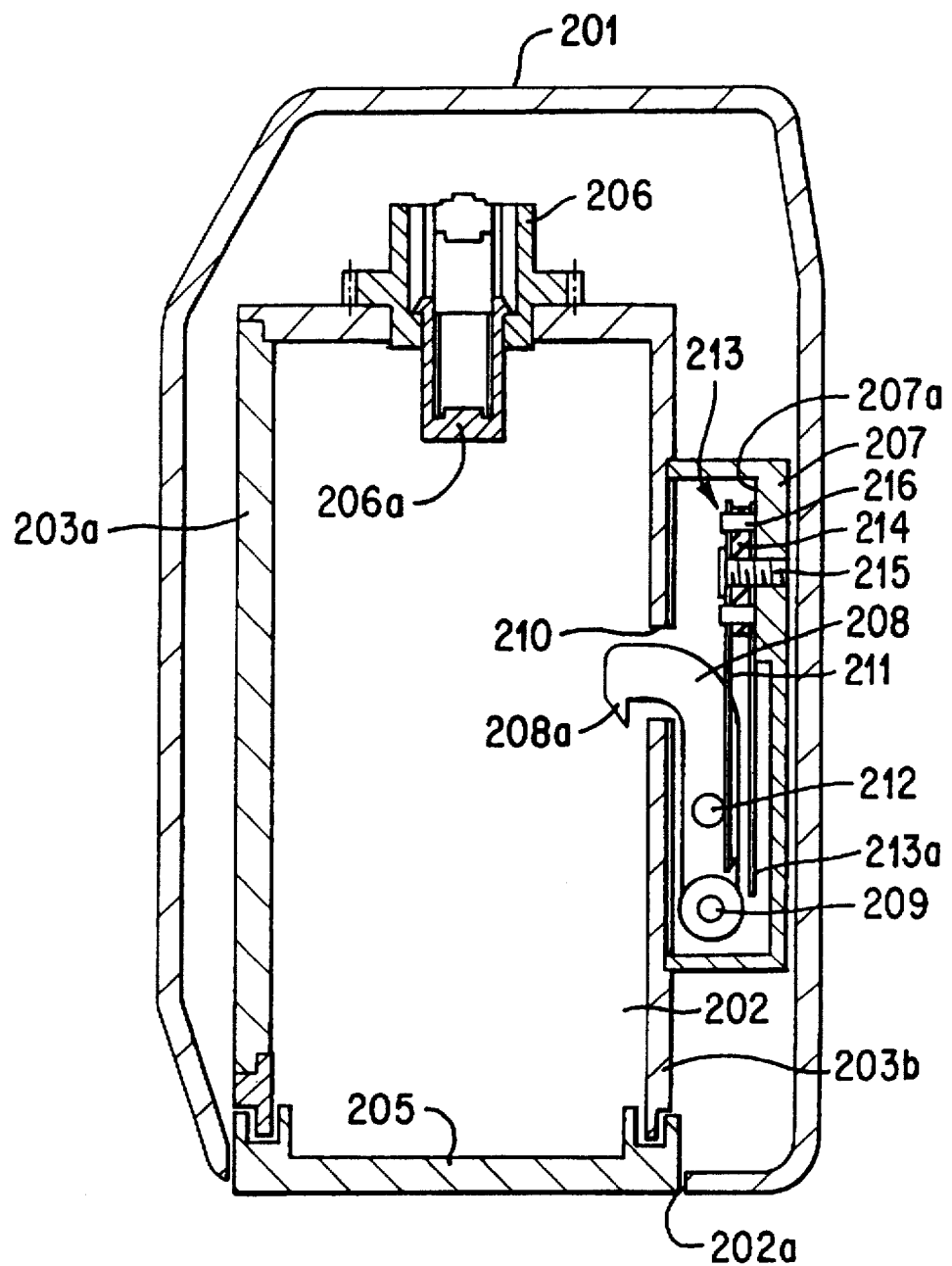
Figure 39:
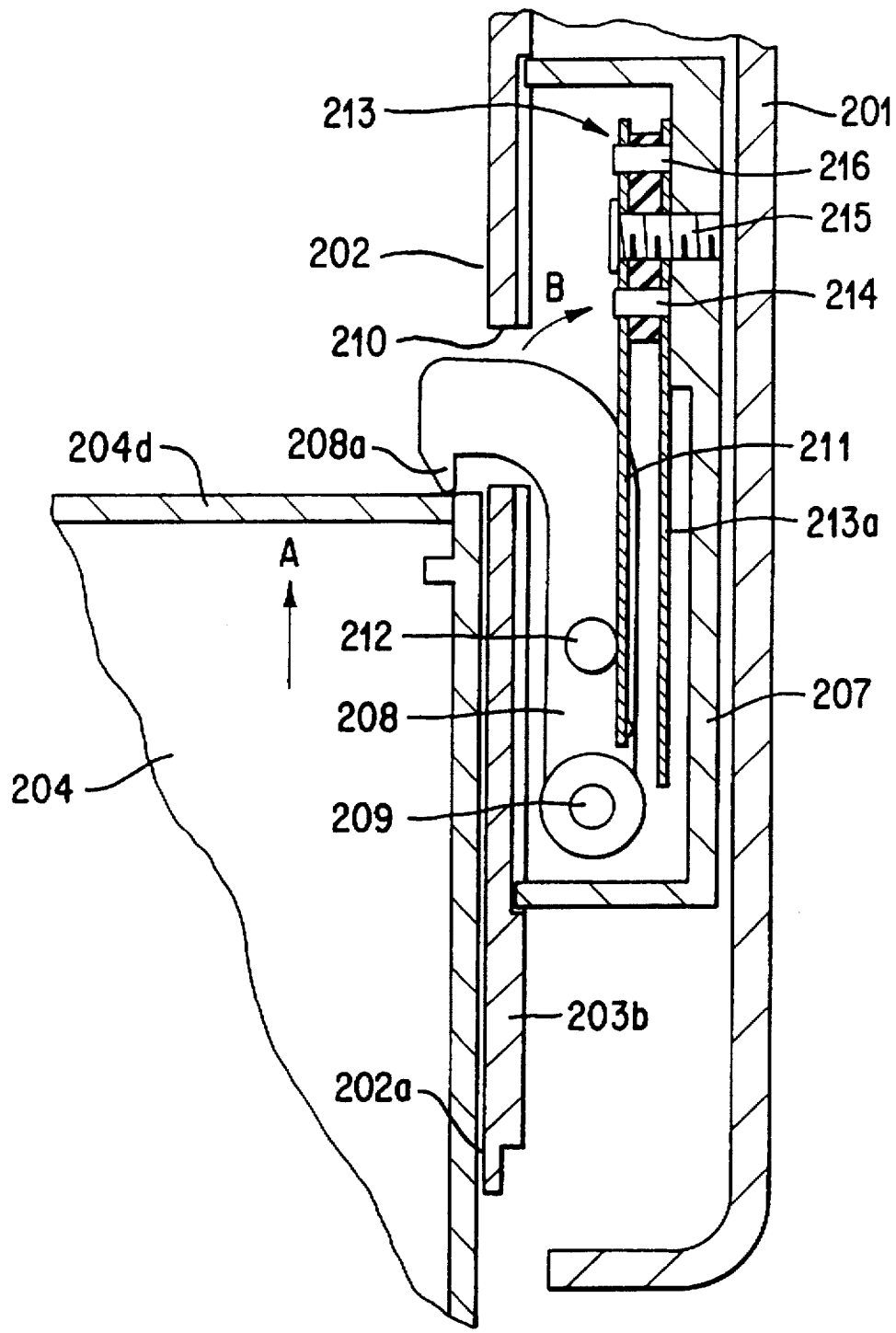
Figure 40:
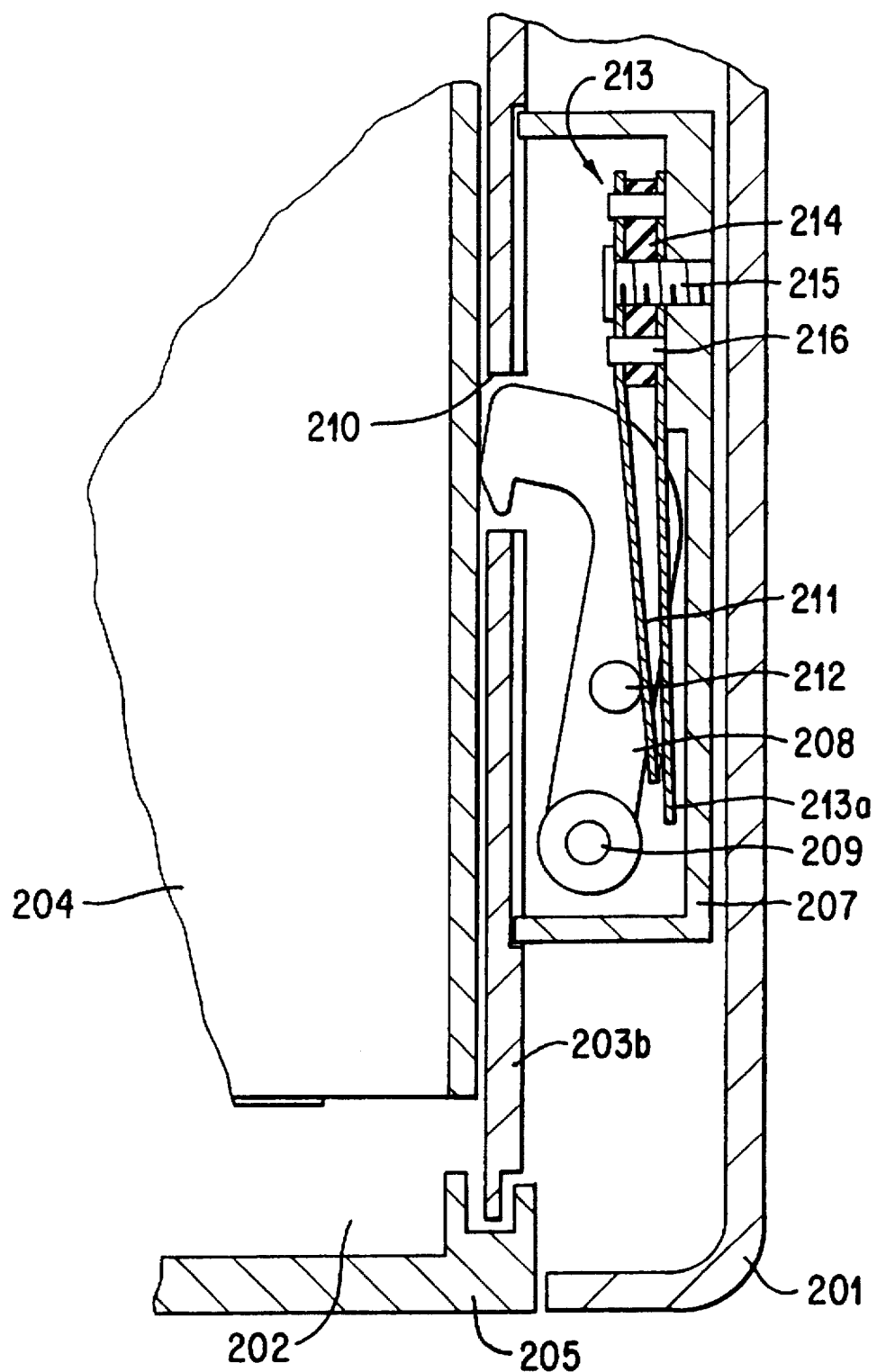
Figure 41:
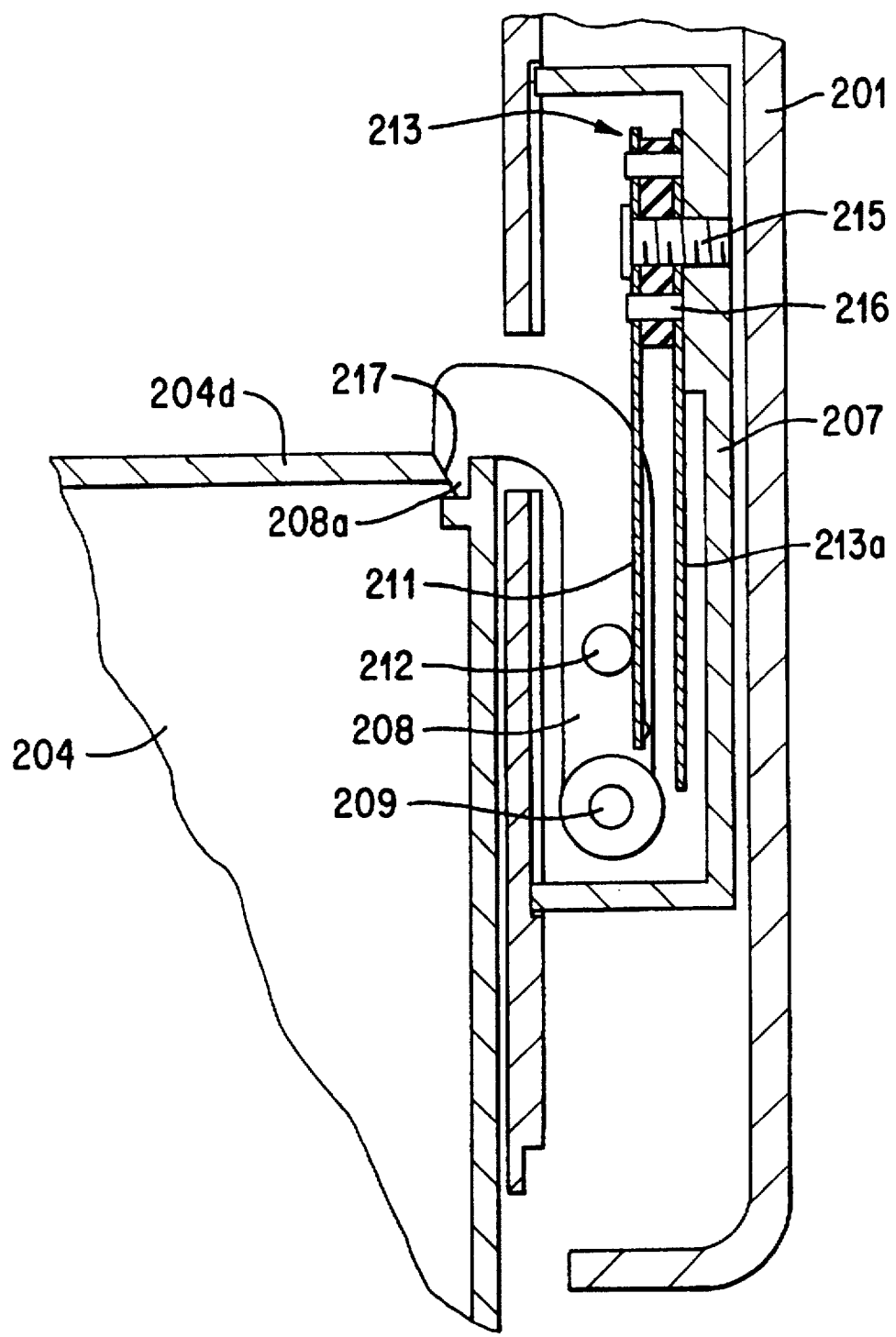
Figure 42:
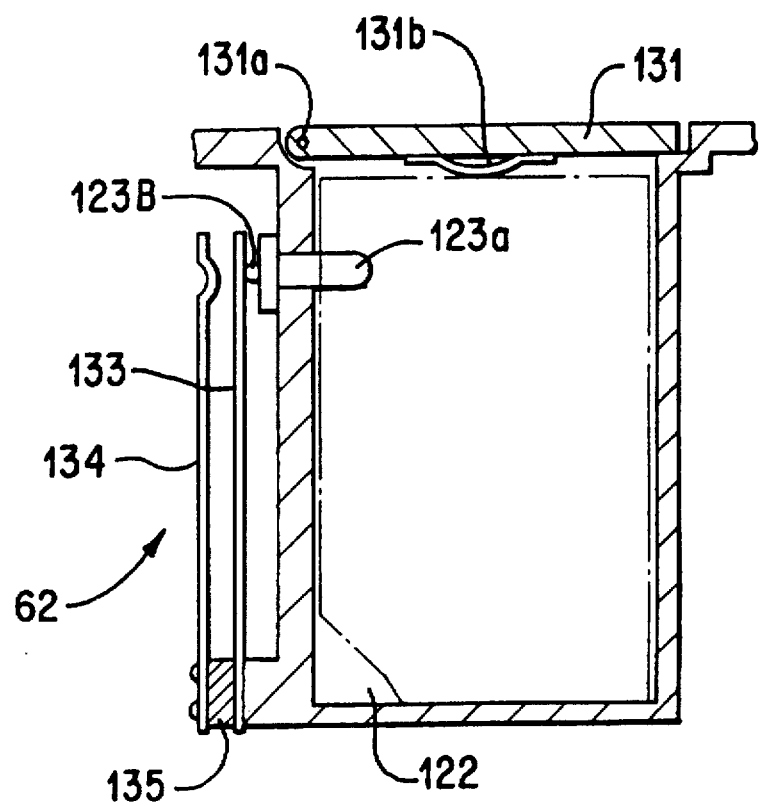
Figure 43A:
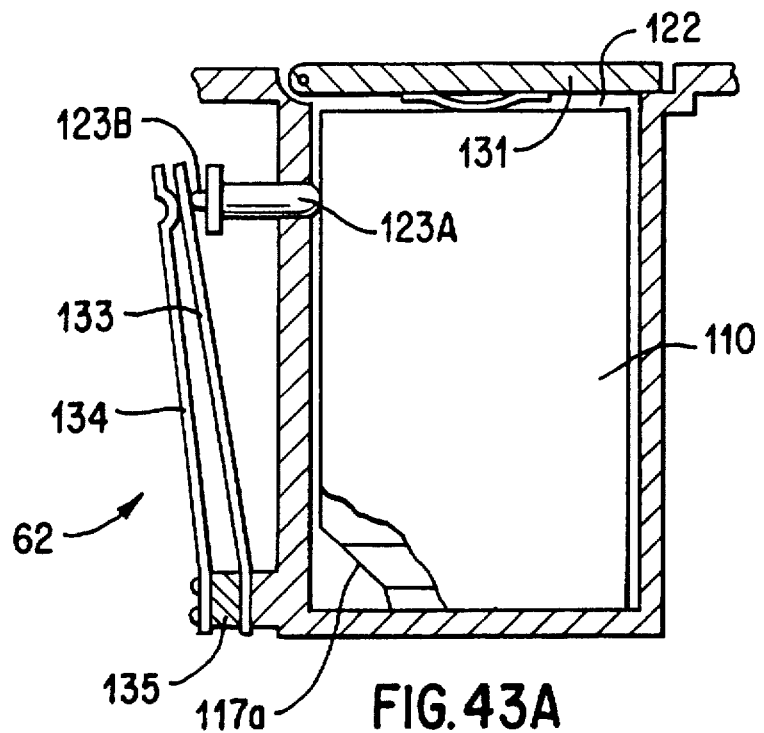
Figure 43B:
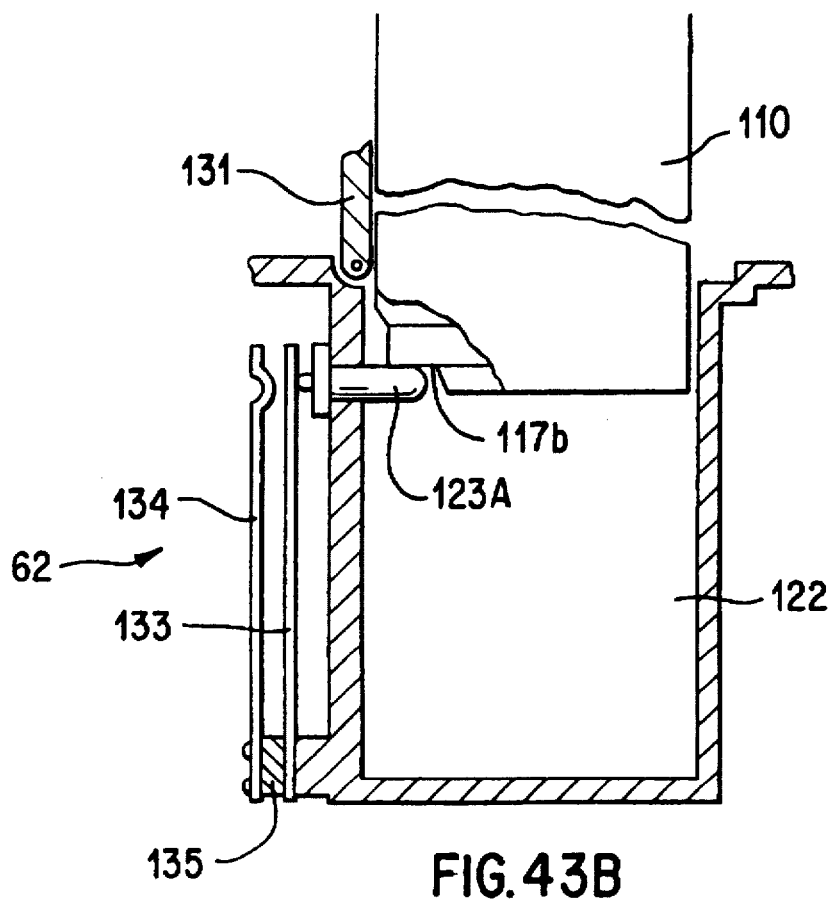
Figure 44:
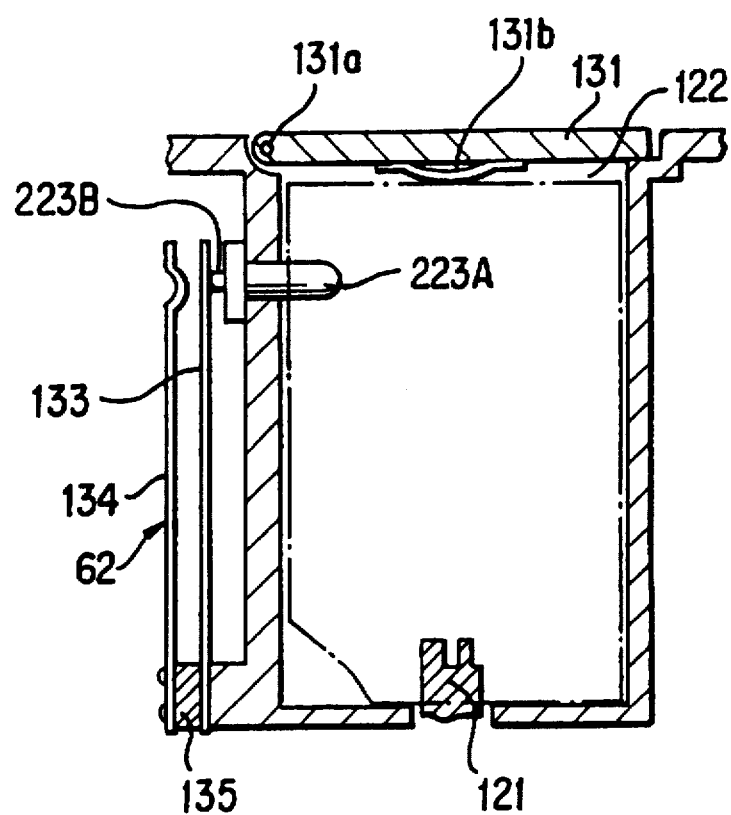
Figure 45A:
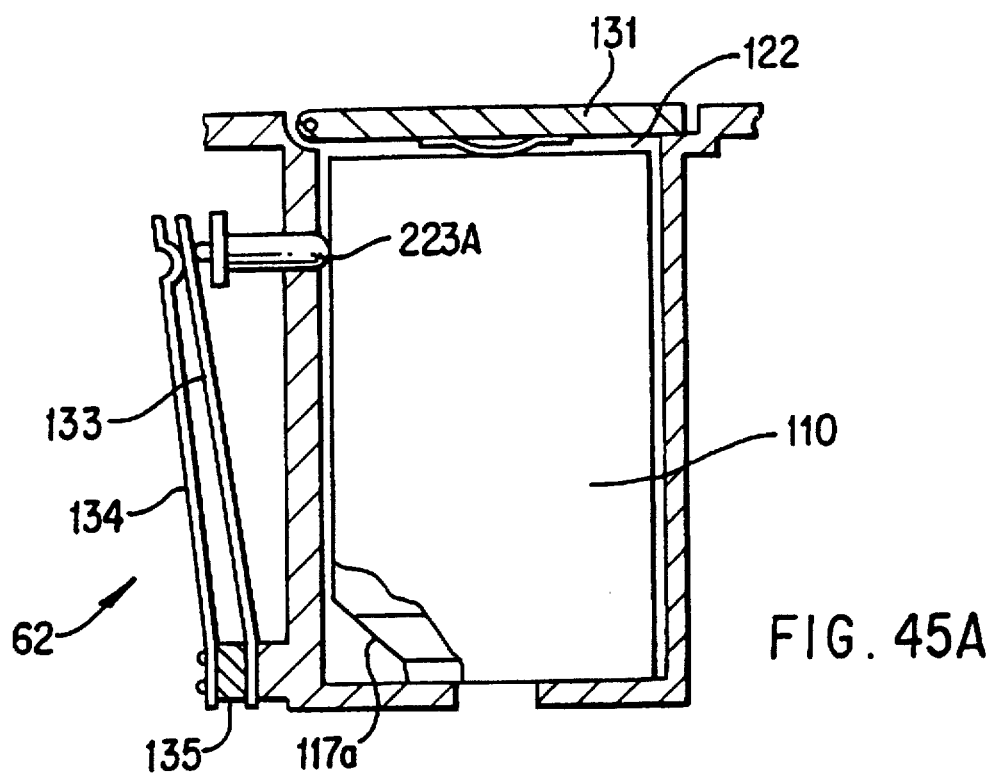
Figure 45B:
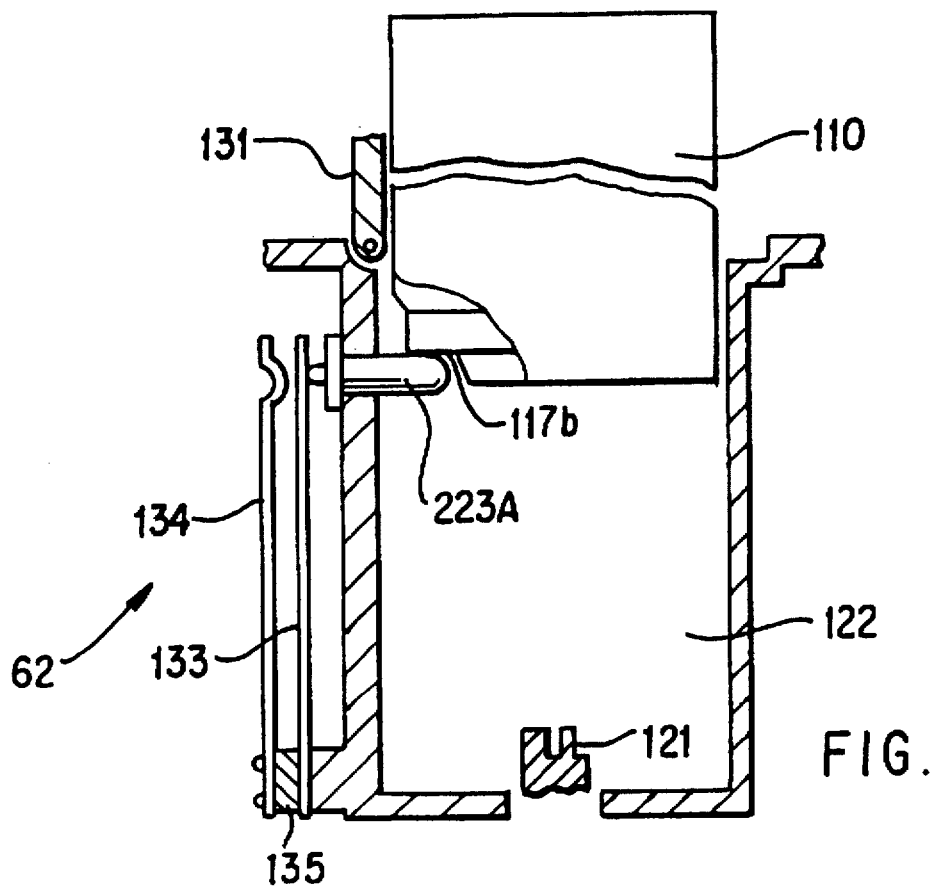

FIG. 38 is a longitudinal-sectional view of a main part of the camera according to the fifth embodiment;

FIG. 39 is a cross-sectional view of the main part of the camera of the fifth embodiment, and shows a loading process of an unused film cartridge;

FIG. 40 is a cross-sectional view of the main part, which shows the relationship between the engaging portion and the detection switch when a film cartridge is loaded;

FIG. 41 is a cross-sectional view of the main part, which shows a insertion state of a used film cartridge in the camera according to the fifth embodiment;

FIG. 42 is a cross-sectional view of the cartridge chamber of the camera according to a modification of the third embodiment;

FIGS. 43A and 43B are explanatory diagrams of the loading inhibition pin and the loading detection switch;

FIG. 44 is a cross-sectional view of the cartridge chamber of a camera according to a modification of the fourth embodiment; and FIGS. 45A and 45B are explanatory diagrams for the operations of the loading inhibition pin and the loading detection switch.

DETAILED DESCRIPTION OF THE PREFERRED EMBODIMENTS

First Embodiment

A first embodiment of the camera according to this invention will be described with reference to FIGS. 1 to 14.

Figure 1:
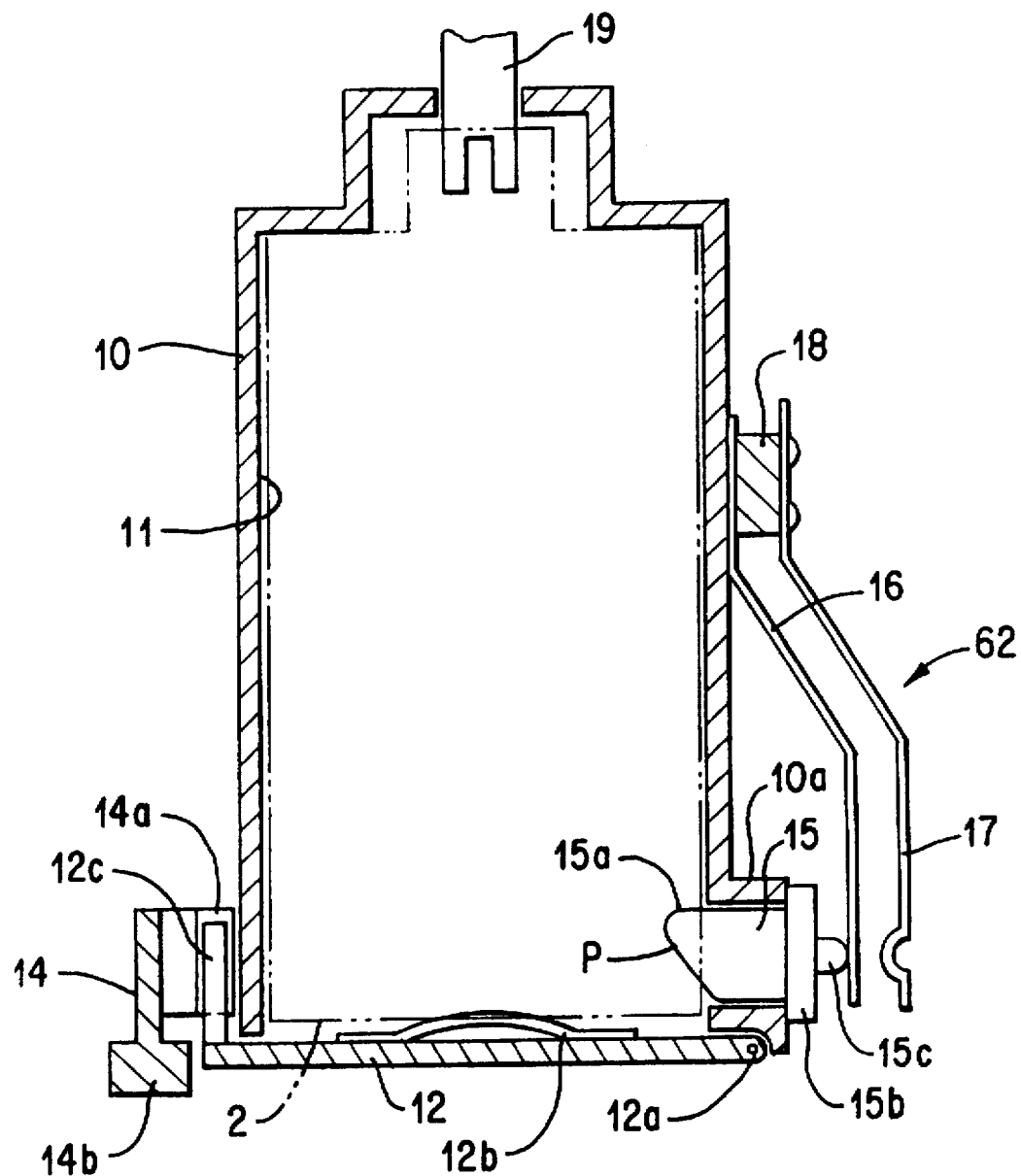
FIG. 1 is a cross-sectional view of a main part of a camera, and shows a cartridge detection switch.

FIG. 1 is a cross-sectional view of a main part of the camera of the first embodiment. A reference numeral 10 represents a camera body, and a reference numeral 11 represents a cartridge chamber formed in the camera body 10. The cartridge 2 shown in FIG. 15 can be inserted and drawn out from the cartridge chamber 11 in its axial direction at the lower side of the cartridge chamber 11. A reference numeral 12 represents a cartridge lid for opening and closing the cartridge chamber 11, which is provided at the bottom surface of the camera body in such a manner as to be rotatable around a pivot pin 12a. The cartridge lid 12 is provided with a spring 12b for urging the cartridge 2 in the axial direction of the cartridge 2 at the inner surface thereof, and a locking hook portion 12c at the tip portion thereof which is projected therefrom.

A reference numeral 14 represents an engaging member for locking the cartridge lid 12, and it has a lock portion 14a which is engageable with the hook portion 12c of the cartridge lid 12, and a tab 14b which is used to move the engaging member 14 at the outside. The construction of these elements will be described later.

(Cartridge-load detection switch 62)

A reference numeral 15 represents a detection pin for detecting the load and non-load of the cartridge. The detection pin 15 includes a pin body 15a having a slant surface P at the tip portion thereof, a flange formed integrally with the pin body 15a, and a projection portion 15c projected from the flange 15b. A guide sleeve 10a for accommodating the pin body 15a in such a manner that the pin body 15a is laterally slidable is provided to the lower end portion of the camera body 10 in the neighborhood of the cartridge lid 12. The pin body 15a is projected through the guide sleeve 10a into the cartridge chamber, and the projection amount of the pin body 15a into the cartridge chamber is restricted by the contact between the flange 15b and the peripheral edge portion of an aperture of the guide sleeve 10a.

A reference numeral 62 represents a cartridge-load detection switch comprising a pair of armatures 16 and 17 which are designed in the form of a plate spring, and the base portions of the respective armatures 16 and 17 are secured to the outer peripheral surface of the camera body 10 in such a manner that an insulator 18 is sandwiched therebetween. Each of the armatures 16 and 17 extends downwardly, and the tip portion of the armature 16 urges the detection pin 15 through the projection portion 15c in a left direction of FIG. 1. The armature 16 is grounded, and the armature 17 is connected to an input port $I_1$ of a CPU 60 as described later.

Figure 2:
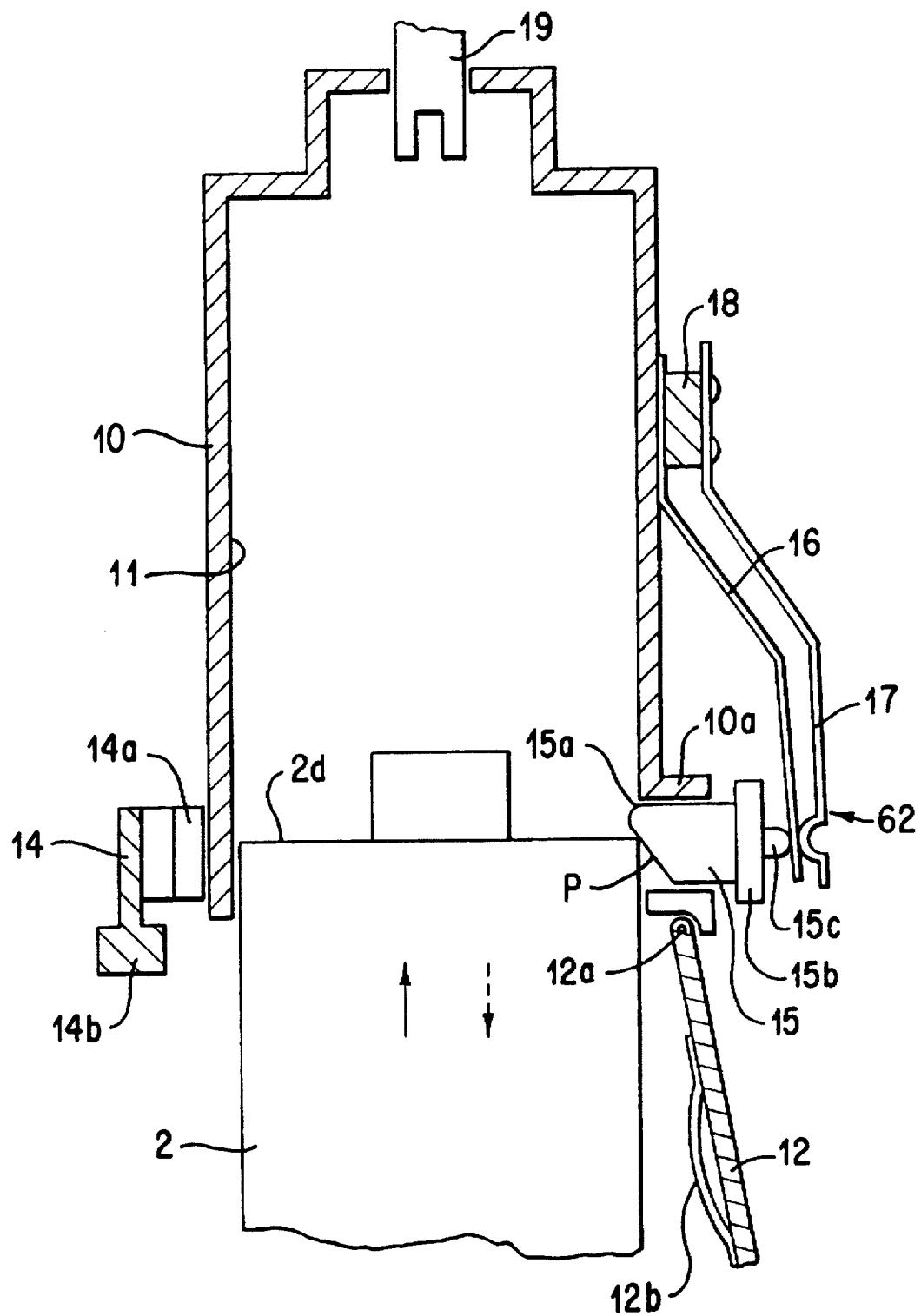
FIG. 2 is a cross-sectional view of the camera, and shows a state where a cartridge is halfway or partially loaded or drawn out.

When the cartridge 2 is not loaded into the cartridge chamber 11, the armatures 16 and 17 are in a non-contact state as shown in FIG. 1. Upon loading the cartridge 2, the cartridge 2 is contacted with the slant surface P of the pin body 15a at the time when only the upper portion of the cartridge 2 is inserted into the cartridge chamber 11. When the cartridge 2 is further slightly inserted into the cartridge chamber to shift the cartridge 2 to a state as shown in FIG. 2, the detection pin 15 is pushed by the cartridge 2 through the slant surface P, so that it is slid along the guide sleeve 10a in the right direction. Through the rightward movement of the detection pin 15, the armature 16 is pushed by the projection 15c in the right direction and it is contacted with the armature 17. Through this operation, the cartridge-load detection switch 62 is switched on, and the input port $I_1$ of the CPU 60 is kept to a low-level state.

Figure 3:
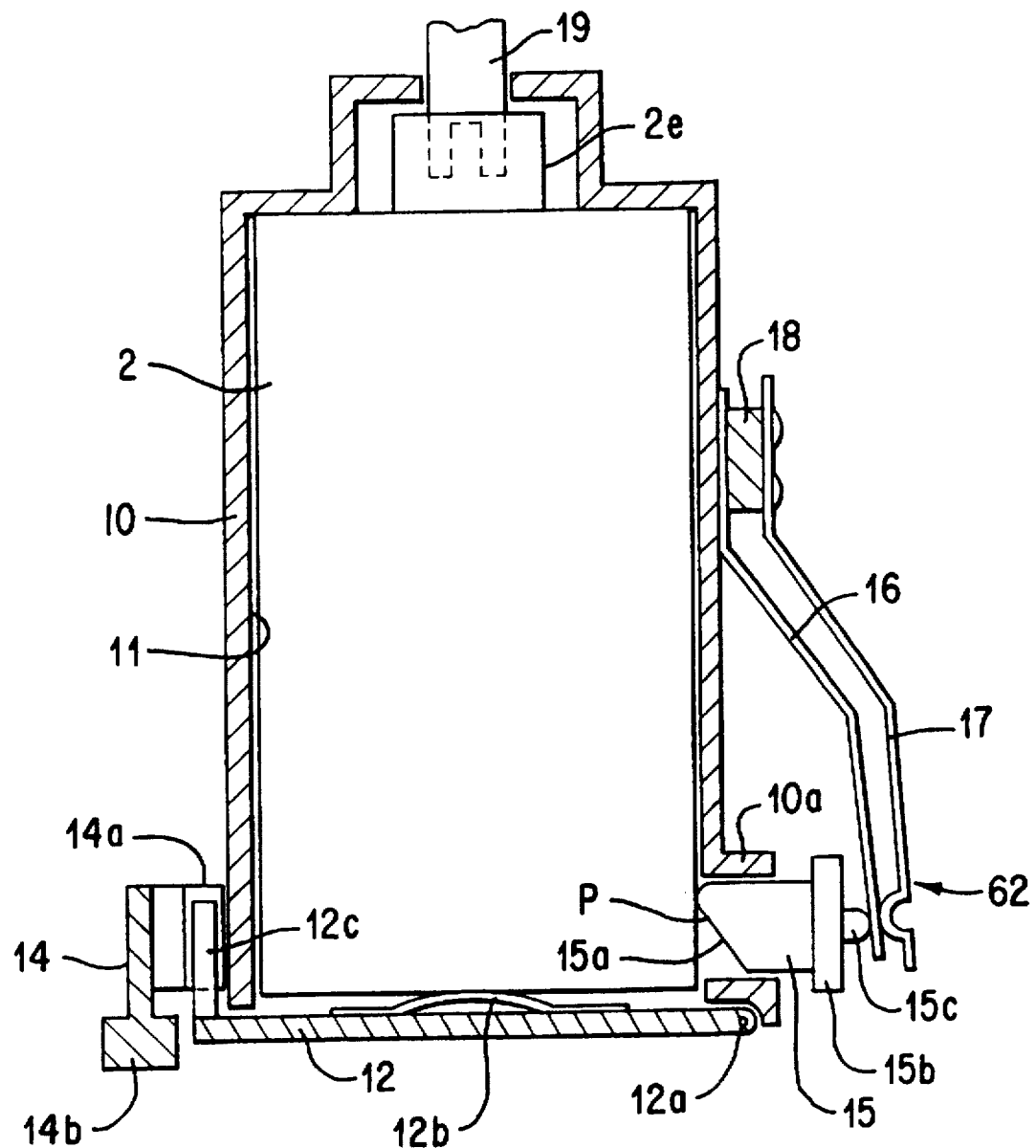
FIG. 3 is a cross-sectional view of the camera, and shows a state where the cartridge is completely stored.

A reference numeral 19 represents an engaging and driving member for rotating a spool shaft 2e in engagement with an engaging portion 2c of the cartridge 2. When the cartridge 2 is completely inserted into the cartridge chamber 11, as shown in FIG. 3, the spool shaft 2e is engaged with the engaging and driving member 19. Thereafter, the cartridge lid 12 is closed, so that the cartridge 2 is upwardly urged by the spring 12b. In this state, the cartridge-load detection switch 62 is kept to the on-state.

On the other hand, when the cartridge 2 is unloaded from the cartridge chamber 11, the cartridge-load detection switch 62 is kept to the on-state until the cartridge 2 is drawn out and a positional relationship between the cartridge 2 and the cartridge chamber 11 as shown in FIG. 2 is attained. When the cartridge 2 is further drawn out to substantially pass over the detection pin 15 as shown in FIG. 2, the cartridge 2 is retracted from the slant surface P of the pin body 15a, so that the detection pin 15 is driven in the left direction of FIG. 2 with an urging force of the armature 16 through the projection 15c. Through this operation, the armature 16 is separated from the armature 17, and thus the cartridge-load detection switch 62 is shifted to the off-state. That is, the switch 62 is switched off when the cartridge 2 is substantially completely drawn out from the cartridge chamber 11.

(Cartridge lid locking mechanism)

Figure 4:
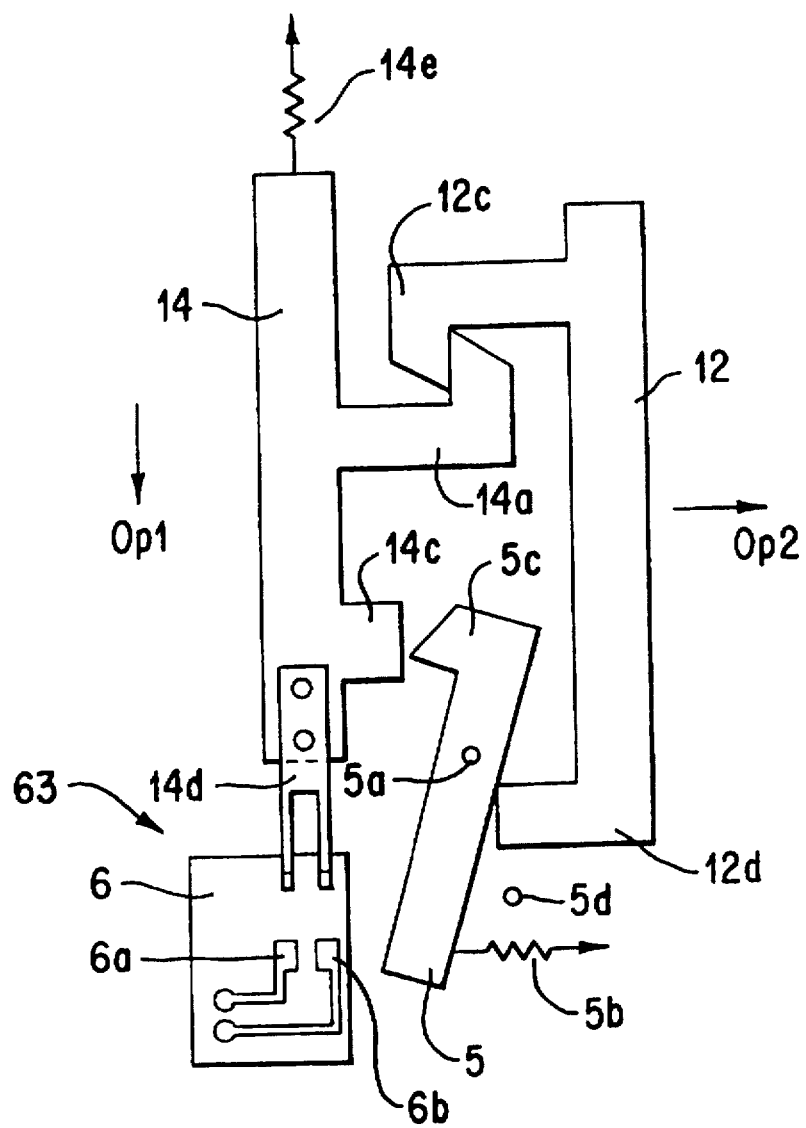
FIGS. 4 and 5 are schematic diagrams of the construction of a locking device for a cartridge lid.
Figure 5:
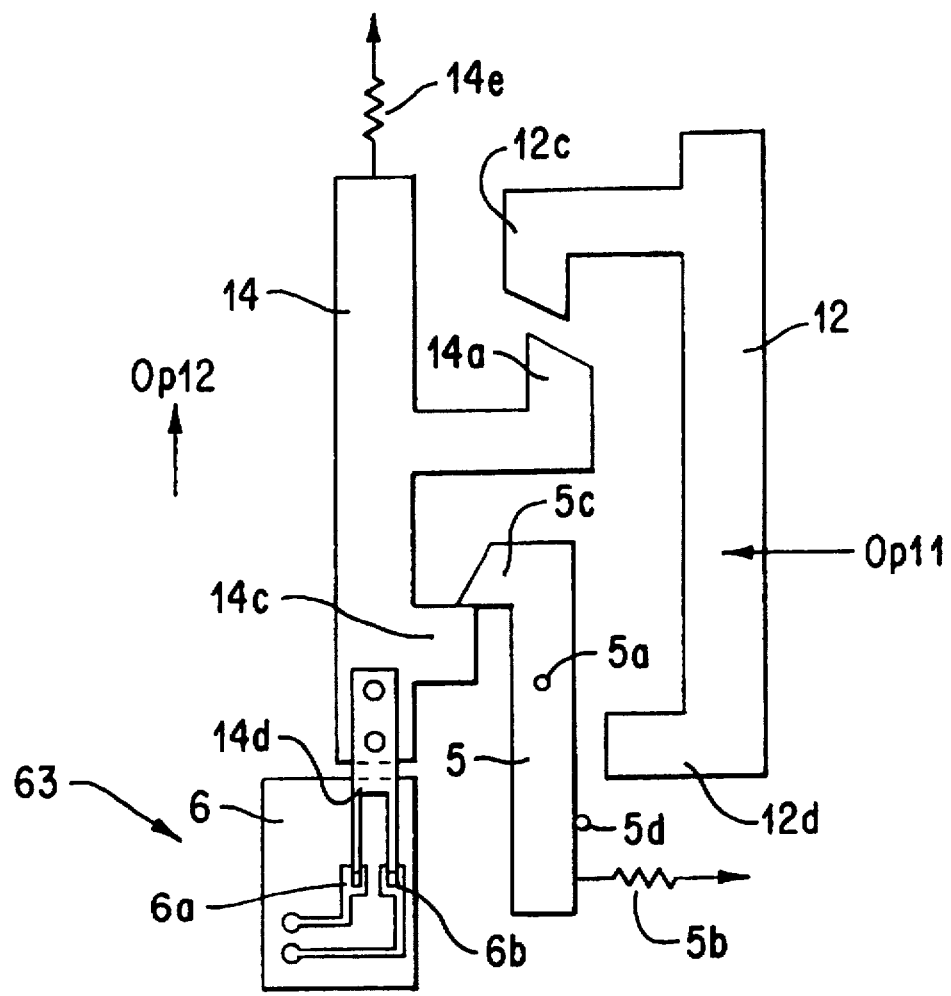

FIGS. 4 and 5 are schematic diagrams of a lock mechanism for the cartridge 12.

The engaging member 14 is so designed as to be movable between an engagement position as shown in FIG. 4 and a release position as shown in FIG. 5, and it is usually urged toward the engagement position (upwardly) by a spring 14e. The cartridge lid 12 is locked to the camera body 10 through engagement between the lock portion 14a of the engaging member 14 and the hook portion 12c of the cartridge lid 12.

A reference numeral 5 represents a lever which is rotatable around a shaft 5a. The lever 5 is usually urged in a counterclockwise direction of FIG. 4 by a spring 5b, and the counterclockwise rotation of the lever 5 is restricted by a pin 5d. When the hook portion 12c is not in engagement with the lock portion 14a (when the cartridge lid 12 is opened), the hook portion 5c of the lever 5 is engaged with the projection 14c of the engaging member 14 as shown in FIG. 5, so that the movement of the engaging member 14 to the engagement position is prevented.

A reference numeral 6 represents an insulating substrate having two conductive patterns 6a and 6b, and when the engaging member 14 is in the release position as shown in FIG. 5, a slide brush 14d provided at the end portion of the engaging member 14 is in contact with the conductive patterns 6a and 6b. The conductive pattern 6a is grounded while the conductive pattern 6b is connected to an input port $I_2$ of the CPU 60 as described later. Therefore, when the engaging member 14 is in the release position, the input port $I_2$ is in the low-level state. The conductive patterns 6a and 6b and the brush 14d constitute a cartridge-lid open/close state detection switch 63.

In FIG. 5, when the cartridge lid 12 is manipulated to be closed in a direction as indicated by an arrow Op11, the hook portion 12c is moved to such a position that it is engageable with the lock portion 14a, and the projection 12d is contacted with the lever 5 to clockwise rotate the lever 5 against the urging force of the spring 5b. The hook portion 5c of the lever 5 is retracted from the projection 14c of the engaging member 14, so that the engaging member 14 is moved upwardly, that is, to the engagement position in a direction as indicated by an arrow Op12 by the urging force of the spring 14e. Therefore, the lock portion 14a of the engaging member 14 is engaged with the hook portion 12c of the cartridge lid 12, so that the cartridge lid 12 is locked to the camera body as shown in FIG. 4. Interlockingly with the movement of the engaging member 14 to the engagement position, the slide brush 14d is separated from the conductive patterns 6a and 6b, so that the cartridge lid open/close state detecting switch 63 is switched off and the input port $I_2$ of the CPU 60 is shifted to the high level state.

When the engaging member 14 is downwardly moved in a direction as indicated by an arrow Op1 of FIG. 4 to the release position as shown in FIG. 5 against the urging force of the spring 14e by the tab 14b in a state where the cartridge lid 12 is closed, the engagement between the lock portion 14a and the hook portion 12c is released, so that the cartridge lid 12 is opened in a direction as indicated by an arrow Op2, for example, by an urging force of a spring (not shown). When the cartridge lid 12 is opened in the direction as indicated by the arrow Op2, the lever 5 is counterclockwise rotated by the urging force of the spring 5b, and the hook portion 5c is engaged with the projection 14c of the engaging member 14, so that the engaging member 14 is engaged at the engagement position as shown in FIG. 5. When the engaging member 14 is in the release position, the cartridge lid open/close state detecting switch 63 is switched on, and the input port $I_2$ of the CPU 60 is shifted to the low-level state.

(Film feeding device 100)

The construction of the film feeding device for the camera will be described with reference to FIGS. 6 to 8.

A reference numeral 3 represents a film wind-up spool formed integrally with a gear 4. In a film wind-up operation, the film wind-up spool 3 is supplied with a rotation-transmitting force in a film wind-up direction (a direction as indicated by a one-dotted chain line) through the gear 4 to wind up the film 1. The film feeding device whose whole construction is represented by a reference numeral 100 has two electric motors each serving as a driving source, and carries out the following film feeding operation.

Figure 7:
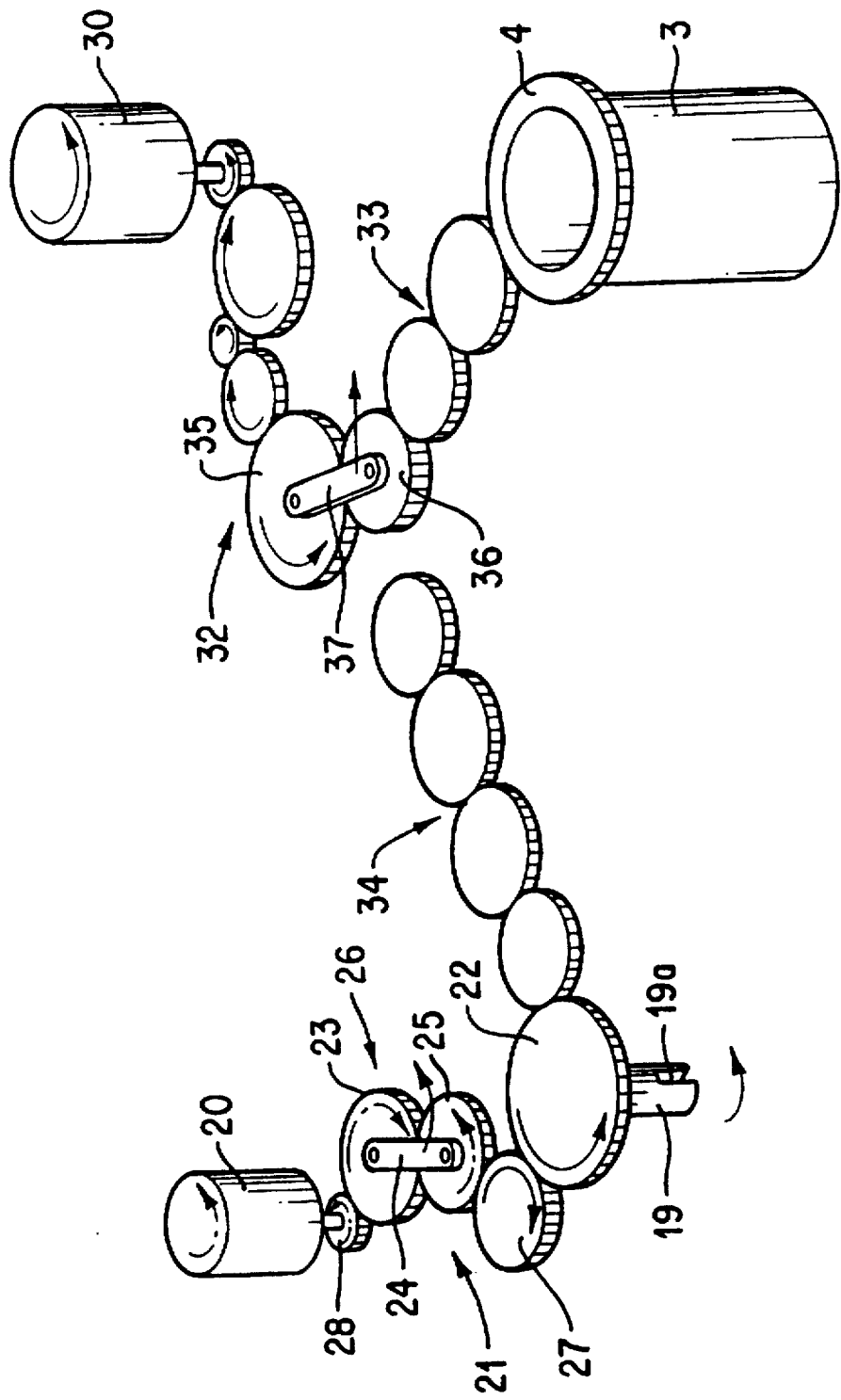
FIG. 7 is a perspective view of the film feeding mechanism at the time when the film is fed out.

(1) When a film feed-out driving system as shown in FIG. 7 is set up, upon loading of the cartridge 2 into the camera, a film 1 is fed out from the cartridge 2 by a predetermined amount so that it is wound around a take-up spool 3.

Figure 6:
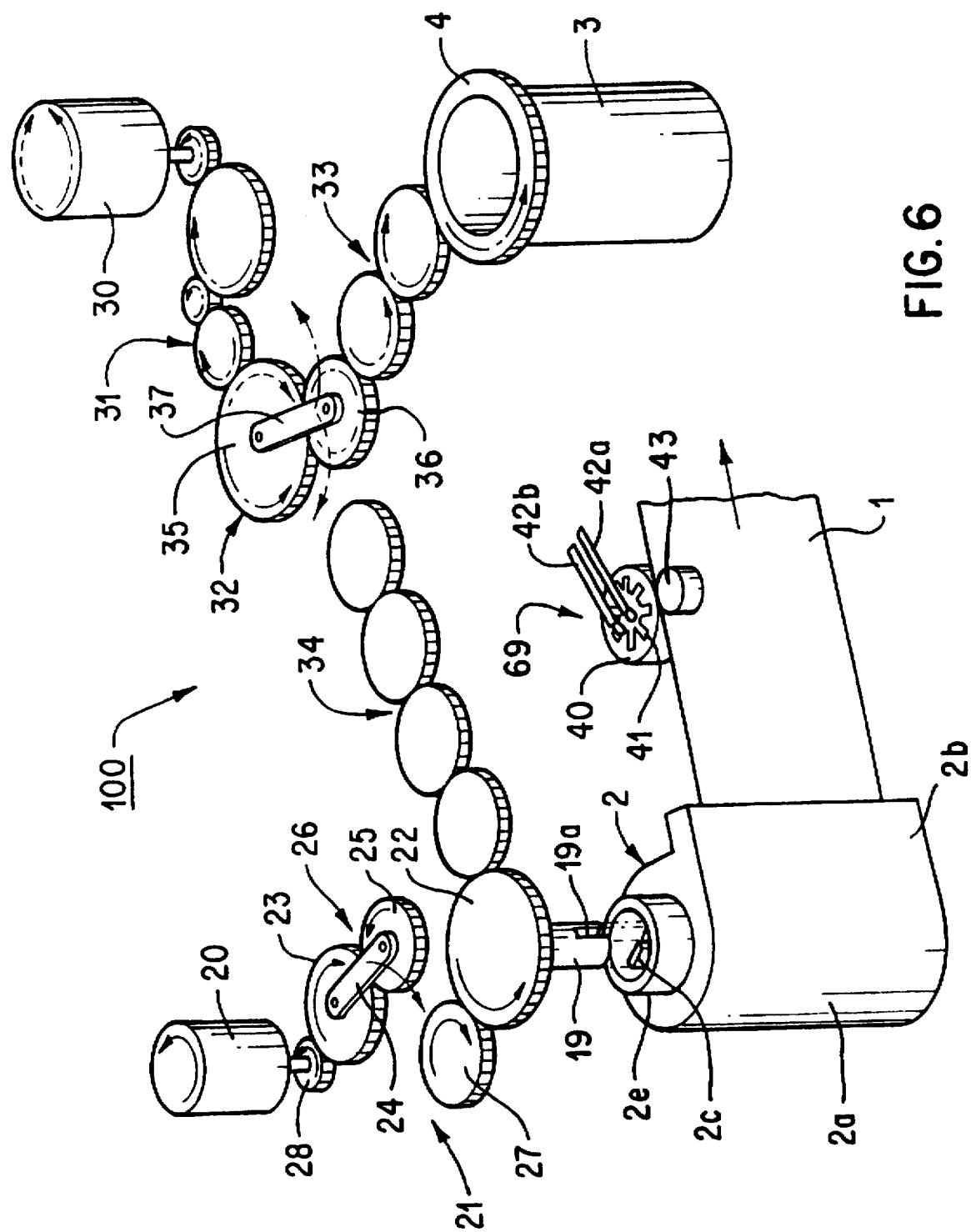
FIG. 6 is a perspective view of a film feeding mechanism of the camera, and shows a state where a film is wound up.

(2) When a film wind-up driving system as shown in FIG. 6 is set up, upon completion of a photographic operation for one frame, the take-up spool 3 winds up the film 1 by one frame.

(3) When a film rewind driving system as shown in FIG. 8 is set up, upon completion of the photographic operation for all frames, the spool shaft 2e of the cartridge 2 is rotated to rewind the film 1 into the cartridge 2.

A film initial feed-out operation, a film wind-up operation and a film rewind operation will be successively described in this order.

(Film initial feed-out operation)

An engaging and driving member 19 is provided with a film driving key 19a which is engageable with the engaging portion 2c of the spool shaft 2e and is so constructed as to be rotatable integrally with a film driving gear 22. In the film initial feed-out operation, the gear 22 is rotated through a gear train 21 by a first electric motor 20, and the feed-out of the film 1 is carried out interlockingly with the rotation of the gear 22 when the cartridge 2 is loaded into the camera. FIG. 6 shows a state where the film driving key 19a and the engaging portion 2c are not in engagement with each other, however, the film driving key 19a is actually so designed as to extend in its axial direction so that the film driving key 19a is engaged with the engaging portion 2c when the cartridge 2 is loaded into the camera.

A reference numeral 40 represents a feed-amount detection roller which is rotatable interlockingly with the movement of the film 1 fed out from the cartridge 2, and a reference numeral 43 represents a pushing roller which is urged against the film 1 by a spring (not shown). The film 1 runs between the rollers 40 and 43 while sandwiched therebetween under pressure, and the feed-amount detection roller 40 is rotated as following the running of the film 1. The feed-amount detection roller 40 is provided with a film shift-amount detection switch 69 at the upper surface thereof to detect the feed-amount of the film 1 on the basis of the rotation amount of the roller 40.

The switch 69 comprises a conductive pattern 41 formed integrally on the upper surface of the roller 40, and brushes 42a and 42b which are slidable on the conductive pattern 41. The brush 42a is usually in contact with the conductive pattern 41 while the other brush 42b is intermittently contacted with the conductive pattern 41 through the rotation of the roller 40. The brush 42a is grounded while the brush 42b is connected to a counter 68 as shown in FIG. 9 as described later and further connected through a pull-up resistor 70 to a power source. The counter 68 is counted up every time the brush 42b is contacted with the conductive pattern 41 through the rotation of the roller 40. In this embodiment as shown in the figures, eight pulses are counted by the counter 68 for one rotation of the roller 40, and on the basis of the count value of the counter 68, the rotation amount of the feed-amount detection roller 40, that is, the shift amount of the film 1 can be detected.

The number of pulses for one rotation of the roller 40 may be freely altered by modifying the shape of the conductive pattern to any shape.

(Film wind-up operation)

The film 1 fed out from the cartridge 2 passes over the detection roller 40 as described above, then passes through a well-known film passageway which is called as "tunnel" and comprises inner and outer rail portions and a film platen, and then fed to an outer peripheral portion of the take-up spool 3. In the film passageway, the film 1 passes through an aperture portion which defines a photographic frame. On the outer peripheral surface of the take-up spool 3, the film 1 is pushed to the take-up spool 3 by a pushing roller having an urging spring (not shown). Upon feeding the film 1 to the take-up spool 3, the film feed-out motor 20 is stopped, and the motor 30 is rotated so that the take-up spool 3 is rotated in the wind-up direction (a direction as indicated by an arrow of one-dotted chain line of FIG. 6). The film 1 is wound around the spool 3 through the urging force of pushing roller, and the wind-up of the film 1, that is, the pull-out of the film 1 from the cartridge 2 is successively carried out.

The film wind-up operation by the take-up spool 3 is carried out by transmitting the rotational force of the second motor 30 through a rotation transmission gear train 31, a epicyclic gear mechanism 32 whose engaging direction is selectable and a rotation transmission gear train 33 for the film wind-up to a driving gear 4 integrally with the spool 3. A judgment as to whether the film 1 has been wound around the take-spool 3 and the detection of the feed-amount of one frame of the film 1 are carried out by counting the output pulses of the switch 69 comprising the conductive pattern 41 on the detection roller 40 and the brushes 42a and 42b with the counter 68 and performing a necessary calculation on the basis of the count value.

The film rewind operation after all frames have been photographed is carried out by rotating the spool shaft 2e through the driving gear 22 with the rotational force of the motor 30 in a direction opposite to that of the film feed-out operation.

(Selection of the wind-up gear train 33 and the rewind gear train 34)

In this embodiment, the second motor 30 is used as the driving source for the film wind-up operation and the film rewind operation. In the film rewind operation, the motor 30 is rotated in the direction opposite to that in the film wind-up operation. The reverse rotation of the motor 30 causes an epicyclic gear 36 of the epicyclic gear mechanism 32 as described above to be shifted from the state as shown in FIGS. 6 and 7 to a state as shown in FIG. 8 where the epicyclic gear 36 is engaged with a rotation-transmitting gear train 34 for the film rewind operation. In this state, the rotation of the motor 30 is transmitted to the driving gear 22 which is linked to the spool shaft 2e, and the film rewind operation is carried out.

The epicyclic gear mechanism 32 is used to selectively transmit the rotation of the motor 30 for winding up and rewinding the film 1 as described above to one of the wind-up gear train 33 and the rewind gear train 34. The epicyclic gear mechanism 32 includes a sun gear 35 which is a gear at the last stage of the rotation-transmitting gear train 31 at the motor 30 side, the epicyclic gear 36 engaged with the sun gear 35, and a lever arm 37 which is pivotally supported at the rotation axis of the sun gear 35 while friction is applied to the sun gear 35 by a friction spring (not shown) and which pivotally supports the epicyclic gear 36 at the swing end thereof. The rotational force of the sun gear 35 is transmitted to the lever arm 37 in the rotational direction, so that the lever arm 37 is swung interlockingly with the rotation of the sun gear 35. Through the swing operation of the lever arm 37, the epicyclic gear 36 is selectively engaged with the gear 33 at the wind-up side or the gear 34 at the rewind side to transmit the rotation in a desired direction.

(Linkage and Separation of Feed-out gear train 21)

In this embodiment, another epicyclic gear mechanism 26 is provided to the rotation-transmitting gear train 21 for transmitting the rotation from the film feed-out motor 20 to the film driving gear 22. The epicyclic gear mechanism 26 is provided with a sun gear 23 serving as a gear at the motor side, an epicyclic gear 25 which is engaged with the sun gear 23, and a lever arm 24 which is pivotally supported at the rotational axis of the sun gear 23 while friction is applied to the sun gear 23 by a friction spring (not shown) and which pivotally supports the epicyclic gear 25 at the swing end thereof. In the film feed-out operation, interlockingly with the rotation of the motor 20 side, the lever arm 24 is clockwise swung in the same direction as the rotational direction of the sun gear 23, and the epicyclic gear 25 is engaged with a driven gear 27 of the film driving gear 22 side. When the film 1 is wound up by the take-up spool 3 in a state where the feed-out operation of the film 1 is completed and the motor 20 is stopped, the film driving gear 22 is rotated by the rotation of the spool shaft 2e which is caused by the film wind-up operation, so that the driven gear 27 and the epicyclic gear 25 are rotated. In this case, since the lever arm 24 applies the friction to the sun gear 23 through the friction spring, the lever arm 24 is swingably driven in such a direction that the engagement between the epicyclic gear 25 and the gear 27 is released.

The release operation of the engagement as described above will be described in more detail.

When the motor 20 is rotated in a direction as indicated by an arrow of solid line in FIG. 6, the swing motion of the lever arm 24 which follows the rotation of the sun gear 23 enables the epicyclic gear 25 to engage with the driven gear 27 as shown in FIG. 7, the driving gear 22 is rotated in the film feed-out direction to carry out the feed-out operation of the film 1 from the cartridge 2. When the leading edge of the film 1 reaches the outer peripheral portion of the spool 3, the rotation of the feed-out motor 20 is stopped, and the gear train 33 at the wind-up side is rotated by the motor 30.

It is assumed that the film feeding device at the start time of the film wind-up operation as described above is in the state as shown in FIG. 7. When the feed-out motor 20 is stopped and the motor 30 is rotated so that the take-up spool 3 starts its wind-up rotation, a tensile force is applied to the film wound-up around the take-up spool 3 in the film feed-out direction, whereby the spool shaft 2e inside the cartridge 2 is rotated interlockingly with the wind-up operation of the film 1. Through the rotation of the spool shaft, the driving gear 22 is rotated in the film feeding direction, and the driven gear 27 is also rotated as indicated by a solid line of FIG. 7.

Since the feed-out motor 20 side is being stopped, the epicyclic gear 25 is clockwise revolved around the sun gear 23 interlockingly with the rotation of the driven gear 27 because the lever arm 24 applies friction to the sun gear 23 through the friction spring, and then stopped at such a position that it is not engaged with the driven gear 27. Through this operation, the driving gear 22 and the feed-out motor 20 are separated from each other in the film wind-up operation. This state corresponds to the position relationship as shown in FIG. 6, and the film wind-up operation as described above is successively carried out. It is preferable that a surplus space is set to the engagement release position and a stopper for restricting the movement of the epicyclic gear 25 is provided.

According to the construction as described above, the epicyclic gear 25 of the epicyclic gear mechanism 26 is clockwise swung when the rotational force is transmitted from the motor 20 side while it is counterclockwise swung when the rotational force is transmitted from the driving gear 22, so that the linkage and separation of the rotation-transmitting gear train 21 to and from the feed-out motor 20 and the driving gear 22 are automatically carried out in accordance with the feed-out operation and the wind-up operation of the film 1. Therefore, no cumbersome control is required irrespective of a simple construction, and the film feed-out driving system and the film wind-up driving system can be driven in a required state.

(Film rewind operation)

In the construction as described above, when on the basis of the counting operation of the counter 68 for the pulses transmitted from the feed-amount detection roller 40, it is detected that the film 1 is wound up by a predetermined number of frames so that all frames have been photographed, the motor 30 is rotated in a direction as indicated by an arrow of dotted line of FIG. 6, and the gear 32 is clockwise rotated through the gear train 31. Through this operation, the epicyclic gear 36 is clockwise revolved around the sun gear 35, and the system is changed from the film wind-up system as shown in FIG. 6 to the film rewind system as shown in FIG. 8. The gear 22 is clockwise rotated through the film rewind system as shown in FIG. 8, so that the film 1 is rewound into the cartridge 2. When the film 1 is rewound to be separated from the feed-amount detection roller 40, the roller 40 does not follow the movement of the film 1, so that a pulse signal due to the on/off operation of the switch 69 can not be detected. The motor 30 is continued to be further rotated for a constant time without generating any pulse signals to thereby completely rewind the film 1 into the cartridge 2, and then the motor 30 is stopped to complete the film rewinding operation. After the rewinding operation is completed, the motor 30 is counterclockwise rotated to connect the epicyclic gear 36 to the wind-up gear train 33. This operation is required for the following reason.

Since the epicyclic gear 36 of the epicyclic gear mechanism 32 is engaged with the rewinding gear train 34 after the rewinding operation is completed, an undesired load would be applied to the motor 20 if a newly-loaded film 1 is immediately fed out with the gear 36 being engaged with the gear train 34. That is, the counterclockwise rotation of the motor 20 causes the rewinding gear train 34 to rotate in an opposite direction to that as indicated by an arrow of solid line of FIG. 8, and the rotation of the rewinding gear train 34 is transmitted through the epicyclic gear 36 to the epicyclic gear mechanism 32. Since the epicyclic gear 36 is clockwise rotated through the transmission of the rotational force and the lever arm 37 of the sun gear 35 is clockwise swung, the rotation of the motor 20 is transmitted through the rewinding gear train 34, the epicyclic gear mechanism 32 and the rotation-transmitting gear train 31 to the motor 30. In general, the rotation-transmitting gear train 31 serves as a decelerating system in case where the motor 30 causes the gear train 31 to be rotated. However, when the rotation-transmitting gear train 31 is rotated by the load side (the side of the sun gear 35), it serves as an accelerating system and it has a large load resistance, so that it serves as a large load to the motor 20. In order to avoid this disadvantage, before the film feed-out operation is carried out by the motor 20, the motor 30 is beforehand counterclockwise rotated to keep the epicyclic gear 36 to be engaged with the wind-up gear train 33 as shown in FIG. 6.

It is significant that before the motor 30 is clockwise rotated to carry out the film rewinding operation, the motor 20 is clockwise rotated to separate the epicyclic gear 25 from the driven gear 27. The necessity of this operation will be hereunder described.

After the film wind-up operation is completed by the film feeding system as shown in FIG. 6, there rarely occurs a circumstance where the epicyclic gear 25 of the epicyclic gear mechanism 26 is engaged with the driven gear 27. If this circumstance occurs, the rotation of the motor 30 in the rewinding direction causes the driving gear 22 to be rotated in a different direction from the film feed-out direction, so that through the transmission of the rotational force from the driven gear 27 to the epicyclic gear 25, the lever arm 24 of the sun gear 23 is swung in such a direction that the epicyclic gear 25 is engaged with the driven gear 27. Therefore, the rotational force of the driven gear 27 is transmitted through the epicyclic gear 25, the sun gear 23 and the gear 28 to the motor 20. Generally, the rotation-transmitting gear train 21 for the film feed-out operation serves as the decelerating system in case where the motor 20 causes the gear train 21 to be rotated. Therefore, if the rotation-transmitting gear train 21 for the film feed-out operation is rotated by the load side (the side of the film driving gear 22), it serves as the accelerating system and has a large load resistance, so that it serves as a large load to the motor 30. In order to avoid this disadvantage, it is preferable that before the motor 30 is rotated to carry out the film rewinding operation, the motor 20 is beforehand reversely rotated in the clockwise direction to separate the epicyclic gear 25 from the driven gear 27.

With this construction, the feed-out operation of the film from the cartridge 2, the film wind-up operation and the film rewinding operation can be properly and surely carried out using two motors 20 and 30.

The construction of a control system of a drive control mechanism for the camera and the film feeding device 100 described above will be next described with reference to FIG. 9.

A reference numeral 60 represents a microcomputer (hereinafter referred to as "CPU"), and a reference numeral 61 represents a battery for power supply. A reference numeral 62 represents the cartridge-load detection switch as described above, which comprises the armatures 16 and 17 and serves to detect the load of the cartridge 2 into the cartridge chamber 11 in accordance with the movement of the detection pin 15. A reference numeral 63 represents the cartridge lid open/close detection switch as described above, which comprises the conductive patterns 6a and 6b on the insulating substrate 6 and the brushes 14d and serves to detect the opening and closing state of the cartridge lid 12 in accordance with the movement of the engaging member 14. A reference numeral 64 represents a release switch which is switched on interlockingly with a pushing manipulation of a release button (not shown). One end of each of the switches 62 to 64 is connected to each of the input ports $I_1$ to $I_3$ of the CPU, and the other ends of the switches are grounded.

Reference numerals 66 and 67 represent motor control circuits for controlling the rotation and stopping operations of the film feed-out motor 20 and the wind-up and rewind motor 30 respectively, and the motor control circuit 66 is connected to the output ports $O_1$ and $O_2$ of the CPU 60 while the other motor control circuit 67 is connected to the output ports $O_3$ and $O_4$ of the CPU 60. Each of the motors 20 and 30 is forwardly rotated (in the film feed-out and wind-up direction) when only one port $O_1$ ($O_3$) is in the high-level state, and it is reversely rotated (in the film rewinding direction, etc.) when only the other port $O_2$ ($O_4$) is in the high-level state. Further, when both of the ports $O_1$ and $O_2$ ($O_3$ and $O_4$) are in the low-level state, both of the motors 20 and 30 are stopped.

A reference numeral 68 represents a counter, and a reference numeral 69 represents the film shift-amount detection switch as described above which comprises the conductive pattern 41 and the brushes 42a and 42b. The counter 68 serves to count output pulses of the switch 69 whose on/off operation is carried out interlockingly with the rotation of the feed-amount detection roller 40, and outputs the count value to the CPU 60. The count value of the counter 68 is reset to zero on the basis of an instruction from the CPU 60. A reference numeral 70 represents a pull-up resistor for pulling up the voltage of the brush 42b serving as one end of the switch 69, which is alternately contacted and non-contacted with the conductive pattern 41, to the voltage of the battery 61. The brush 42b is also connected to the counter 68. A reference numeral 71 represents an exposure device such as a shutter, a diaphragm or a diaphragm control device for the camera, and it serves to control a shutter speed or the diaphragm on the basis of an instruction from the CPU 60 for a photographic operation.

Next, the control procedure of the CPU 60 will be described with reference to flowcharts of FIGS. 10 to 14.

Upon load of the battery 61 into the camera, a main program as shown in FIG. 10 is started, and the load of the cartridge 2 into the cartridge chamber 11 is checked through the on/off operation of the cartridge-load detection switch 62 (at a step S101). When the load of the cartridge 2 is confirmed and the closing state of the cartridge lid 12 is confirmed on the basis of a signal from the cartridge lid open/close detection switch 63 at a step S102, the feed-out operation of the film 1 is carried out by the film feed-out driving system described above at a step S103.

The details of the film feed-out step S103 is shown in FIG. 11. At a step S201, the forward rotation of the motor 30 is carried out through the motor control circuit 67 (in FIG. 9) for a predetermined time. That is, as described above, since the epicyclic gear 36 of the epicyclic gear mechanism 32 is engaged with the rewinding gear train 34 when the film rewinding operation is finished, the motor 30 is forwardly rotated for a suitable time exceeding a time required to allow the epicyclic gear 36 to engage with the wind-up gear train 33. Through this operation, the motor 20 does not suffer from the load resistance of the rotation-transmitting gear train 31 and the motor 30.

Subsequently, at a step S202, the forward rotation of the motor (in the feed-out direction) is started through the motor control circuit 66 to carry out the feed-out of the film 1. At a step S203, the feed-out amount of the film 1 is calculated on the basis of the count value of the counter 68 to judge whether the film 1 is fed out by a predetermined amount at which the film 1 reaches the wind-up spool 3. At the time when the predetermined feed-out amount is judged, at a step S204 the motor 20 is stopped to stop the film feed-out operation. Subsequently, at a step S205 the count value of the counter 68 is reset to zero, and then the program returns to the main program as shown in FIG. 10 so that the process is shifted to a step S104.

At the step S104, the take-up spool 3 of the camera is rotated to carry out the wind-up operation of the film 1 around the spool 3. The details of the step S104 is shown in FIG. 12. At a step S301, the motor 30 is forwardly rotated in the wind-up direction through the motor control circuit 67 to wind the film 1 around the spool 3. At a step S302, in the same manner as described above, it is judged on the basis of the count value of the counter 68 whether the film 1 is wound around the take-up spool 3 by a predetermined amount. The affirmative judgment at the step S302 causes the motor 30 to be stopped (at a step S303) and the counter 68 to be reset to zero (at a step S304). Thereafter the program returns to the main program shown in FIG. 10.

At a step S105 of FIG. 10, in accordance with an exposure control mode a shutter speed or a diaphragm value is calculated by inputting various parameters, for example, inputting brightness of an object through a photoelectric converting element (not shown), inputting film sensitivity through a film-sensitivity setting device (not shown), etc. At a step S106, it is judged whether the release switch 64 is switched on or off. If the release switch 64 is judged to be off, the program returns to the step S105. If the release switch 64 is judged to be on, at a step S107, the exposure control device 71 is controlled so that the shutter speed and the diaphragm value calculated at the step S105 are obtained, and then a photographic operation is carried out. Thereafter, at a step S108, the film is wound up by one frame. The film wind-up process is shown in detail in FIG. 13.

A time counting is started at a step S401 of FIG. 13. This time counting is used to check whether the film is fed out by one frame for a predetermined time. At a step S402, the forward rotation of the motor 30 is started through the motor control circuit 67 to rotate the take-up spool 3, and the wind-up of the film 1 is started.

At a step S403, on the basis of the count value of the counter 68 for counting the pulse signal from the film shift-amount detection switch 69, it is judged whether the film wind-up amount reaches that for one frame. If the judgment at the step S403 is "No", the program goes to a step S404 while if the judgment at the step S403 is "Yes", the program goes to a step S405.

At the step S404, on the judgment as to whether the time of the time counting started at the step S401 exceeds a predetermined time, it is judged whether the film can not be wound up even by one frame due to the trailing end of the film. If the time does not exceed the predetermined time, the program returns to the step S403. If the start time exceeds the predetermined time, the film is judged to reach the trailing end thereof, and the program goes to a step S409 to stop the motor 30. Subsequently, at a step S410, a wind-up completion flag F is set to "0", and then the program goes to a step S407.

At a step S405, the motor 30 is stopped, and at a step S406 the wind-up completion flag F is set to "1". At a step S407, the counter is reset to zero, and a step S408 the time counting is stopped, thereafter the program returning to the main program shown in FIG. 10.

When the film can not be wound up by one frame within the predetermined time due to the trailing end thereof, the wind-up completion flag F is set to "0" because the film wind-up is not completed. On the other hand, when the film is wound up by one frame within the predetermined time, the wind-up completion flag F is set to "1".

At a step S109 of FIG. 10, it is judged whether the wind-up completion flag F is set to "1" or "0". If the wind-up completion flag F is judged to be "1", the program returns to the step S105 because the film does not reach its trailing end, and the photographic procedure for each frame is repeat.

If the wind-up completion flag F is judged to be "0" at the step S109, the film is judged to reach its trailing end. Therefore, at a step S110, the film 1 which is wound up around the take-up spool 3 is rewound into the cartridge 2. The detailed procedure of this film rewinding operation are shown in FIG. 14.

At a step S501, the motor 20 is reversely rotated through the motor control circuit 66 for a predetermined time to separate the gear 22 from the motor 20. The predetermined time is set to a suitable time exceeding a time required for surely separating the epicyclic gear 25 at the feed-out side from the gear 27. Through the separation of the gear 22 from the motor 20, the reverse rotation of the motor 30 is not transmitted to the gear train 21 for the film feed-out and the motor 20 in the film rewinding operation, so that these elements do not serve as load resistance to the motor 30.

At steps S502 to 506, the reverse rotation of the rewinding motor 30 is started to start the time counting for the judgment as to the movement of the film, and the film movement is confirmed on the basis of the judgment as to whether the count value is above "1". If the film moves, after the count value is reset to "0" and the time counting is stopped, the program returns to the step S503 at which the time counting is started.

If at the step S504 the count value is judged to be "0", at a step S507 the program awaits its operation for a predetermined time until it is surely judged that the film is not moved. After a time required to shift the leading end of the film from the position of the feed-amount detection roller 40 into the cartridge 2 is kept by the lapse of the time-counting time as described above, the motor 30 is stopped at the steps S508 to S510. Subsequently, the counter is reset and the time counting is stopped, and then the program returns to the main program shown in FIG. 10. Through this operation, the rewinding operation of the film 1 into the cartridge 2 is completed.

At a step S111 of FIG. 10, the open or close state of the cartridge lid 12 is judged on the basis of the on/off signal of the cartridge lid open/close detection switch 63. If the cartridge lid 12 is judged to be closed, the program stays at the step S111. On the other hand, if the cartridge lid 12 is judged to be open, the program goes to a step S112. At a step S112, it is judged whether the cartridge 2 is loaded into the cartridge chamber 11 on the basis of the on/off state of the cartridge-load detection switch 62. If the cartridge 2 is judged to be loaded into the cartridge chamber 11, the program returns to the step S111. If not so, the program goes to the initial step S101.

The foregoing steps are the detailed procedure of the CPU 60. At the steps S101 and S112 of FIG. 10, the presence of the cartridge 2 in the cartridge chamber 11 is judged on the basis of the on/off signal of the cartridge-load detection switch 62. The cartridge-load detection switch 62 comprises the armatures 16 and 17 as shown in FIGS. 1 to 3, and it switches on/off interlockingly with the movement of the detection pin 15 provided in the neighborhood of the film insertion inlet of the cartridge chamber 11. Therefore, as shown in FIG. 2, the switch 62 is switched on at the time when the upper portion of the cartridge 2 is inserted into the cartridge chamber 11, and the judgment at the step S101 becomes affirmative. Thereafter, when the cartridge 2 is completely loaded into the cartridge chamber 11 as shown in FIG. 3 and then the cartridge lid 12 is closed, the judgment at the step S102 becomes affirmative, and the film initial feed-out operation is carried out at the steps S103 and S104 to allow the film of the cartridge to be photographed.

Thereafter, when all frames are photographed, the film is automatically rewound. Upon opening of the cartridge lid 12 after the rewind of the film, the judgment at the step S111 becomes affirmative. Since the cartridge detection switch 62 is provided near to the inlet of the cartridge chamber 11 as shown in FIG. 2, it is first switched off immediately before the take-out of the cartridge 2 is substantially completed. That is, the switch 62 is not switched off in any state where the cartridge is halfway or partially drawn out from the cartridge chamber 11. Since the judgment at the step S112 does not become affirmative unless the switch 62 is once switched off, even when the cartridge 2 is afterwards inserted into the cartridge chamber 11 again and the cartridge lid 12 is closed, the process stays at the step S111. Therefore, the film 1 is not fed out from the cartridge 2. That is, in this embodiment, insofar as the cartridge 2 is completely drawn out or removed from the cartridge chamber 11, the cartridge 2 is not subjected to the initial feed-out operation again.

This invention is not limited to the above embodiment, and various modifications and alterations may be made to the shapes, constructions, etc. of the film feeding device 100 and other elements. For example, in the above embodiment, a general film feeding mode is adopted. That is, the film 1 is fed out from the cartridge 2 loaded into the camera to the take-up spool 3, then wound therearound and every photographic operation for each frame the film 1 is wound up around the take-up spool 3. After all the frames are photographed, the spool shaft at the cartridge 2 side is rotated to rewind the film 1 into the cartridge 2. The film feeding mode of this invention is not limited to the general film feeding mode as described above, and may be applied to the following film feeding mode. That is, an unexposed film 1 is once wound up by the take-up spool 3 when the cartridge 2 is loaded into the cartridge chamber 11, and then the film 1 is rewound every frame into the cartridge 2 interlockingly with the photographic operation.

The camera of the above embodiment is so designed that the cartridge-load detection switch 62 is switched off when the cartridge 2 is substantially completely drawn out from the cartridge chamber 11. The same effect can be obtained by designing the cartridge-load detection switch 62 to be switched off when at least a half of the cartridge 2 is drawn out from the cartridge chamber 11. Further, the construction of the cartridge-load detection switch is not limited to that of the above embodiment. In the above embodiment, the film initial feed-out operation is started when the cartridge lid is closed after the load of the cartridge into the cartridge chamber. However, the film initial feed-out operation may be started, for example, when a release button is manipulated after the close of the cartridge lid. Still further, the above camera pertains to the camera in which the film is automatically rewound after the photographic operation for all frames is completed. However, this invention is applicable to a camera having a function that the film is freely rewound by manipulating a manual switch at any time.

Second Embodiment

A second embodiment according to this invention will be described with reference to FIGS. 16A to 24.

FIGS. 16A, 16B and 16C show a film cartridge which is loaded into a camera according to this embodiment. This cartridge 110 is the same type of camera as disclosed in U.S. Pat. No. 4,832,275 or U.S. patent application Ser. No. 730,070, for example. The cartridge 110 includes a spool 112 around which a film (not shown) is wound, and a cylindrical housing 113 for forming a space in which the film (not shown) is accommodated. The cylindrical housing 113 is provided with a lip portion 113a projecting therefrom. The leading end of the film is beforehand taken in the cartridge 110, and the film is fed out from or rewound into the lip portion 113a by rotating the spool 112.

Like the cartridge as disclosed in the U.S. patent application Ser. No. 730,070, the cartridge 110 has a mechanism for indicating and identifying a film status, and indicates the film status on a film status indication portion 114. That is, as shown in FIGS. 16A to 16C, the upper end surface of the cartridge 110 is divided into four sectorial areas, and indexes 114a, 114b and 114c for numbers "1", "2" and "3" each indicating a film status of the film in the cartridge 10 are displayed on three sectorial areas of the above four areas by a printing or the like. On the other hand, an indicator 112a which is rotatable interlockingly with the motion of the spool 112 is provided in such a manner as to indicate one of the indexes 114a, 114b and 114c in accordance with the stop position of the rotation of the spool 112. The numbers "1", "2" and "3" represent the following three kinds of film statuses, respectively.

(1) When the index 114a of "1" is indicated by the indicator 112a (in FIG. 16A), this film status indicates a cartridge accommodating a newly unused (unexposed) film (hereinafter referred to as "unused film cartridge").

(2) When the index 114b of "2" is indicated by the indicator 112a (in FIG. 16B), this film status indicates a cartridge which is prematurely unloaded from the camera and accommodates a film whose frames are partially photographed (hereinafter referred to as "prematurely-unloaded film cartridge").

(3) When the index 114c of "3" is indicated by the indicator 112a (in FIG. 16C), this film status indicates a cartridge accommodating a used (photographed) film whose all frames have been photographed (hereinafter referred to as "used film cartridge or photographed film cartridge").

In the following embodiment, the spool 112 is controlled by the camera such that the indicator indicates "2" when the film is unloaded from the camera before all frames are photographed, and indicates "3" when all frames are photographed and a rewind instruction is output. Therefore, when a user unloads the film cartridge from the camera, he can identify the film status of the film in the cartridge 110 on the basis of the indication of the index. In place of the indexes "1", "2" and "3", characters such as "Non-used", "partial-used" and "used" or other numbers or symbols may be used for the indexes 114a, 114b and 114c, respectively.

Like the cartridge as disclosed in U.S. patent application Ser. No. 730,070, the cartridge 110 is equipped with a mechanism in which the positional deviation of the indicator when the cartridge 110 is unloaded from the camera can be prevented and the film status can be indicated when the cartridge 110 is loaded into the camera. A cylindrical housing 113 is provided with a well-known DX code, so that the film sensitivity, the number of frames which can be photographed, etc. can be detected by the camera.

FIGS. 17, 18A and 18B show an engaging portion 115 provided to the spool 112 of the film cartridge 110, and a driving member 121 at the camera side which is engageable with the engaging portion 115. Unlike the normal 135-type of cartridge, the engaging portion 115 of this embodiment is not a spline type, but has a special shape as shown in the figures. In the 135-type of cartridge, two kinds of engagements can be made within 360°. However, in this embodiment the engagement can be made only at the rotational angular position as shown in FIG. 18A, and no engagement can be made at the other rotational angular positions. This engaging portion 115 is provided not only to the upper end side of the spool 112, but also to the lower end side of the spool 112. Through the engagement between the engaging portion 115 and the driving member 121 of the camera, the rotation of the spool 112, that is, the feeding of the film can be carried out. FIG. 18B shows a circumstance where no engagement can be made at the positional angular relationship obtained by rotating the positional angular relationship as shown in FIG. 18A by 180°.

The reason why only one kind of engagement is possible within 360° as described above is explained as follows.

As described above, in this embodiment, the spool 112 is controlled to be stopped at the position corresponding to the film status (prematurely-unloaded or used status), and this control is carried out by detecting the rotational position of the driving member 121 of the camera. Therefore, if two kinds of engagements are possible within 360° like the 135-type spline, the spool 112 can not be controlled to be stopped at a desired position when the engagement to be actually made is unclear.

As shown in FIGS. 16 to 16C, two window portions 116a and 116b are formed at the lower portion of the cartridge 110 in such a manner as to be angularly away from each other substantially by 90° in the peripheral direction, and an engaging surface portion 117 which is integrally formed at the lower portion of the spool 112 and rotated together with the spool shaft 112e is exposed from each of the window portions 116a and 116b. The engaging surface portion 117 comprises a slant surface 117a and a non-slant surface 117b, and one of the slant surface 117a and the non-slant surface 117b is selectively exposed from each of the window portions 116a and 116b in accordance with the stop position of the spool 112 (film status) as follows.

(1) When "1" is indicated, the slant surface 117a is exposed from each of the window portions 116a and 116b.

(2) When "2" is indicated, the slant surface 117a is exposed from the window portion 116a while the non-slant surface 117b is exposed from the window portion 116b.

(3) When "3" is indicated, the non-slant surface 117b is exposed from each of the window portions 116a and 116b.

As shown in FIGS. 19 and 20, the camera 120 is provided with a cartridge chamber 122 into which the film cartridge 110 can be loaded in its axial direction. A load preventing pin 123 which is urged by a spring 123a is provided on the side surface of the cartridge chamber 122 in such a manner as to be retractably projected in the direction perpendicular to the loading direction of the cartridge at a position over which the window portion 116b of the cartridge is passed when the cartridge is loaded into the cartridge chamber 122. Therefore, when the slant surface 117a is exposed from the window portion 116b as shown in FIG. 21A, the load preventing pin 123 is retracted by action of the slant surface 117a upon insertion of the cartridge 110 into the cartridge chamber 122, so that the film cartridge 110 is allowed to be loaded into the cartridge chamber 122. On the other hand, when the non-slant surface 117b is exposed from the window portion 116b as shown in FIG. 21B, the non-slant surface 117b abuts against the load preventing pin 123 upon insertion of the cartridge 110 into the cartridge chamber 122, so that the cartridge 110 is mechanically prevented from being loaded into the cartridge chamber 122.

Therefore, it is impossible to load a used film cartridge 110 indicated by "3" and a prematurely-unloaded film cartridge 110 indicated by "2" into the cartridge chamber 122, and it is possible to load only an unused film cartridge 110 indicated by "1" into the cartridge chamber 122. When the loaded cartridge 110 is drawn out from the cartridge chamber 122 by a predetermined amount as shown in FIG. 21B, the load preventing pin 123 is returned to a projection state by the urging force of the spring 123a.

In FIG. 19, a reference numeral 131 represents a cartridge lid which is swingable around a shaft 131a so that the opening and closing motion can be carried out with respect to the camera body. The close state of the cartridge lid 131 is kept by a hook portion (not shown) provided to the tip thereof, and it is allowed to be opened by releasing the hook portion. A spring 131b for urging the cartridge 110 downwardly in FIG. 19 is provided at the inner surface of the cartridge lid 131.

A cartridge-load detection switch 62 for detecting the load/unload of the cartridge comprises a detection pin 132 and a pair of armatures 133 and 134, like the detection switch as shown in FIG. 1. The detection pin 132 has a tip P which is projected into the cartridge chamber 122 by a spring force of the armature 133. When the cartridge 110 is not loaded into the cartridge chamber 122, each of the armatures 133 and 134 is in non-contact state as shown in FIG. 19. On the other hand, when the cartridge 110 is loaded into the cartridge chamber 122, the armature 133 is contacted with the armature 134 as shown in FIG. 21A, that is, the load-detection switch 62 is switched on. The armatures 133 and 134 are secured to the outer peripheral surface of the cartridge chamber 122 in such a manner as to sandwich an insulator 135 therebetween.

The detection pin 132 is provided at a position nearer to the cartridge insertion inlet than the position at which load preventing pin 123 is provide, and thus when the cartridge 110 is unloaded from the cartridge chamber 122, the switch 62 is switched off after the load preventing pin 123 is returned to the projection position.

A spool driving mechanism 100A for the camera for controlling both of the film feeding operation and the rotation stop position of the film will be described.

As shown in FIG. 22, the driving member 121 of the camera 120 described above is engaged with the engaging portion 115 at the lower side of the spool 112 to be rotatively driven by the cartridge driving motor 124. That is, the rotation of the motor 124 is transmitted to a gear 126a through a decelerating gear mechanism 200 having a clutch 125 and a gear, and the gear 126a, the shaft 126b and the driving member 121 are integrally rotated with one another. The rotation of these elements causes the rotation of the spool 112 of the cartridge 110, whereby the film is fed out from the cartridge 110 or rewound into the cartridge 110.

A spring 127 is used as a well-known retractable mechanism in which, when the cartridge 110 is loaded into the cartridge chamber 122, the load of the cartridge 110 is permitted even though the engaging portion 115 and the driving member 121 are angularly deviated from each other. If the angular deviation exists between the engaging portion 115 and the driving member 121, the driving member 121 is downwardly retracted along the shaft 126b against the urging force of the spring 127A. At the retractive position as described above, the driving member 121 is rotatable integrally with the gear 126a and the shaft 126b. When the film is wound up by the spool (not shown) after the film feed-out operation by the rotation of the spool 112, the rotation transmission between the driving member 121 and the cartridge driving motor 124 is interrupted from each other by the clutch 125.

The rotational position of the driving member 121 is detected by the position detection switch 65 comprising conductive patterns 127a and 127b provided on an insulating substrate 127B and the slidable brush 128. The insulating substrate 128B is fixed inside the camera 120. The slidable brush 128 is integrally rotated with the driving member 126a, and one terminal of the brush 128 is slid on the conductive pattern 127a at all times while the other terminal thereof is contacted with the conductive pattern 127b when the indicator 112a of the cartridge 110 indicates the index 114c, that is, "3". Therefore, by grounding the conductive pattern 127a and connecting the conductive pattern 127b to an input port of a control circuit 151 described later, it is identified whether the angular position in the rotational direction of the driving member 121 corresponds to the position for a used film cartridge.

The control system for the camera 120 will be described with reference to FIG. 23.

A reference numeral 151 represents a control circuit having a microcomputer and other peripheral equipments such as a memory, a counter, etc. and serves to control the operation of the camera 120 in accordance with a flowchart as described later. To the control circuit 151 connected are the cartridge-load detection switch 62 shown in FIG. 19, the cartridge lid open/close detection switch 63 which is switched on interlockingly with the closing of the cartridge lid 131, and the position detection switch 65 comprising the conductive patterns 127a and 127b and the slidable brush 128. The position detection switch 65 is switched on when the indicator 112a of the cartridge 110 indicates "3" which represents a used film cartridge. A reference numeral 152 represents a motor driving circuit, and serves to drive the cartridge driving motor 124 described above to carry out the film feed-out operation, the film rewinding operation and the indication operation of the film status indication portion 114.

The control procedure of the control circuit 151 will be described with reference to a flowchart as shown in FIG. 24.

This program is started when a cell (not shown) is loaded into the camera 120. First, at a step S1 it is judged on the basis of a on/off signal of the load detection switch 62 whether the cartridge 110 is loaded into the cartridge chamber 122. If the switch 62 is judged to be off, the cartridge 110 is judged not to be loaded into the cartridge chamber 122, and the program stays at the step S1. If the switch 62 is judged to be on, the cartridge 110 is judged to be loaded into the cartridge chamber 122, and the program goes to a step S2.

At the step S2, on the basis of the on/off state of the cartridge lid open/close detection switch 63, it is judged whether the cartridge lid 131 is opened or closed. If the detection switch 63 is judged to be off, the cartridge lid 131 is judged to be opened, and the program returns to the step S1. If not so, the cartridge lid 131 is judged to be closed, and the program goes to a step S3. At the step S3, the motor 124 is forwardly rotated through the motor driving circuit 152 to feed the film from the cartridge 110 to a take-up spool (not shown). The arrival of the film at the take-up spool is detected by a film shift-amount detection device comprising the film shift-amount detection switch 69 and the counter 68 described above.

At the step S4 carried out is a well-known photographic process in which the film is wound up around the take-up spool by one frame every photographic operation. The description of the details of the photographic process are eliminated. Upon completion of the photographic process, that is, upon completion of the photographic operation for all frames, the motor 124 is reversely rotated at a step S5 to rewind the film into the cartridge 110. The complete rewind of the film into the cartridge 110 is also detected by the film shift-amount detection device described above.

At steps S6 to S8, the rotational angular position of the spool 112 of the cartridge 110 is controlled by the driving member 121 so that the indicator 112a of the spool 112 is located so as to indicate the index 114c, that is, "3". That is, at the step S6, the cartridge driving motor 124 is first reversely rotated to rotate the spool 112 of the cartridge 110 in the rewinding direction through the driving member 121. Subsequently, at the step S7, the program awaits its operation until the indicator 112a of the spool 112 is located so as to indicate "3", that is, until the position detection switch 65 is switched on, and then the program goes to the step S8. At the step S8, the reverse rotation of the motor 124 is stopped.

At a step S9, on the basis of the on/off state of the cartridge lid open/close detection switch 63, it is judged whether the cartridge lid 131 is opened or closed. If the detection switch 63 is judged to be off, the cartridge lid 131 is judged to be opened, and the program goes to a step S10. If not so, the program stays at the step S9. At the step S10, on the basis of the on/off signal of the load detection switch 62, it is judged whether the cartridge 110 is unloaded from the cartridge chamber 122. If the load detection switch 62 is judged to be off, the cartridge 110 is judged to be unloaded from the cartridge chamber 122, and the program returns to the step S1. If the load detection switch 62 is judged to be on, the cartridge 110 is judged not to be unloaded from the cartridge chamber 122, and the program returns to the step S9.

According to the procedure as described above, when all frames have been photographed, the film is completely rewound into the cartridge 110, and then the spool 112 is rotated so that the indicator 112a indicates the "3" representing a used film cartridge. Thereafter, the cartridge lid 131 is opened to unload the cartridge 110 from the cartridge chamber 122, so that the cartridge lid open/close detection switch 63 is switched off. Further, when the cartridge 110 is completely unloaded from the cartridge chamber 122, the load detection switch 62 is switched off, and the process returns to the step S1. However, a loop process at the steps S9 and S10 is circulatingly continued until the load detection switch 62 is switched off after the cartridge lid 131 is opened. That is, until the load detection switch 62 is once switched off and then switched on again, the film feed-out operation is not carried out even if the cartridge lid 131 is closed. The load detection switch 62 is so designed as to be switched off after the load preventing pin 123 is returned to the projection position as described above.

Therefore, when the cartridge 110 is partially drawn out from the cartridge chamber 122 to the extent that the load preventing pin 123 is not returned to the projection position, the load detection switch 62 is not switched off, and thus the film feeding operation is not carried out even if the cartridge 110, which has not been completely drawn out from the cartridge chamber 111, is completely inserted into the cartridge chamber 122 again. Further, after the load preventing pin 123 is returned to the projection position, the load detection switch 62 is switched off. In this state, the load of the used film cartridge 110 is prevented by the load preventing pin 123, and thus the film feeding operation of the film of the cartridge 110 can not be carried out.

Third Embodiment

A third embodiment of this invention will be described with reference to FIGS. 25 and 26.

In this embodiment, the load preventing pin 123A is also used as the detection pin 132 shown in FIG. 19. That is, as shown in FIG. 25, one armature 133 constituting the load detection switch 62 is designed so as to be engageable with the base end portion of the load preventing pin 123A. When the load preventing pin 123A is retracted from the cartridge chamber 122 interlockingly with the load of the cartridge 110, the armature 133 is pushed by the load preventing pin 123A as shown in FIG. 26A interlockingly with the retractive motion of the load preventing pin 123A to switch on the cartridge load detection switch 62. On the other hand, when the load preventing pin 123A is projected into the cartridge chamber 122 by the urging force of the spring 123a, the load detection switch 62 is switched off interlockingly with the projecting motion of the load preventing pin 123A.

In this case, when the cartridge 110 is partially drawn out unloaded from the cartridge chamber 122 to the extent that the load preventing pin 123A is not returned to the projection position, the cartridge-load detection switch 62 is not switched off. Therefore, the feed-out operation of the film in the cartridge is not carried out even though the cartridge 110, which is partially drawn out from the cartridge 122, completely inserted into the cartridge chamber 122. When the cartridge 110 is drawn out by a predetermined amount and the load preventing pin 123A is returned to the projection position as shown in FIG. 26, the load detection switch 62 is switched off. However, in this state the load of the used film cartridge 110 is prevented by the load preventing pin 123A. Therefore, the feed-out operation of the film of the cartridge can not be carried out.

According to this embodiment, the detection pin 132 as shown in FIG. 19 is not required, so that the number of parts of the camera can be reduced and the construction of the camera can be simplified.

Modification of Third Embodiment

A modification of the third embodiment will be explained with reference FIGS. 42 and 43.

In this modification, the armature 133 is also used as the spring 123a as shown in FIG. 25. That is, as shown in FIG. 42, one armature 133 constituting the load detection switch 62 urges the projection 123B of the load preventing pin 123A to the right side as shown in FIG. 42. When the load preventing pin 123A is retracted from the cartridge chamber 122 upon the load the cartridge 110, the armature 133 is pushed by the projection 123B of the load preventing pin 123A as shown in FIG. 43A interlockingly with the retractive motion of the load preventing pin 123A, so that the cartridge-load detection switch 62 is switched on. On the other hand, when the load preventing pin 123A is projected into the cartridge chamber 122 by the urging force of the armature 133, the load detection switch 62 is switched off interlockingly with the projecting motion of the load preventing pin 123A.

Therefore, when the cartridge 110 is partially drawn out from the cartridge chamber 122 to the extent that the load preventing pin 123A is not returned to the projection position, the cartridge-load detection switch 62 is not switched off, so that the feeding operation of the film is not carried out even when the cartridge 110, which is partially drawn out from the cartridge chamber 122, is completely inserted into the cartridge chamber 122. When the cartridge 110 is drawn out from the cartridge chamber 122 by a predetermined amount to return the load preventing pin 123A to the projection position as shown FIG. 43B, the load detection switch 62 is switched off. However, in this state the load of a used film cartridge 110 into the cartridge chamber 122 is prevented by the load preventing pin 123A, so that the feeding operation of the film of the cartridge 110 can not be carried out.

According to this modification, the spring 123a as shown in FIG. 25 is not further required, so that the construction of the camera can be simplified with further reducing the number of the parts of the camera.

Fourth Embodiment

A fourth embodiment according to this invention will be described with reference to FIGS. 27 to 32.

The second and third embodiments pertain to a case where only the unused film cartridge can be loaded into the camera. However, in this embodiment, both of an unused film cartridge and a prematurely-unloaded film cartridge can be loaded into the camera. The same elements as those of FIGS. 16 to 23 are represented by the same reference numerals, and the different points therebetween will be mainly described.

As shown in FIGS. 27 and 28, a camera 120A of this embodiment is provided with a cartridge chamber 122 having the same construction as described above. A load preventing pin 223 which is urged by a spring 223a is provided on the side surface of the cartridge chamber 122 in such a manner as to be retractably projected in the direction perpendicular to the loading direction of the cartridge at a position over which the window portion 116a (the window portion 116b in the first embodiment) of the cartridge is passed when the cartridge is loaded into the cartridge chamber 122. Therefore, when the slant surface 117a is exposed from the window portion 116a as shown in FIG. 29A, the load preventing pin 223 is retracted by action of the slant surface 117a upon insertion of the cartridge 110 into the cartridge chamber 122, so that the film cartridge 110 is allowed to be loaded into the cartridge chamber 122. On the other hand, when the non-slant surface 117b is exposed from the window portion 117b as shown in FIG. 29B, the non-slant surface 117b abuts against the load preventing pin 223 upon insertion of the cartridge 110 into the cartridge chamber 122, so that the cartridge 110 is mechanically prevented from being loaded into the cartridge chamber 122.

Therefore, it is impossible to load a used film cartridge 110 indicated with "3" by the indicator 112a, and it is possible to load an unused film cartridge 110 indicated with "1" by the indicator 112a and a prematurely-unloaded film cartridge 110 indicated with "2" by the indicator 112a into the cartridge chamber 122. When the loaded cartridge 110 is drawn out from the cartridge chamber 122 by a predetermined amount as shown in FIG. 29B, the load preventing pin 223 is returned to a projection state by the urging force of the spring 223a. The construction of the load detection switch 62 is identical to that as described above, and the description thereof is eliminated.

The spool driving mechanism 100B for the camera of the fourth embodiment will be described with reference to FIG. 30.

In FIG. 30, a groove 121a is provided over the whole peripheral surface of the lower portion of the driving member 121. The groove 121a is engaged with one end 129a of a position detection lever 129 which is rotatably supported by a fixing pin 130, and the other end 129b of the position detection lever 129 is contacted with an armature of a position detection switch 81. When the driving member 121 is engaged with the engaging portion 115 of the spool 112 of the cartridge 110 and is projected to the upper limit position by the urging force of the spring 127A, the switch 81 is switched on. On the other hand, when the engagement between the driving member 121 and the engaging portion 115 of the spool 112 is not made due to the angular deviation therebetween and the driving member 121 is downwardly pushed, the switch 81 is switched off. That is, the engagement and non-engagement between the driving member 121 and the engaging portion 115 of the spool 112 can be detected on the basis of the on/off state of the switch 81.

The rotational position of the driving member 121 is detected by the position detecting switch comprising the conductive patterns 227a, 227b, 227c and 227d formed on the insulating substrate 227B and the slidable brush 228. One terminal of the slidable brush 228 is slid on the conductive pattern 227d at all times. When the indicator 112a of the cartridge 110 indicates the one of the indexes 114a, 114b and 114c, that is, "1", "2" and "3", the other terminal of the slidable brush 228 is contacted with the corresponding one of the conductive patterns 227a to 227c. Accordingly, if each of the conductive patterns 227a, 227b and 227c is connected to an input port of a control circuit (FIG. 31) described later and the conductive pattern 227d is grounded, the rotational position of the driving member 121 is identified by detecting the contact of the slidable brush 228 with one of the conductive patterns 227a, 227b and 227c.

FIG. 31 is a block diagram of the control system for the camera 120A. A reference numeral 101 represents a control circuit including a CPU, a ROM and a RAM, a reference numeral 81 represents the position detection switch, and a reference numeral 65A represents an indication detection switch which comprises the conductive patterns 227a and 227d and the slidable brush 228 shown in FIG. 30 and is switched on when the indicator 112a of the cartridge 110 indicates "1" representing an unused film cartridge.

The control procedure of the control circuit 101 of the fourth embodiment will be described with reference to a flowchart shown in FIG. 32. The same steps as those of FIG. 24 are represented by the same step numbers.

In FIG. 32, at a step S101A, it is judged whether the switch 65a comprising the conductive patterns 227a and 227d and the slidable brush 228 is in the on-state or in the offstate, that is, the engaging portion 115 of the spool 112 of the cartridge 110 which is indicated with "1" by the indicator 112a thereof is engageable with the driving member 121 of the camera. If the switch 65A is judged to be off (the engagement is judged to be impossible), the program goes to a step S102A. On the other hand, if the switch 65A is judged to be on (the engagement is judged to be possible), the program goes to the step S1.

At the step S102A, the reverse rotation of the cartridge driving motor 124 (the rotation in the film rewinding direction) is started, and at a step S103A the program awaits its operation until the switch 65A as described above is switched on, that is, until the driving member 121 of the camera is driven to such a position that it is engageable with the engaging portion 115 of the spool 112 of the cartridge 110 which is indicated with "1" by the indicator 112a. Thereafter, the reverse rotation of the cartridge driving motor 124 is stopped at a step S104A, and the program returns to the step S101A.

On the other hand, if at the step S1 the load detection switch 62 is judged to be on and subsequently at the step S2 the cartridge-lid open/close detection 63 is judged to be on, the program goes to a step S105A to judge on the basis of the on/of signal of the position detection switch 81 whether the indicator 112a of the cartridge 110 loaded into the cartridge chamber indicates "1" or "2".

Since a used film cartridge which is indicated with "3" by the indicator 112a is prevented from being loaded into the cartridge chamber 122 by the load preventing pin 223, the currently-loaded cartridge 110 is an unused film cartridge which is indicated with "1" by the indicator 112a, or a prematurely-unloaded film cartridge which is indicated with "2" by the indicator 112a. At the steps S101A to S104A, the position of the driving member 121 of the camera is adjusted. Therefore, for the cartridge 110 which is indicated with "1" by the indicator 112a, simultaneously with the load of the cartridge 110, the engaging portion 115 of the spool 112 is engaged with the driving member 121, and the driving member 121 is inhibited from being retracted downwardly, so that the position detection switch 81 is switched on. On the other hand, for the cartridge 110 which is indicated with "2" by the indicator 112a, the engaging portion 115 of the spool 112 is not engaged with the driving member 121, and the driving member 121 is retracted, so that the position detection switch 81 is switched off. Therefore, if the position detection switch 81 is switched on, the program goes to a process for an unused-film at a step S106A. If the position detection switch 81 is switched off, the program goes to a process for a prematurely-unloaded film at a step S107A.

In the unused film process, after the film feed-out operation, the film is successively photographed and it is wound around the take-up spool (not shown) every photographic operation. When the photographic operation of all frames is completed, the film is rewound into the cartridge 110, and the rotational position of the spool 112 is controlled by the driving member 121 to indicate "3" by the indicator 112a.

In the prematurely-unloaded film process, after the film feed-out operation, non-photographed (unexposed) frames are detected as the film is wound around the take-up spool (not shown), and the non-photographed frames are photographed. When the photographic operation for all frames is completed, in the same manner as described above, the film is rewound into the cartridge 110, and the rotational position of the spool 112 is controlled by the driving member 121 to indicate "3" by the indicator 112a.

After the steps S106A and S107A, when it is judged at a step S9 that the cartridge lid open/close detection switch 63 is switched off and that subsequently at a step S10 the load detection switch 62 is switched off, the program returns to the step S101A.

According to the above procedure, when the photographic operation for all frames is completed, the film is rewound into the cartridge 110, and then the spool 112 is rotated so that the indicator 112a indicates "3" representing a used film cartridge. Thereafter, when the cartridge lid 131 is opened to unload the cartridge 110 from the cartridge chamber 122, the switch 63 is switched off. When the cartridge 110 is completely unloaded from the cartridge chamber 122, the load detection switch 62 is switched off, and the process returns to the step S101. However, the loop at the steps S9 and S10 is circulatingly repeated until the load detection switch 62 is switched off after the cartridge lid 131 is opened. That is, until the load detection switch 62 is once switched off and then is switched on again, the film initial feed-out operation, that is, the film feed-out operation is not carried out even if the cartridge lid 131 is closed. The load detection switch 62 is so designed as to be switched off after the load preventing pin 223 is returned to the projection position as described above.

Therefore, when the cartridge 110 is partially unloaded from the cartridge chamber 122 to the extent that the load preventing pin 223 is not returned to the projection position, the cartridge-load detection switch 62 is not switched off, and thus the film feed-out operation is not carried out even when the cartridge 110, which is partially drawn out from the cartridge chamber 122, is completely inserted into the cartridge chamber 122. After the load preventing pin 223 is returned to the projection position, the load detection switch 62 will be switched off. However, in this state, the load of the used film cartridge 110 into the cartridge chamber 122 is prevented by the load preventing pin 223, so that the film feeding operation of the film in the cartridge 110 can not be carried out.

Similarly in the other embodiments as described above, in the camera of the fourth embodiment, as shown in FIGS. 33 and 34, the load preventing pin 223A may serve as the detection pin 132, and thus the number of parts of the camera can be reduced.

In addition, in the construction as shown in FIGS. 33 and 34, like the construction as shown in FIGS. 44 and 45, the armature 133 may also serves as the spring 223a. Therefore, the number of the parts of the camera can be further reduced, and the construction can be more simplified.

Fifth Embodiment

The fifth embodiment according to this invention will be described with reference to FIGS. 35 to 41.

FIGS. 35 to 37 are a perspective view, a plane view and a partially notched side view of an embodiment of a film cartridge used in the fifth embodiment. A film cartridge 204 comprises a cylindrical housing 204a for accommodating the film in a light-shielding state, a film outlet 204b formed integrally with the housing 204a, a film spool shaft 204c, and a disk plate 204d which is rotatably secured to the spool shaft 204c at the upper end of the housing 204a. The disk plate 204d is formed with a notched portion 217 at the peripheral edge thereof, and the notched portion 217 constitutes an identifying portion serving as preventing reload of a used film cartridge 204. The notched portion 217 is located at an opposite side to the film outlet 204b shown in FIGS. 36 and 37 in a case where the film cartridge 204 is unused. On the other hand, in a case where the film cartridge 204 has been used, the disk plate 204d is rotated so that the notched portion 217 is located at the side of the film outlet 204b as indicated by a two-dotted chain line of FIG. 35.

FIG. 38 is a cross-sectional view of the camera into which the cartridge 204 as shown in FIGS. 35 to 37 is loaded. In FIG. 38, a reference numeral 201 represents a camera body, and a film cartridge chamber 202 is provided inside the camera body 201. The film cartridge chamber 202 is formed of members 203a and 203b so as to accommodate the film cartridge 204 having the profile as shown in FIG. 35, and has a film cartridge insertion inlet 202a which is opened in the lower surface of the camera body 201. The insertion inlet 202a is opened and closed by a cartridge lid 205 which is pivotally mounted on the camera body 201. A film feeding gear 206 is rotatably secured on the upper wall of the film cartridge chamber 202 at the center portion thereof, and the film feeding gear 206 is provided with an engaging portion 206a which is engaged with a spool shaft 204c of the film cartridge 204 as shown in FIG. 35.

A reference numeral 207 represents a housing member secured to the outer wall of the member 203b constituting the film cartridge chamber, and the base portion of an engaging member 208 is pivotally supported through a pivot pin 209 inside the housing member 207. The engaging member 208 is swingable in such a direction that it projects into the cartridge chamber 202 and in such a direction that it retracts from the cartridge chamber 202. The swing end portion of the engaging member 208 is designed in a hook form as to be bent toward the cartridge chamber 202, and the tip of the hook portion which is projected through a hole 210 formed in the cartridge-chamber constituting member 203b is formed with an engaging pawl 208a which is engaged with an identifying portion (as described later) of the film cartridge 204 to prevent the load of the film cartridge 204 into the cartridge chamber 202.

A reference numeral 211 represents a plate spring which serves to urge the engaging member 208 in such a direction that the engaging pawl 208a is projected into the film cartridge chamber 202 (in a counterclockwise direction in FIG. 38) at all times. One end of the plate spring 211 is fixed inside the housing member 207, and the other end thereof is engaged with a pin 212 which is projected from the engaging member 208 at the pivot side. The plate spring 211 also serves as one armature of a detection switch 213 for detecting the presence of the film cartridge 204 in the film cartridge chamber 202, and the base portion of the plate spring 211 and the base portion of the other armature which is paired with the plate spring 211 are superposed over each other through an insulating spacer 214. The superposed base portions are secured through a vis 215 to a securing portion 207a formed in the housing member 207, and positioned by a positioning pin 216 which is projected from the securing portion 207a.

The on/off signal of the detection switch 213 in accordance with the contact or non-contact between the plate spring 211 and the armature 213a is transmitted through a lead line (not shown) connected to the spring plate 211 and the armature 213a to the CPU for controlling the whole system of the camera.

The operation will be next described.

When a used film cartridge 204 is inserted through the insertion inlet 202a into the film cartridge chamber 202, as shown in FIG. 39, the engaging pawl 208a of the engaging member 208 abuts against the end surface at the insertion side of the film cartridge 204, that is, the disk plate 204d. Upon further insertion of the film cartridge 204 in the above state, the engaging member 208 is swung in a direction as indicated by an arrow B against the spring force of the plate spring 211 interlockingly with the insertion operation of the film cartridge 204 in a direction as indicated by an arrow A because no engaging member engageable with the engaging portion 208a is provided to the film cartridge 204, so that the engaging member 208 is away from the insertion edge of the film cartridge 204. Thereafter, when the swing tip of the engaging member 208 is in pressed contact with the outer wall of the film cartridge 204 as shown in FIG. 40, the swing tip of the plate spring 211 is pressed against the armature 213a, and the detection switch 213 is switched on. Through this operation, it is detected that the film cartridge 204 is inserted into the cartridge chamber 202. When the film cartridge 204 is completely loaded into the film cartridge chamber 202, the cartridge lid 205 can be closed and the camera is allowed to carry out the photographic operation.

When a used film cartridge 204 is loaded through the insertion inlet 202a into the film cartridge chamber 202, the notched portion 217 of the disk plate 204d is located at a position as indicated by a two-dotted chain line of FIG. 35, so that the engaging pawl 208a of the engaging member 208 is engaged with the notched portion 217 as shown in FIG. 41. Through this engagement, the rotation of the engaging member 208 in the retractive direction is restricted, and the further insertion of the film cartridge 204 is prevented. Consequently, the used film cartridge 204 is prevented from being erroneously loaded into the cartridge chamber 202. The engaging member 208 keeps the engaging portion 208a thereof to be projected into the film cartridge chamber 202, and thus the detection switch 213 is kept to be off, so that the load of the film cartridge is not erroneously detected by the camera.

Even when the cartridge lid 205 is closed and the inner condition of the film cartridge chamber 202 is not viewed from the outside, the presence of the film cartridge in the film cartridge chamber 202 can be surely checked by detecting on the basis of the detection switch 213 whether the engaging member 208 is projected into or retracted from the film cartridge chamber 202.

In the embodiment as described above, the plate spring 211 for urging the engaging member 208 in the projecting direction into the film cartridge chamber 202 is also used as the armature of the detection switch 213 for detecting the presence of the film cartridge 202, so that the number of parts which constitute the erroneous load preventing mechanism for the film cartridge can be reduced to promote the cost-down and the save of space, and the miniaturization of the camera can be achieved.

What is claimed is:

1. A camera having a cartridge chamber, which is formed as a hole in a body of the camera, into which a film cartridge is insertable along its axial direction through an access opening of said hole, said cartridge having identifying means for indicating at least that film in said cartridge has been used, the camera comprising:

a prevention member provided in said chamber that engages the identifying means of said cartridge and prevents insertion of said cartridge into said chamber when the identifying means indicates that the film has been used; and detection means for detecting whether said cartridge is loaded into or unloaded from said cartridge chamber by detecting retraction of said prevention member from said chamber.

2. A camera as claimed in claim 1, wherein said detection means outputs a load signal when detecting that said cartridge is loaded into said cartridge chamber and a non-load signal when detecting that said cartridge is unloaded from said cartridge chamber.

3. A camera as claimed in claim 1, wherein said prevention member is urged by an urging force to project radially inwardly into said chamber, is retracted against the urging force by insertion of said cartridge into the chamber, allows cartridge insertion when the identifying means does not indicate that film in said cartridge has been used, and engages the identifying means to prevent cartridge insertion when the identifying means indicates that film in said cartridge has been used; and wherein said detection means comprises a pair of contact plates 1) urging said prevention member radially inward into said chamber, 2) outputting a load signal when cartridge insertion causes said pair of contact plates to contact each other, and 3) outputting a non-load signal when said pair of contact plates do not contact each other.

4. A camera having a cartridge chamber, which is formed as a hole in a body of the camera, into which a film cartridge is insertable along its axial direction through an access opening of said hole, said cartridge having an identifying device that indicates at least that film in said cartridge has been used, the camera comprising:

a prevention member provided in said chamber that engages the identifying device of said cartridge and prevents insertion of said cartridge into said chamber when the identifying device indicates that the film has been used; and a detection device that detects whether said cartridge is loaded into or unloaded from said cartridge chamber by detecting retraction of said prevention member from said chamber.

5. A camera as claimed in claim 4, wherein said detection device outputs a load signal when detecting that said cartridge is loaded into said cartridge chamber and a non-load signal when detecting that said cartridge is being unloaded from said cartridge chamber.

6. A camera as claimed in claim 4, wherein said prevention member is urged by an urging force to project radially inwardly into said chamber, is retracted against the urging force by insertion of said cartridge into the chamber, allows cartridge insertion when the identifying device does not indicate that film in said cartridge has been used, and engages the identifying device to prevent cartridge insertion when the indentifying device indicates that film in said cartridge has been used; and wherein said detection device comprises a pair of contact plates 1) urging said prevention member radially inward into said chamber, 2) outputting a load signal when cartridge insertion causes said pair of contact plates to contact each other, and 3) outputting a non-load signal when said pair of contact plates do not contact each other.

* * * * *